US012621898B2

(12) United States Patent
Lee et al.

(10) Patent No.: US 12,621,898 B2
(45) Date of Patent: May 5, 2026

(54) METHOD AND DEVICE FOR TRANSMITTING SMALL DATA IN WIRELESS COMMUNICATION SYSTEM

(71) Applicant: Innovative Technology Lab Co., Ltd., Seoul (KR)

(72) Inventors: Won Seok Lee, Seoul (KR); Dong Hyun Park, Seoul (KR); Ki Bum Kwon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 501 days.

(21) Appl. No.: 18/065,583

(22) Filed: Dec. 13, 2022

(65) Prior Publication Data

US 2023/0127054 A1      Apr. 27, 2023

Related U.S. Application Data

(63) Continuation of application No. PCT/KR2021/007330, filed on Jun. 11, 2021.

(30) Foreign Application Priority Data

Jun. 15, 2020    (KR) ........................ 10-2020-0072274

(51) Int. Cl.
*H04W 76/27* (2018.01)
*H04W 72/1268* (2023.01)
(Continued)

(52) U.S. Cl.
CPC ....... *H04W 76/27* (2018.02); *H04W 72/1268* (2013.01); *H04W 74/0833* (2013.01); *H04W 74/0836* (2024.01); *H04W 74/0838* (2024.01)

(58) Field of Classification Search
None
See application file for complete search history.

(56) References Cited

U.S. PATENT DOCUMENTS

2013/0242730 A1* 9/2013 Pelletier ............ H04W 28/0284
370/230
2018/0092157 A1 3/2018 Chen et al.
(Continued)

FOREIGN PATENT DOCUMENTS

CA       3119979 A1 * 5/2020 .......... H04W 74/004
CN    110537392 A    12/2019
(Continued)

OTHER PUBLICATIONS

International Search Report for International Patent Application No. PCT/KR2021/007330, dated Sep. 17, 2021.
(Continued)

*Primary Examiner* — Jamaal Henson

(57) ABSTRACT

The present disclosure may provide a method of transmitting, by a user equipment (UE), small data in a wireless communication system. Here, a small data transmission method may include enabling a small data configuration in a UE; triggering, by the UE, a small data transmission; transmitting, by the UE, a common control channel (CCCH) and buffered data information to a base station in a random access channel (RACH) procedure; receiving a random access response (RAR) including an uplink (UL) grant from the base station based on the buffered data information; and transmitting the small data based on the UL grant.

17 Claims, 39 Drawing Sheets

(51) Int. Cl.

| | |
|---|---|
| *H04W 74/0833* | (2024.01) |
| *H04W 74/0836* | (2024.01) |
| *H04W 74/0838* | (2024.01) |

(56) References Cited

U.S. PATENT DOCUMENTS

| | | | | |
|---|---|---|---|---|
| 2018/0139778 | A1 | 5/2018 | Chou | |
| 2018/0302929 | A1 | 10/2018 | Takahashi et al. | |
| 2019/0045554 | A1* | 2/2019 | Ye | H04W 74/0833 |
| 2019/0104553 | A1* | 4/2019 | Johansson | H04L 1/189 |
| 2019/0174571 | A1* | 6/2019 | Deenoo | H04W 76/27 |
| 2020/0022187 | A1* | 1/2020 | Bergström | H04W 74/0866 |
| 2020/0107369 | A1 | 4/2020 | Jeon | |
| 2020/0229111 | A1* | 7/2020 | Kim | H04B 7/0695 |
| 2020/0314893 | A1* | 10/2020 | Chou | H04W 74/006 |
| 2021/0014011 | A1* | 1/2021 | Xiong | H04L 1/1887 |
| 2021/0219349 | A1* | 7/2021 | Huang | H04W 74/0833 |
| 2021/0227586 | A1* | 7/2021 | Huang | H04W 52/242 |
| 2021/0259021 | A1* | 8/2021 | Huang | H04W 74/0833 |
| 2021/0274558 | A1* | 9/2021 | Takata | H04W 74/0838 |
| 2021/0282042 | A1* | 9/2021 | Park | H04W 56/00 |
| 2022/0124815 | A1* | 4/2022 | Kim | H04W 74/0836 |
| 2023/0224876 | A1* | 7/2023 | Yi | H04W 76/27 |
| | | | | 370/329 |

FOREIGN PATENT DOCUMENTS

| | | |
|---|---|---|
| KR | 10-2017-0029434 A | 3/2017 |
| KR | 10-2017-0039556 A | 4/2017 |
| WO | 2020087280 A1 | 5/2020 |

OTHER PUBLICATIONS

Written Opinion for International Patent Application No. PCT/KR2021/007330, dated Sep. 17, 2021.

Ericsson, "Details of solution B for small data transmission in RRC_Inactive", 3GPP TSG-RAN WG2 #97 Tdoc R2-1700890, Athens, Greece, Feb. 13-17, 2017, pp. 1-7.

"3rd Generation Partnership Project; Technical Specification Group Radio Access Network; NR; NR and NG-RAN Overall Description; Stage 2 (Release 16)," Mar. 2020, pp. 1-133, 3GPP TS 38.300 V16.1.0, 3GPP Organizational Partners.

"3rd Generation Partnership Project; Technical Specification Group Radio Access Network; NR; Medium Access Control (MAC) protocol specification (Release 16)," Mar. 2020, pp. 1-141, 3GPP TS 38.321 V16.0.0, 3GPP Organizational Partners.

"3rd Generation Partnership Project; Technical Specification Group Radio Access Network; NR; Radio Resource Control (RRC) protocol specification (Release 16)," Mar. 2020, pp. 1-835, 3GPP TS 38.331 V16.0.0, 3GPP Organizational Partners.

Extended European Search Report from European Patent Office for applicant No. 21825545.3-1215 dated May 15, 2024.

Ericsson: "Impact of 2-step RACH on exisitng RRM requirements", 3GPP Draft; R4-2004413, 3rd Generation Partnership Project (3GPP), Mobile Competence Centre ; 650, Route Des Lucioles ; F-06921 Sophia-Antipolis Cedex ; FRANCE, vol. RAN WG4, No. e Meeting ;Apr. 20, 2020-Apr. 30, 2020 Apr. 10, 2020 (Apr. 10, 2020), XP052407383.

ZTE Corporation: "Work Item on NR smalldata transmissions in Inactive state", 3GPP Draft; RP-193252, 3rd Generation Partnership Project (3GPP), Mobile Competence Centre ; 650, Route Des Lucioles ; F-06921 Sophia-Antipolis Cedex ; FRANCE, vol. TSG RAN, No. Sitges, Spain; Dec. 9, 2019-Dec. 12, 2019 Dec. 12, 2019 (Dec. 12, 2019), XP051840382.

Examination report from Intellectual Property of India for applicant No. 202217076906 dated Feb. 2, 2024.

* cited by examiner (a)                                    (b)

FIG. 12
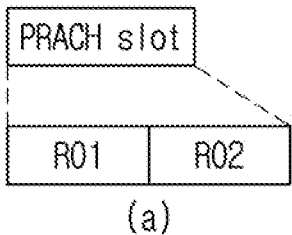
(a)
totalNumberofRA-Preambles = 10 (Multiple of ssb-perRACH-Occasion)
ssb-perRACH-Occasion = 2
CB-PreamblePerSSB = n4
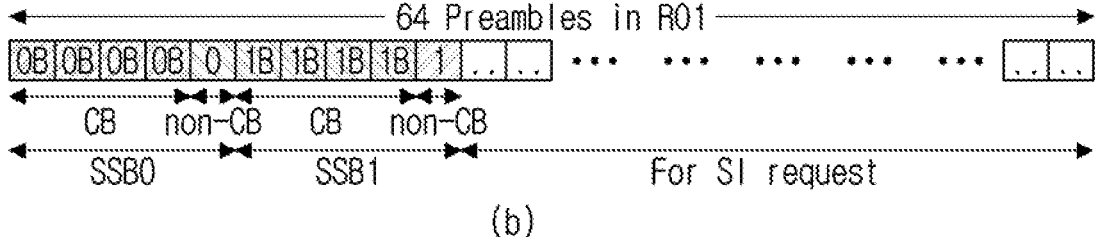
(b)
totalNumberofRA-Preambles = 12 (Multiple of ssb-perRACH-Occasion)
ssb-perRACH-Occasion = 2
CB-PreamblePerSSB = n4
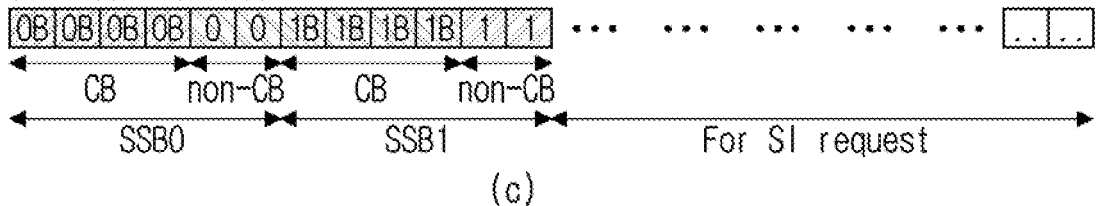
(c)
totalNumberofRA-Preambles = 20 (Multiple of ssb-perRACH-Occasion)
ssb-perRACH-Occasion = 2
CB-PreamblePerSSB = n8
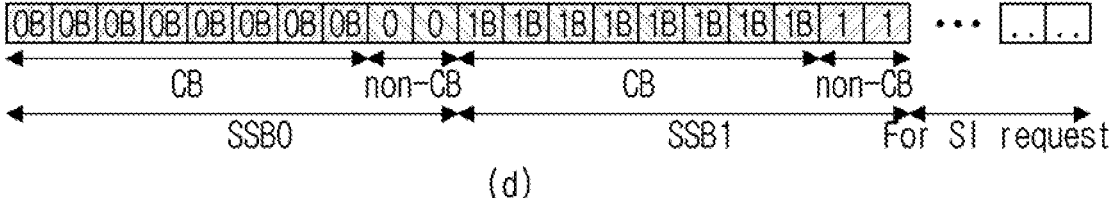
(d)

FIG. 13
totalNumberofRA-Preambles = 16 (Multiple of ssb-perRACH-Occasion)
ssb-perRACH-Occasion = 2
CB-PreamblePerSSB = n4
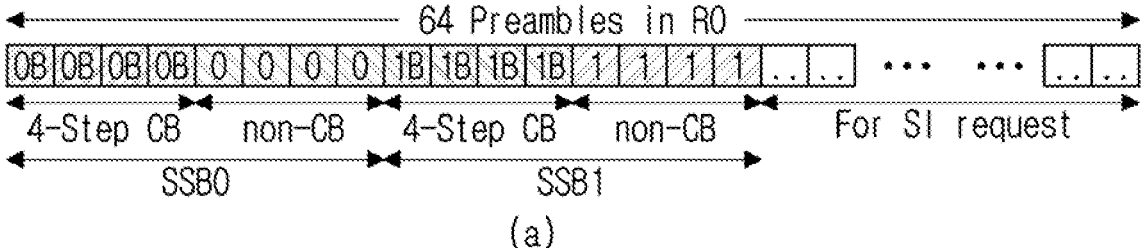
(a)
msgA-CB-PreamblePerSSB-PerSharedRO-r16 = 2, INTEGER{1…15}
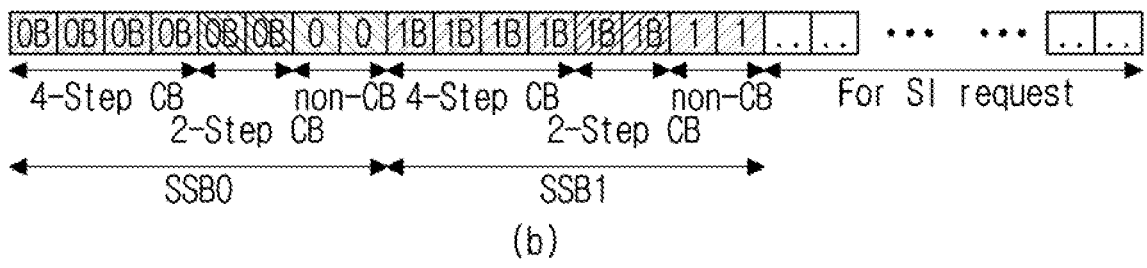
(b)

FIG. 14

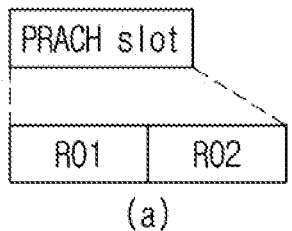

(a)

totalNumberofRA-Preambles = 12 (Multiple of ssb-perRACH-Occasion)
ssb-perRACH-Occasion = 1/2
CB-PreamblePerSSB = n8

←———————————— 64 Preambles in RO1 ————————————→
| OB | OB | OB | OB | OB | OB | OB | OB | O | O | O | O | .. |   ...  ...  ...  ...   | . | . |
←————————— CB —————————→ ←— non-CB —→ ←———— For SI request ————→

←———————————— 64 Preambles in RO2 ————————————→
| OB | OB | OB | OB | OB | OB | OB | OB | O | O | O | O | .. |   ...  ...  ...  ...   | . | . |
←————————— CB —————————→ ←— non-CB —→ ←———— For SI request ————→

(b)

msgA-CB-PreamblePerSSB-PerSharedRO-r16 = 2,  INTEGER{1···15}

←———————————— 64 Preambles in RO1 ————————————→
| OB | OB | OB | OB | OB | OB | OB | OB | OB | OB | O | O | .. |   ...  ...  ...  ...   | . | . |
←————————— 4-Step CB —————————→ ←—— non-CB ——→ ←———— For SI request ————→
                         2-Step CB ←———————————— 64 Preambles in RO2 ————————————→
| OB | OB | OB | OB | OB | OB | OB | OB | O | O | O | O | .. |   ...  ...  ...  ...   | . | . |
←————————— 4-Step CB —————————→ ←— non-CB —→ ←———— For SI request ————→

(c)

(a)                                    (b)

(a)

(b)

(a)

(b)

FIG. 33
totalNumberofRA-Preambles = 16 (Multiple of ssb-perRACH-Occasion)
ssb-perRACH-Occasion = 2
CB-PreamblePerSSB = n4
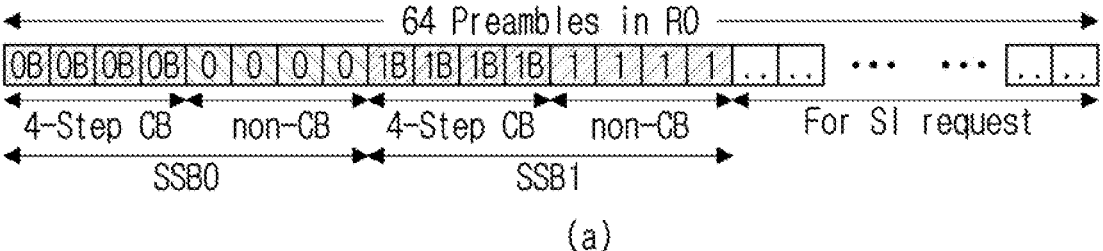
(a)
msgA-CB-PreamblePerSSB-PerSharedRO-r16 = 2,   INTEGER{1…15}
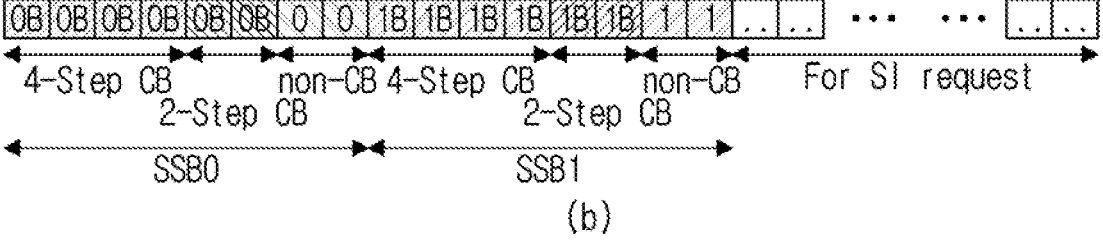
(b)

FIG. 36

METHOD AND DEVICE FOR TRANSMITTING SMALL DATA IN WIRELESS COMMUNICATION SYSTEM

CROSS-REFERENCE TO RELATED APPLICATIONS

This application is a continuation of International patent application No. PCT/KR2021/007330, filed on Jun. 11, 2021, which claims priority from and the benefit of Korean Patent Application No. 10-2020-0072274, filed on Jun. 15, 2020, each of which is hereby incorporated by reference in its entirety.

BACKGROUND

The present disclosure may provide a method and apparatus for transmitting small data in a wireless communication system. More particularly, the present disclosure may provide a method and apparatus in which a radio resource control (RRC) inactive user equipment (UE) transmits small data through a random access channel (RACH) procedure.

International Mobile Telecommunication (IMT) framework and standard are being developed in the International Telecommunication Union (ITU). Also, in the recent times, discussion for 5-th generation (5G) communication is ongoing through a program called "IMT for 2020 and beyond."

To meet the requirements requested by "IMT for 2020 and beyond," discussion is being made to support various numerologies about a time-frequency resource unit standard by considering various scenarios, service requirements, and potential system compatibility in a 3-rd Generation Partnership Project (3GPP) new radio (NR) system.

Also, to overcome a poor channel environment, such as high path-loss, phase-noise, and frequency offset, occurring on a high carrier frequency, the 5G communication may support transmission of a physical signal/channel through a plurality of beams. Through this, the 5G communication may support applications, for example, enhanced Mobile Broadband (eMBB), massive Machine Type Communications (mMTC)/ultra Machine Type Communications (uMTC), and Ultra Reliable and Low Latency Communications (URLLC).

SUMMARY

The present disclosure may provide a method and apparatus for transmitting small data through a random access channel (RACH) procedure.

The present disclosure may provide a method and apparatus for allocating a resource for small data transmission.

The present disclosure may provide a method and apparatus for additionally setting a PRACH configuration for small data transmission.

The present disclosure may provide a method and apparatus for transmitting small data based on a contention-based random access (CBRA).

The present disclosure may provide a method and apparatus for transmitting small data based on a contention-free random access (CFRA).

The present disclosure may provide a method of transmitting, by a user equipment (UE), small data in a wireless communication system. Here, a small data transmission method may include enabling a small data configuration in the UE; triggering, by the UE, a small data transmission; transmitting, by the UE, a common control channel (CCCH) and buffered data information to a base station in a random access channel (RACH) procedure; receiving a random access response (RAR) including an uplink (UL) grant from the base station based on the buffered data information; and transmitting the small data based on the UL grant.

The present disclosure may provide a method of transmitting, by a UE, small data in a wireless communication system. Here, a small data transmission method may include enabling a plurality of small data configurations in the UE; triggering, by the UE, a small data transmission; selecting, by the UE, a preamble group based on a CCCH size and an uplink data size; randomly selecting, by the UE, and transmitting a preamble within the preamble group; and transmitting the uplink data.

According to the present disclosure, there may be provided a method and apparatus for transmitting small data through a random access channel (RACH) channel. Through this, a user equipment (UE) may transmit uplink data without shifting to a radio resource control (RRC) connected state.

The present disclosure may provide a method and apparatus for allocating a resource for small data transmission. Here, the resource may be allocated by comparing a common control channel (CCCH) and an uplink data size with a transport block size (TBS).

The present disclosure may provide a method and apparatus for additionally configurating a PRACH configuration for small data transmission and, through this, may use an additional PRACH configuration for the small data transmission.

The present disclosure may provide a method and apparatus for transmitting small data based on a contention-based random access (CBRA) and, through this, may effectively select a resource for small data transmission.

The present disclosure may provide a method and apparatus for transmitting small data based on a contention-free random access (CFRA) and, through this, may effectively select a resource for small data transmission.

BRIEF DESCRIPTION OF THE DRAWINGS

FIG. 12 illustrates a preamble configuration method to which the present disclosure may apply.

FIG. 13 illustrates a 4-step RACH preamble to which the present disclosure may apply.

FIG. 14 illustrates a 2-step RACH preamble to which the present disclosure may apply.

FIG. 19 illustrates a form of SuccessRAR with a fixed size included in a MAC PUD as a response to Msg A to which the present disclosure may apply.

FIG. 33 illustrates a method of transmitting small data based on a contention-free random access (CFRA) to which the present disclosure may apply.

FIG. 36 illustrates a method of transmitting small data based on a CFRA to which the present disclosure may apply.

DETAILED DESCRIPTION

Figure 1:
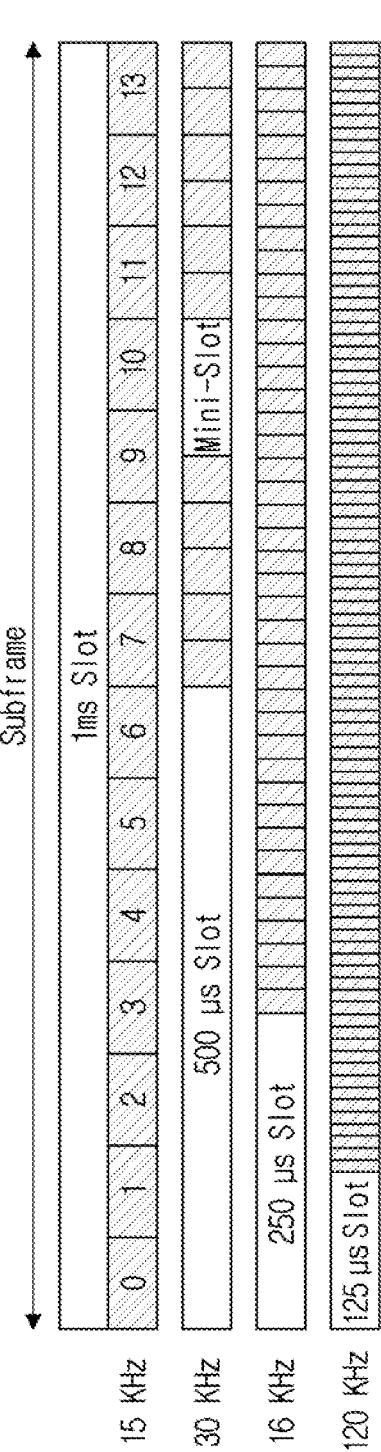
FIG. 1 illustrates a slot length to which the present disclosure may apply.

Various examples of the disclosure will be described more fully hereinafter with reference to the accompanying drawings such that one of ordinary skill in the art to which the present disclosure pertains may easily implement the embodiment(s). However, the present disclosure may be implemented in various forms and is not limited to the examples described herein.

In describing the examples, detailed descriptions of known configurations or functions will be omitted when it is determined that the detailed descriptions cloud the subject matter of the disclosure. In the drawings, a portion that is irrelevant to the detailed description is omitted and the like drawing reference numerals are understood to refer to the like portions.

Herein, it will be understood that when an element is referred to as being "connected to", "coupled to", or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Herein, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed embodiment is also included in the scope of the disclosure.

Herein, elements described in various examples may not be necessarily essential and may be partially selectable. Therefore, an embodiment including a partial set of elements described in an embodiment is also included in the scope of the disclosure. Also, an embodiment that additionally includes another element to elements described in various embodiments is also included in the scope of the disclosure.

The description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, an eNodeB (eNB), an ng-eNB, a gNodeB (gNB), an access point (AP), and the like Also, the term 'terminal' may be interchangeably used with other terms, for example, user equipment (UE), a mobile station (MS), a mobile subscriber station (MSS), a subscriber station (SS), and a non-AP station (non-AP STA), and the like.

In the disclosure, transmitting or receiving a channel includes a meaning of transmitting or receiving information or a signal through the corresponding channel. For example, transmitting a control channel indicates transmitting control information or a signal through the control channel Likewise, transmitting a data channel indicates transmitting data information or a signal through the data channel.

In the following description, although the term "new radio (NR) system" is used for a system to which various examples of the present disclosure apply to be distinguished from the existing system, the scope of the present disclosure is not limited to the term. Also, although the term "NR system" herein is used as an example of a wireless communication system capable of supporting various subcarrier spacings (SCSs), the term "NR system" itself is not limited to the wireless communication system that supports a plurality of SCSs.

Hereinafter, a physical resource structure of the NR system is described.

Uplink and downlink transmission and reception may be performed based on a corresponding resource grid. A single resource grid may be generated for each antenna port and each SCS. A single resource element (RE) within the resource grid may be defined by a single subcarrier and a single orthogonal frequency division multiplexing (OFDM) symbol.

A single resource block (RB) in a frequency domain may include 12 REs. A single resource block in a time domain may include a single OFDM symbol. The OFDM symbol may include a cyclic prefix (CP). A CP type may include a normal CP and an extended CP.

Numerologies may be variously configured to meet various services and requirements of the NR system. Table 1 below shows an example of a numerology supported by the NR system.

TABLE 1

| μ | Δf 2$^\mu$ · 15[kHz] | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to the following Table 1, the numerologies may be defined based on an SCS, a cyclic prefix (CP) length, and the number of orthogonal frequency division multiplexing (OFDM) symbols per slot, which are used in an OFDM system.

For example, Table 1 represents a SCS Δf according to a subcarrier spacing configuration indexμ. Also, if μ=2, an extended CP may be applied. In other cases, only a normal case may be applied. Also, if a value of μ=0, 1, 3, or 4, the numerology may apply to an SSB (or a PBCH) and if a value of μ=0, 1, 2, 3, the numerology may apply to another physical channel (e.g., a data channel).

FIG. 1 illustrates a slot length to which the present disclosure may apply.

Referring to an example of FIG. 1, the number of OFDM symbols per slot, the number of slots per frame (or radio frame), the number of slots per subframe, etc., may be determined for each SCS configuration (μ). For example, uplink and downlink transmission and reception may be performed based on a frame with a length of 10 ms. A single frame may include 10 subframes with a length of 1 ms. Also, transmission in a physical layer may be performed based on a slot unit and a single slot may include 14 OFDM symbols in a normal CP and 12 OFDM symbols in an extended CP. The number of slots per a single frame or the number of slots per a single subframe may differ based on the SCS configuration (μ).

In the example of FIG. 1, if μ=0, a single subframe includes a single slot, a single slot has a length of 1 ms, and a single slot include 14 OFDM symbols and a single subframe 14 OFDM symbols accordingly in an SCS of 15 kHz. If μ=3, a single subframe includes eight slots, a single slot has a length of 125 μs, and a single slot includes OFDM symbols and a single subframe includes 112 OFDM symbols accordingly in an SCS of 120 kHz.

Here, a slot may be defined based on a basic time unit used to transmit one piece of data and control information in an NR system. A single slot includes 14 (or 12) OFDM symbols. Here, since a time length of a single OFDM symbol differs according to numerology, even a time length of a single slot differs according to numerology. Meanwhile, dissimilar to the time length of the slot that differs according to the numerology, a subframe has an absolute time length corresponding to 1 ms in the NR system and may be used as a reference time for a length of another time section.

Also, in the NR system, a mini-slot may be defined. The mini-slot may refer to a slot having the number of OFDM symbols less than that of the normal slot. For example, if a low latency is required, such as an ultra reliable and low latency communications (URLLC) service, the latency may be reduced using a short mini-slot compared to the normal slot. For example, the number of OFDM symbols that constitute the mini-slot may be 2, 4, or 7.

Hereinafter, downlink synchronization and uplink synchronization in the NR system are described.

Figure 2:
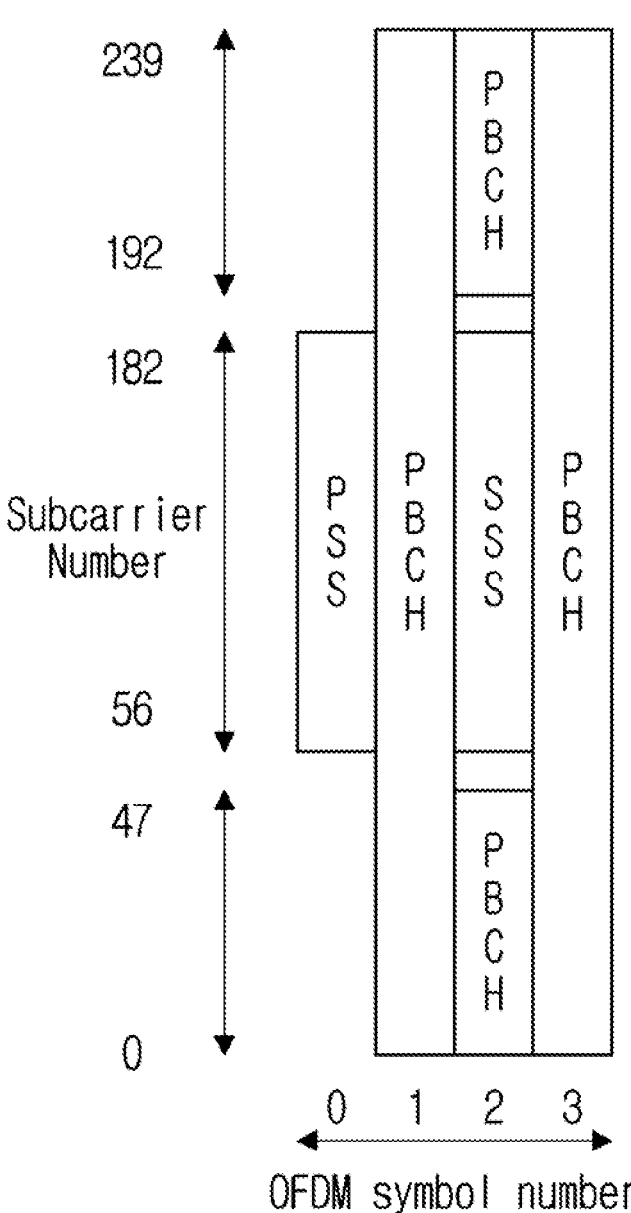
FIG. 2 illustrates a structure of a synchronization signal block to which the present disclosure may apply.

FIG. 2 illustrates a structure of a synchronization signal block to which the present disclosure may apply.

A synchronization signal block (SSB) may include a synchronization signal (SS) and a physical broadcast channel (PBCH). The SS may include a primary SS (PSS) and a secondary SS (SSS), and the PBCH may include a PBCH demodulation reference signal (DMRS) and PBCH data.

Referring to FIG. 2, a single SSB may be defined in units of four OFDM symbols in a time domain and as 240 subcarriers (or REs) in a frequency domain. The PSS may be transmitted in a first symbol and the SSS may be transmitted in a third symbol. The PBCH may be transmitted in second, third, and fourth symbols. In the third symbol, the SSS may be positioned in 127 subcarriers present in the middle, being spaced apart by a guard band from the PBCH and the PBCH may be positioned in low frequency and high frequency directions in remaining subcarriers. In the time domain, the SSB may be transmitted based on a predetermined transmission pattern.

In an initial cell search stage, a UE may perform downlink synchronization with a corresponding base station by detecting the PSS and the SSS included in the SSB transmitted from a base station. Therefore, the UE may receive system information transmitted from the base station through a downlink channel.

Uplink synchronization is required such that the UE may successfully perform uplink transmission to the base station. Although the uplink synchronization is not matched, the UE may attempt the uplink transmission to the base station through a random access procedure and the base station may provide time alignment information (e.g., a timing advance command (TAC) to the corresponding UE based on an uplink signal from the UE.

The time alignment information may be included in a random access response (RAR) or a MAC control element (CE).

Figure 3:
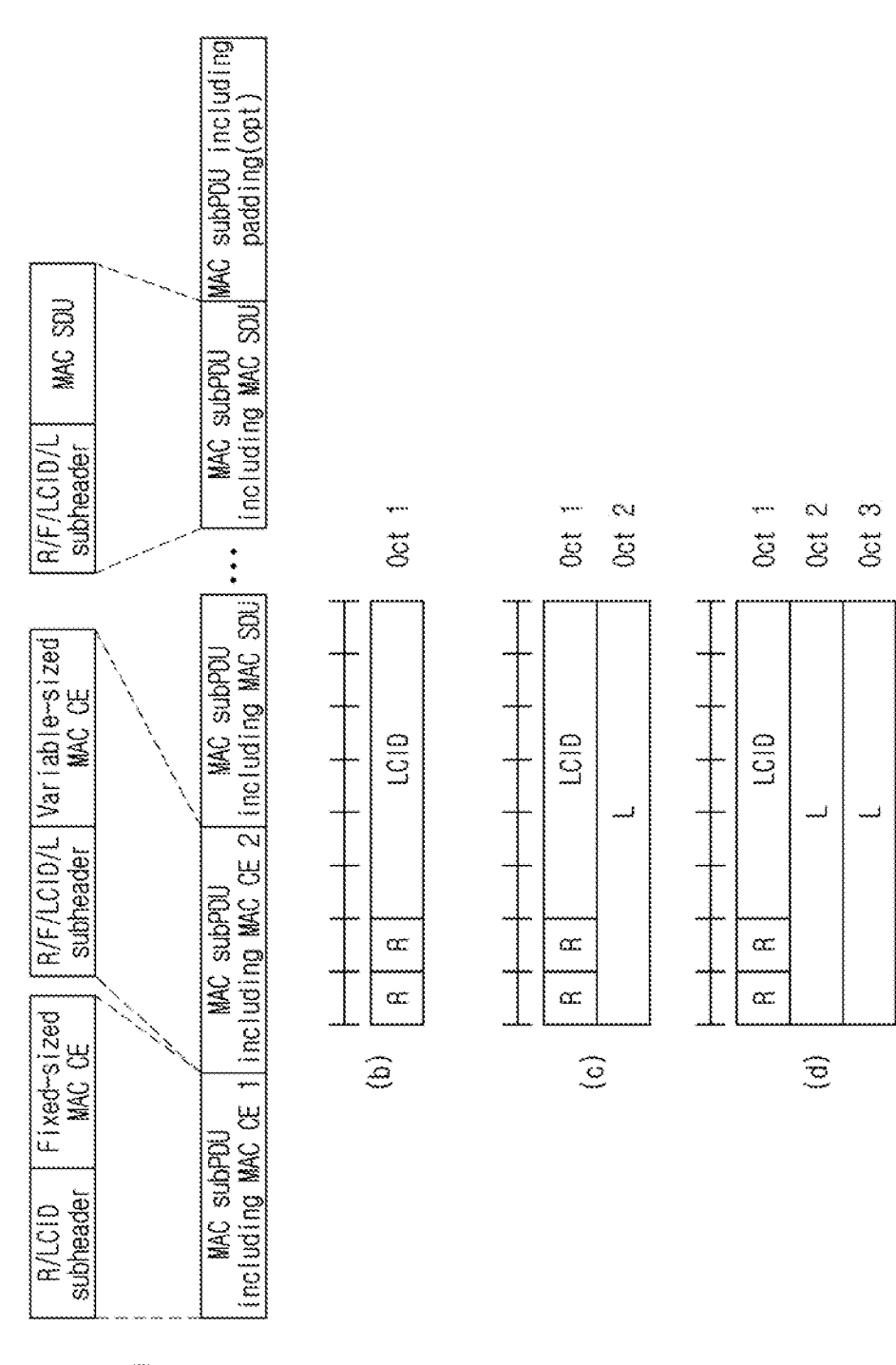
FIG. 3 illustrates a configuration of a medium access control (MAC) protocol data unit (PDU) to which the present disclosure may apply.

FIG. 3 illustrates a configuration of a medium access control (MAC) protocol data unit (PDU) to which the present disclosure may apply.

FIG. 3(a) represents an example in which a single MAC PDU includes at least one MAC subPDU. A single MAC subPDU may include only a MAC subheader, may include a MAC subheader and a MAC service data unit (SDU), may include a MAC subheader and a MAC CE, or may include a MAC subheader and a padding.

(b), (c), and (d) of FIG. 3 illustrate examples of formats of a MAC subheader.

FIG. 3(b) represents a format of a MAC subheader used for a MAC CE, a MAC SDU, and a padding with a fixed length. For example, the format of the MAC subheader may be defined as a 1-octet (or 8 bits) size that includes R and logical channel identifier (LCD) fields. A 1-bit R field represents a reserved field and may have a value of 0. A 6-bit LCID field represents a logical channel identifier field. For example, if a value of the LIDC field is 62, it may represent a TAC in downlink and may represent a UE contention resolution identity (CRII) in uplink.

(c) and (d) of FIG. 3 represents a format of a MAC subheader used for a variable MAC CE and MAC SDU. For example, the format of the MAC subheader may be defined as a 2-octet or 3-octet size that includes R, F, LCID, and L fields. The 1-octet or 2-octet L field may have a value that represents a length of the variable MAC SDU or MAC CE as an octet (or byte) unit. A 1-bit F field may have a value that represents a size of the L field. For example, if a value of the F field is 0, it may represent that the size of the L field is 1 octet and if the value of the F field is 1, it may represent that the size of the L field is 2 octets.

As described above, a single MAC subheader may include a single LCD field, a single L field, and a single F field.

Figure 4:
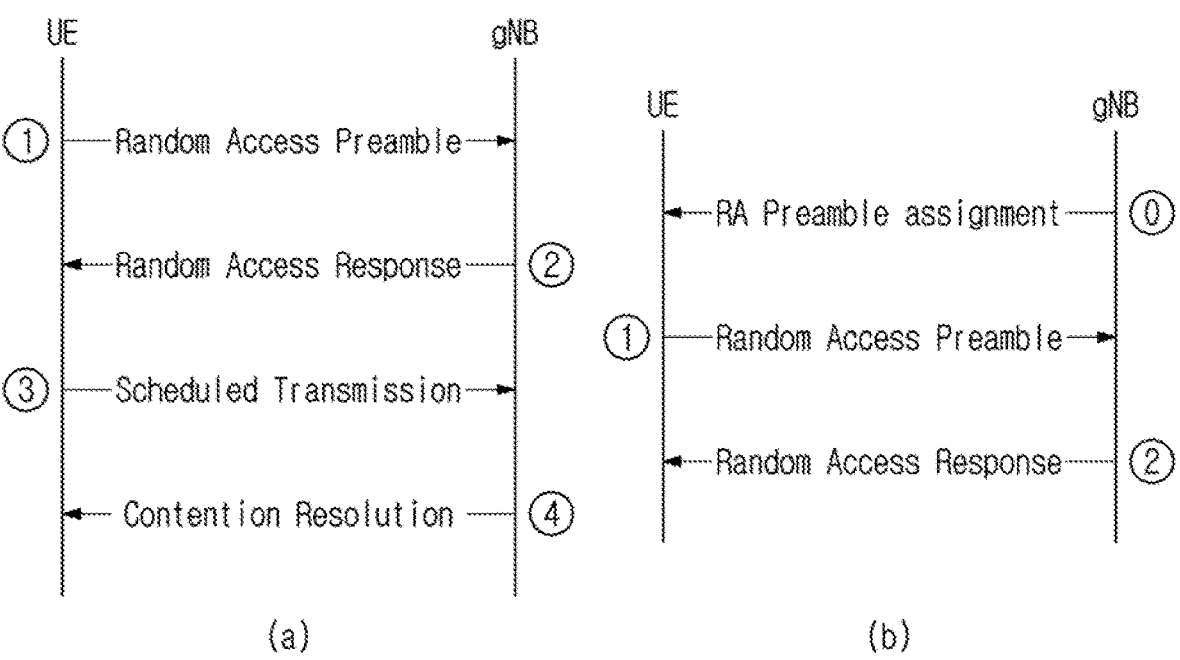
FIG. 4 illustrates a random access procedure to which the present disclosure may apply.

FIG. 4 illustrates a random access procedure to which the present disclosure may apply.

FIG. 4(a) represents a contention-based random access (CBRA) procedure and FIG. 4(b) represents a contention-free random access (CFRA) procedure.

In step 1 of FIG. 4(a), a UE may transmit a random access preamble (or Msg1) to a base station, for example, gNB. The preamble may be randomly selected by the UE from a preamble candidate set indicated through information (e.g., a system information block (SIB) or a dedicated RRC message) provided from the base station. In step 2, the base station may transmit a RAR (or Msg2) to the UE. The RAR may include a timing advance command (TAC) and an uplink (UL) grant (see FIG. 5(a)). In step 3, the UE may perform an uplink transmission (or Msg3 transmission) scheduled by the UL grant that is provided from the base station. In step 4, the base station may transmit a contention resolution message (or Msg4) to the UE. The UE may determine success or failure of a random access through the contention resolution message.

The contention-based random access may include a 4-step method of FIG. 4(a) and a 2-step method. For example, a 2-step contention-based random access procedure may include step A in which the UE transmits information corresponding to Msg1 and Msg3 and step B in which the base station transmits information corresponding to Msg4 (and Msg2). A 2-step RACH method is described below.

Unless indicated otherwise in the following description, any one of the 4-step method and the 2-step method may be applied to the contention-based random access procedure.

In step 0 of FIG. 4(b), the base station may allocate a random access preamble to the UE. Dissimilar to the example in which the UE randomly selects a preamble from the preamble candidate set in the contention-based random access of FIG. 4(a), the UE may transmit a preamble designated by the base station to the base station in step 1 in the contention-free random access of FIG. 4(b). For example, when the UE in an RCC active state performs handover from a serving cell to a target cell, a random access preamble to be transmitted to the target cell may be provided from a network. In step 2, the base station may complete a random access procedure by transmitting a RAR to the UE.

Figure 5:
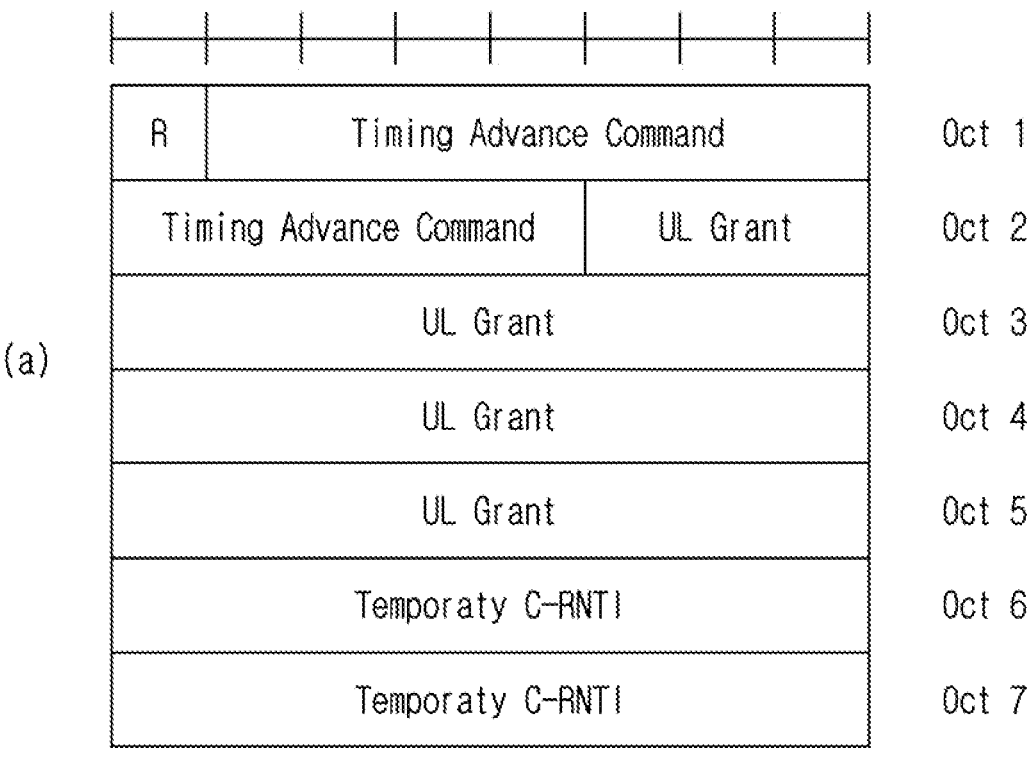
FIG. 5 illustrates an example of a format of a timing advance command to which the present disclosure may apply.

FIG. 5 illustrates an example of a format of a timing advance command to which the present disclosure may apply.

FIG. 5(a) represents an example of a MAC RAR format and FIG. 5(b) represents an example of a MAC CE TAC format.

Referring to FIG. 5(a), a base station that receives a random access preamble from a UE may generate a MAC RAR. A timing advance command (TAC) may correspond to uplink time alignment information derived based on an arrival point in time of the random access preamble received by the base station from the UE. An uplink grant may correspond to resource scheduling information for Msg3 transmission of the UE. A temporary cell (C)-RNTI may represent a temporary identifier according to time and frequency resource locations of the random access preamble. The temporary C-RNTI may be used by the UE for Msg3 transmission and retransmission. Msg4 may be received from the base station by monitoring a cyclic redundancy code (CRC)-scrambled physical downlink control channel (PDCCH) with the temporary C-RNTI. In addition, the MAC RAR may further include a field, such as a backoff indicator (BI), a random access preamble identifier (RAPID), and the like.

Referring to FIG. 5(b), the MAC CE TAC format may include a timing advance group identifier (TAG ID) field and a TAC field. The TAG ID field may include an identifier that indicates a TAG and the TAC field may include a TAC value to be applied by the UE.

A MAC entity may operate a time alignment timer (TAT) for each TAG to determine whether time alignment between the base station and the UE is maintained. The TAT refers to a timer corresponding to a time length (or a time section in which the TAC is assumed to be valid) in which time alignment is maintained in a TAG belonged to by the base station. When the base station transmits the TAC to the UE, the MAC entity of the corresponding UE may initiate the TAT for the TAG indicated by the TAG ID. If a new TAC is received during a TAT operation, the UE may restart the TAT. If the TAT expires or does not operate, the UE may determine that uplink time alignment with the base station is not maintained. When the uplink time alignment is not maintained, the UE may perform an uplink transmission excluding the random access preamble.

In an RRC layer, a value of the TAT may be set to one of 500 ms, 750 ms, 1280 ms, 1920 ms, 2560 ms, 5120 ms, 10240 ms, and infinity through system information (e.g., SIB1). When the UE acquires the system information and then performs a random access procedure, the UE may use the TAT set as above. Also, a network may set the TAT to the UE through another RRC message (e.g., RRC connection reconfiguration message), instead of using the system information.

Figure 6:
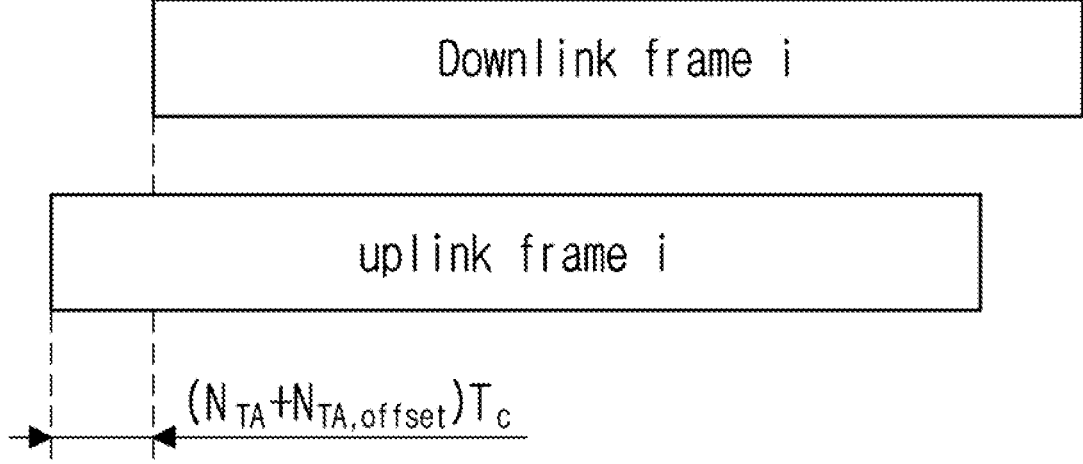
FIG. 6 illustrates an uplink-downlink timing relationship to which the present disclosure may apply.

FIG. 6 illustrates an uplink-downlink timing relationship to which the present disclosure may apply.

In an NR system, a basic unit of a time domain $T_c=1/(\Delta f_{max} \cdot N_f)$, $\Delta f_{max}=480 \cdot 10^3$), and $N_f=4096$. Also, in LTE, a basic unit of the time domain may be $T_s=1/(\Delta f_{ref} \cdot N_{f,ref})$, $\Delta f_{ref}=15 \cdot 10^3$ Hz, and $N_{f,ref}=2048$. The constant for a multiple relationship between an NR time basic unit and an LTE time basic unit may be defined as $\kappa=T_s/T_c=64$.

Referring to FIG. 6, a time structure of a frame (or a radio frame) for a downlink or uplink transmission may include $T_f=(\Delta f_{max}N_f/100) \cdot T_c$. Here, a single frame may include 10 subframes corresponding to $T_{sf}=(\Delta f_{max}N_f/1000) \cdot T_c$. The number of consecutive OFDM symbols per subframe may be $$N_{symb}^{subframe,\mu} = N_{symb}^{slot} N_{slot}^{subframe,\mu}.$$

Also, each frame may be divided into two half frames having the same size. Here, half frame 1 may include 0~4 subframes and half frame 2 may include 5~9 subframes.

Referring to FIG. 6, $N_{TA}$ represents a timing advance (TA) between downlink (DL) and uplink (UL). Here, a transmission timing of uplink transmission frame i is determined based on a downlink reception timing at a UE according to the following Equation 1.

$$T_{TA}=(N_{TA}+N_{TA,offset})T_c \qquad \text{[Equation 1]}$$

In Equation 1, $N_{TA,offset}$ denotes a TA offset value occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time. Also, a default value of $N_{TA,offset}$ may be given as a different value according to a frequency range. For example, a value of $N_{TA,offset}$ may be 25600 in a first frequency range (FR1) less than 6 GHz and may be 13792 in a second frequency range (FR2) of 6 GHz or more (e.g., 23.5 to 53.6 GHz).

$N_{TA}$ may be differently determined according to a TAC provided through the RAR or the MAC CE of FIG. 5.

For example, a 12-bit TAC field provided through the RAR may have a value of 0 to 3846, which may be represented as $T_A$. In this case, $N_{TA}$ may be determined according to the following Equation 2.

$$N_{TA}=T_A \cdot 16 \cdot 64/2^\mu \qquad \text{[Equation 2]}$$

For example, a 6-bit TAC field of a MAC CE format may have a value of 0 to 63, which may be represented as $T_A$. In this case, $N_{TA}$ may be determined according to Equation 3. In Equation 3, $N_{TA}$_old may correspond to a value of $N_{TA}$ previously or currently applied by the UE and $N_{TA}$_new may correspond to a value of $N_{TA}$ newly determined by the UE according to the TAC. A 6-bit TAC may indicate 64 areas (or steps) and the 64 areas may correspond to the range of $-32T_c$ to $32T_c$ at an actual time. That is, if $T_c=0.509$ ns, the time range adjusted by the 6-bit TAC for an actual frame may be $-16.3$ μs to 16.3.

$$N_{TA}\_new=N_{TA}\_old+(T_A-31) \cdot 16 \cdot 64/2^\mu \qquad \text{[Equation 3]}$$

Hereinafter, an RRC state of the UE is described.

Figure 7:
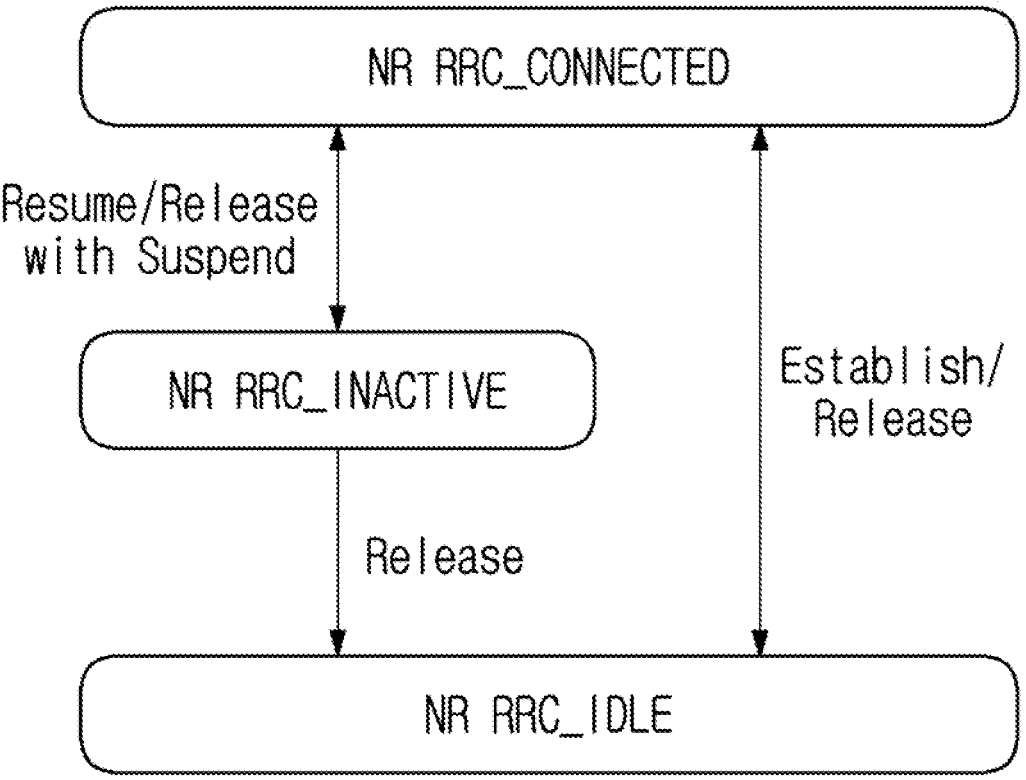
FIG. 7 illustrates an example of a state machine of a user equipment (UE) to which the present disclosure may apply.

FIG. 7 illustrates an example of a state machine of a UE to which the present disclosure may apply.

An RRC layer may perform RRC connection control, system information broadcasting, radio bearer (RB) establish and release, mobility control, and power control. The RRC state of the UE may include a connected state, an inactive state, and an idle state and may be set or controlled by a network.

An RRC connected state represents a state in which authentication and security between the UE and the network is configured and a signaling radio bearer (SRB) and a data radio bearer (DRB) are activated. In the RRC connected state, the following operations may be supported.

The UE may perform a discontinuous reception (DRX) operation according to a DRX cycle set by the network and may reduce a power consumption.

One-to-one communication (i.e., unicast) between the base station and the UE is enabled.

In the case of supporting carrier aggregation (CA), at least one secondary cell (SCell) may be set to a primary cell (PCell) and a bandwidth available by the UE may increase.

In the case of supporting dual connectivity (DC), an additional single secondary cell group (SCG) may be set to a master cell group (MCG) and a bandwidth available by the UE may increase.

The UE may perform functions, such as reception of system information, reception of a paging message, reception of a scheduled data-related control channel, reporting of channel information and state, and measurement reporting (MR).

An RRC inactive state represents a state in which a radio bearer is suspended and the UE may shift from a connected state to an inactive state through the network. That is, the UE may not shift from an idle state to the inactive state and needs to be in the connected state to shift to the inactive state. In the inactive state, each of the network and the UE may quickly shift to the connected state using UE context information stored by each of the network and the UE. That is, if a shift (or RRC resume) from the RRC inactive state to the connected state is triggered, the network may shift to the connected state even without performing a security setup procedure using previous radio configuration and security information of the UE. In the RRC inactive state, the following operations may be supported.

Through a network RRC layer, a DRX cycle may be set to the UE and the UE may perform a DRX operation.

The UE may verify core network (CN) paging using a predetermined identifier (e.g., 5G short-temporary mobile subscriber identity (5G-S-TMSI)) and may receive paging information through a paging channel. Also, the UE may verify a radio access network (RAN) paging using a predetermined identifier (e.g., inactive-RNTI (I-RNTI)) and may receive paging information through a paging channel.

The UE may perform a cell reselection by measuring a signal strength of a neighboring cell and by comparing a signal strength with a serving cell.

To verify whether system information maintained by the UE is valid, the UE may periodically receive the system information.

The UE may shift from the connected state or the inactive state to an RRC idle state according to RRC release and may shift from the RRC idle state to the RRC connected state according to RRC establish. The UE in the idle state may verify DCI transmitted through a corresponding PDCCH and may verify a paging channel having 5G-S-TMSI by monitoring CRC-scrambled PDCCH with paging (P)-RNTI. Also, the UE in the idle state may measure a signal strength of a neighboring cell for a cell reselection.

The UE in the idle state or the inactive state may perform a public land mobile network (PLMN) selection, cell (re) selection, location update (e.g., TAU or RNAU), and the like.

An access stratum (AS) may select (reselect) a cell to camp on based on a PLMN provided from a non-access stratum (NAS). The UE may perform PLMN discovery at regular intervals and may camp on a cell with a better condition than that of the serving cell. For example, if the UE is out of coverage of a registered PLMN (or a serving cell), a new PLMN may be automatically selected (i.e., an automatic mode), or a designated PLMN may be selected (i.e., a manual mode).

Also, location update for UE mobility management may be performed based on a unit of a tracking area (TA) or a RAN-based notification area (RNA). The UE may verify a tracking area identifier (TAI) and, when the UE moves to a TA different from a TA to which a previously camped-on cell belongs, the UE may perform TA update (TAU). Also, when the UE moves to an RNA different from a previous RNA, the UE may perform RNA update (RNAU). Meanwhile, in the RRC connected state, UE mobility may be controlled based on network handover.

Also, in the NR system, an RRC inactive UE may represent a UE in a state in which radio resource control (RRC) connection is temporarily suspended. That is, it may represent a state in which a radio bearer (RB) is suspended. Here, the radio bearer may represent a data radio bearer for data signal transmission and a signaling radio bearer for control signal transmission. The UE in the RRC connected state may shift to the inactive state in response to receiving an RRC release message. Here, the RRC release message may include at least one of suspension information, a UE identity number (I-RNTI), a paging period, and RNAU period information. Here, in response to occurrence of a mobile-originated (MO) message, the UE may perform uplink synchronization through a random access and may transmit an RRC resume request to the network.

Also, in response to occurrence of a mobile-terminated (MT) message in the network, the network may indicate the UE to transmit an RRC resume request through a paging message. Also, the RRC resume request may be performed for RNAU or may be performed in consideration of another situation. Here, when the network receives the RRC resume request, a message and a subsequent procedure responding to the UE may differ based on a resume reason, presence or absence of UE information, and RNA information. For example, when UE information is unverifiable in the network, bearer and security setup may be performed through an RRC establish process. Also, when the RRC resume reason is mobile-originated or mobile-terminated and UE information is present, a network response message may be the RRC resume message. In contrast, when the RRC resume reason is RNAU, the network response message may be the RRC release message.

Also, for example, a random access channel occasion (RO) may represent a resource space in which the UE may perform a random access (RA). Here, a resource may include a time axis and a frequency axis in accordance with numerology. Also, a plurality of SSBs (synchronization signal and PBCH blocks) may be associated with a RO by a method designated by the base station and an association pattern may be repeated every specific period. The UE may select a suitable SSB and may randomly select a resource for random access from among a plurality of ROs associated with the SSB. Here, in the case of a contention-based random access, the UE may randomly select a single preamble from among preambles included in a RO. On the contrary, in the case of a contention-free-based random access, the UE may select a preamble designated by the base station and may perform a random access.

Here, for example, the UE may determine a location at which a rando access preamble transmission is possible in a time domain based on information element "prach-Configu-rationIndex" configured in an upper layer. The UE may verify information on a PRACH configuration through a system information block (SIB). Through this, the UE may know the number of PRACH slots that are configured in a specific symbol from a specific frame number. Also, the UE may verify the number of RACH occasions (ROs) that are present per PRACH slot. Also, the UE may verify a location of a resource for transmission in a frequency domain through information element "msg1-FrequencyStart". Also, the UE may verify the number of PRACH frequency resources through information element "msg1-FDM".

Figure 8:
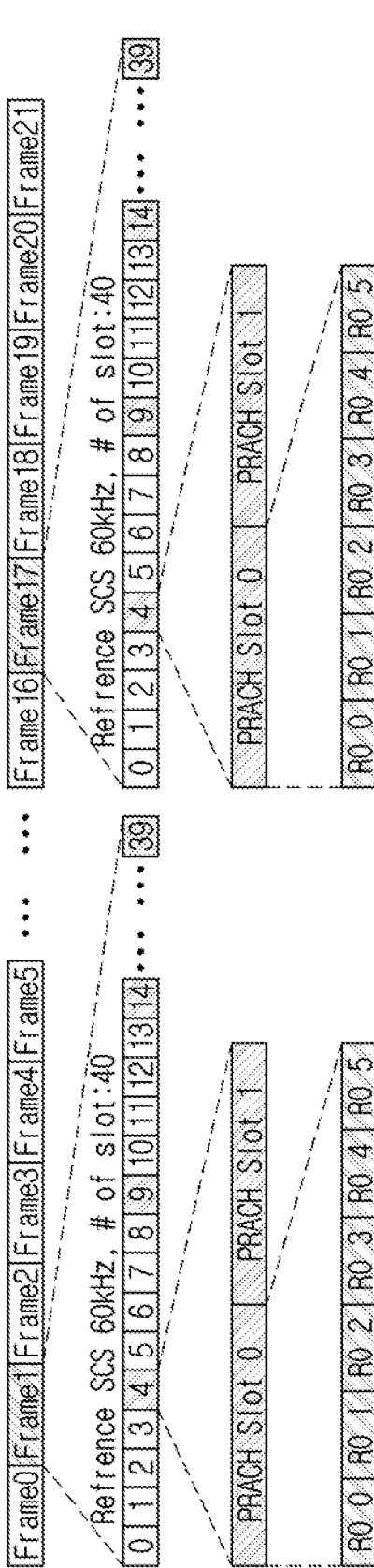
FIG. 8 illustrates a method of configuring a PRACH based on a PRACH configuration index according to the present disclosure.

FIG. 8 illustrates a method of configuring a PRACH based on a PRACH configuration index according to the present disclosure.

For example, Table 2 shows a case in which a PRACH configuration index is 0 in FR2 (24250 MHz-52600 MHz). Here, a preamble format may include long preambles (0, 1, 2, and 3) having 839 sequences and short preambles (A1, A2, A3, B1, B2, B3, B4, C0, and C2) having 139 sequences. Also, "n_SFN mod x=y" may indicate a frame number in which a PRACH slot is present. In detail, the PRACH slot may be present in a frame number that satisfies a y value within an x period. For example, according to the following Table 2, the PRACH slot may be configured in frames 1, 17, 34, . . . Here, a slot number represents a number in which the PRACH slot is configured within a frame that satisfies "n_SFN mod x=y". For example, the PRACH slot may be configured in a slot corresponding to a slot number within frames 1, 17, 34,1. Also, a starting symbol represents an OFDM symbol number when the PRACH slot is configured based on the slot number. Also, the "number of PRACH slots within a 60 kHz slot" may represent the number of PRACH slots configured within the slot number. Also, the "number of time-domain PRACH occasion within a PRACH slot" may represent the number of ROs within a single PRACH slot. Also, a, PRACH duration may represent the number of OFDM symbols occupied by the preamble format.

Here, for example, FIG. 8 illustrates a PRACH configu-ration when a PRACH configuration index is 0 based on the following Table 2. Here, as described above, a frame in which the PRACH configuration is set by "n_SFN mod x=y" may be determined. Since x=16 and y=1, the PRACH configuration may be set in frame 1 and frame 17. Also, as described above, the PRACH slot may be configured based on the slot number and slots 4, 9, 14, 24 . . . 39 may be configured as PRACH slots. Also, as described above, the number of PRACH slots within the slot may be determined based on the "number of PRACH slots within a 60 kHz slot" and two PRACH slots, PRACH slot 0 and PRACH slot 1, may be configured based on the following Table 2. Also, the number of ROs within the PRACH slot based on the "number of time-domain PRACH occasion within a PRACH slot" and six ROs may be configured based on the following Table 2.

Here, Table 2 and FIG. 8 are provided as an example only in which PRACH is configured based on a PRACH con-figuration index and the PRACH configuration index may be differently set. That is, the PRACH may be configured based on the same method even for a different PRACH configu-ration index and is not limited to the aforementioned example.

TABLE 2

| PRACH Config. Index | Preamble format | $n_{SFN} \bmod x = y$ | | Slot number | Starting symbol | Number of PRACH slots within a 60 kHz slot | $N_t^{RA, slot}$, number of time-domain PRACH occasion within a PRACH slot | PRACH duration |
|---|---|---|---|---|---|---|---|---|
| | | x | y | | | | | |
| 0 | A1 | 16 | 1 | 4, 9, 14, 19, 24, 29, 34, 39 | 0 | 2 | 6 | 2 |

Figure 9:
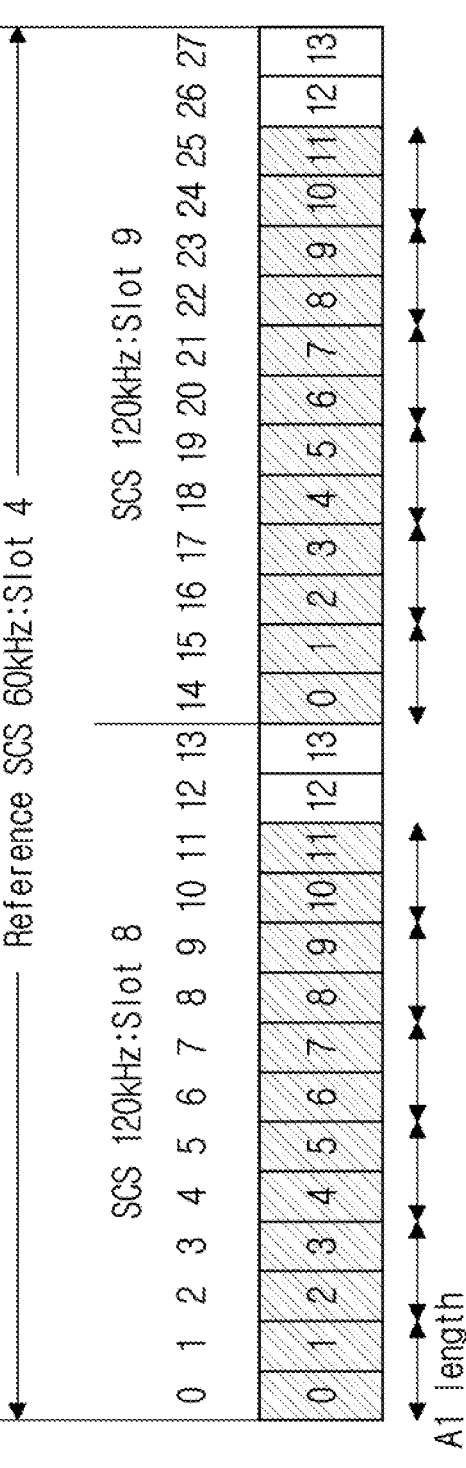
FIG. 9 illustrates an orthogonal frequency division multiplexing (OFDM) symbol configured in a PRACH slot according to the present disclosure.

FIG. 9 illustrates an OFDM symbol configured in a PRACH slot according to the present disclosure. For example, referring to FIG. 9, a RO may be configured in the PRACH slot. Here, an OFDM symbol number and an OFDM symbol in which the RO is configured may be derived according to the following Equation 4. Here, $l_0$ denotes a start location of a symbol and $$n_t^{RA}$$

denotes a numbers from 0 to $$N_t^{RA,Slot}.$$

For example, based on the above Table 2, if "PRACH Configuration Index=0", $$n_t^{RA} = \{0, 1, 2, 3, 4, 5\}.$$

Here, for example, a reference subcarrier spacing of a PRACH configuration table may be 60 kHz or 15 kHz. That is, a slot number may be determined based on 60 kHz or 15 kHz. Here, the symbol number needs to be allocated according to a subcarrier spacing. Therefore, if subcarrier spacing=15 kHz, 60 kHz, $$n_{slot}^{RA} = 0$$

and if subcarrier spacing=30 kHz, 120 kHz, $$n_{slot}^{RA} = \{0, 1\}$$

and the PRACH slot may be configured in a subsequent slot. For example, FIG. 9 represents a case in which, if PRACH configuration index=0 and subcarrier spacing=120 kHz, ROs are configured in symbol numbers, 2, 4, 6, 8, 10, 14, 16, 18, 20, 22, and 24, based on Equation 4.

$$\text{Start symbol number } (l) = l_0 + n_r^{RA} N_{dur}^{RA} + 14 n_{slot}^{RA} \qquad \text{[Equation 4]}$$

Where SCS: 125, 5, 15, 60 kHz: $n_{slot}^{RA} = 0$, SCS: 30, 120 kHz: $n_{slot}^{RA} = \{0, 1\}$ Where SCS:1.25,5,15,60 kHz:$n_{slot}^{RA}$=0,SCS:30, 120 kHz: $n_{slot}^{RA}$={0,1}

Figure 10:
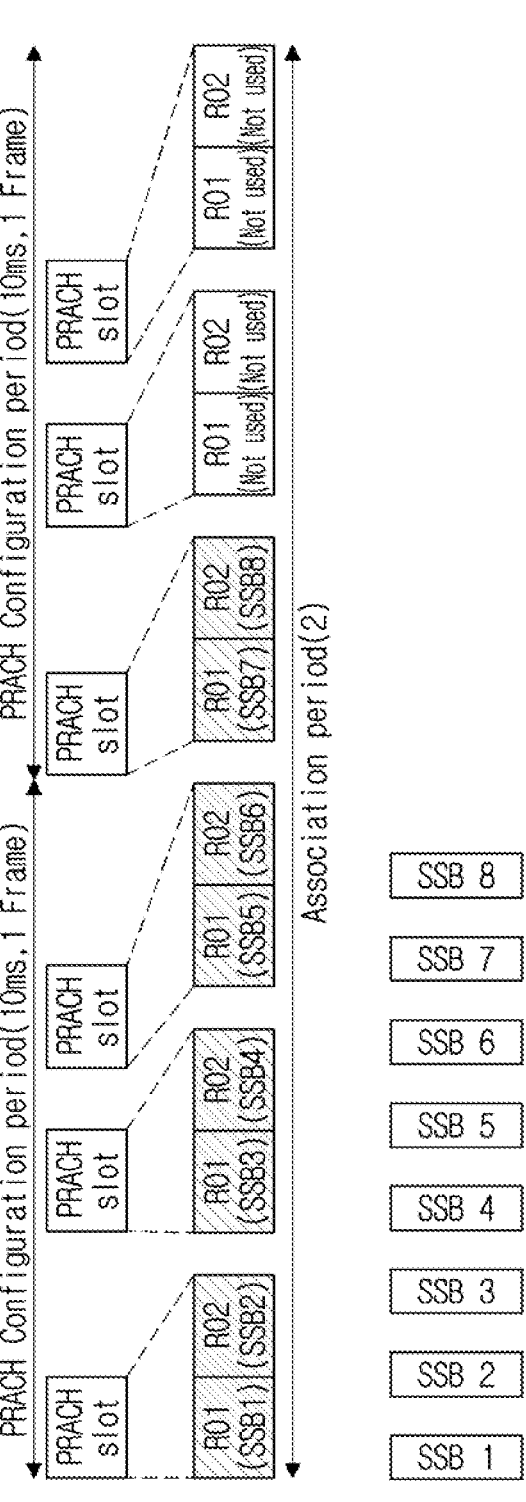
FIG. 10 illustrates a PRACH configuration period to which the present disclosure may apply.

FIG. 10 illustrates a PRACH configuration period to which the present disclosure may apply. Referring to FIG. 10, the PRACH configuration period may be set. Here, for example, FIG. 10 illustrates a PRACH configuration in which three PRACH slots each having two ROs within 10 ms are present and here, the period is 10 m. However, it is provided as an example only and another PRACH configuration period may be set.

Here, for example, an association between a valid SSB and a RO may be indicated by an upper layer parameter. For example, FIG. 10 illustrates a case in which the RO and the valid SSP have a one-to-one association relationship, it is provided as an example only. Also, since the number of PRACH configuration periods in which a valid SSB and a valid RO are associated at least once is two, an association period may be 2. Here, in a second PRACH configuration period, a RO unassociated with an SSB may not be used. For example, in the above Table 2, an x value may correspond to the PRACH configuration period of the following Table 3. Also, the association period of the following Table 3 may represent the number of PRACH configuration periods in which the valid SSB and the valid RO are associated at least once. That is, Table 3 shows a set of association periods applicable per PRACH configuration period.

TABLE 3

| PRACH Configuration period (msec) | Association period (number of PRACH Configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

Figure 11:
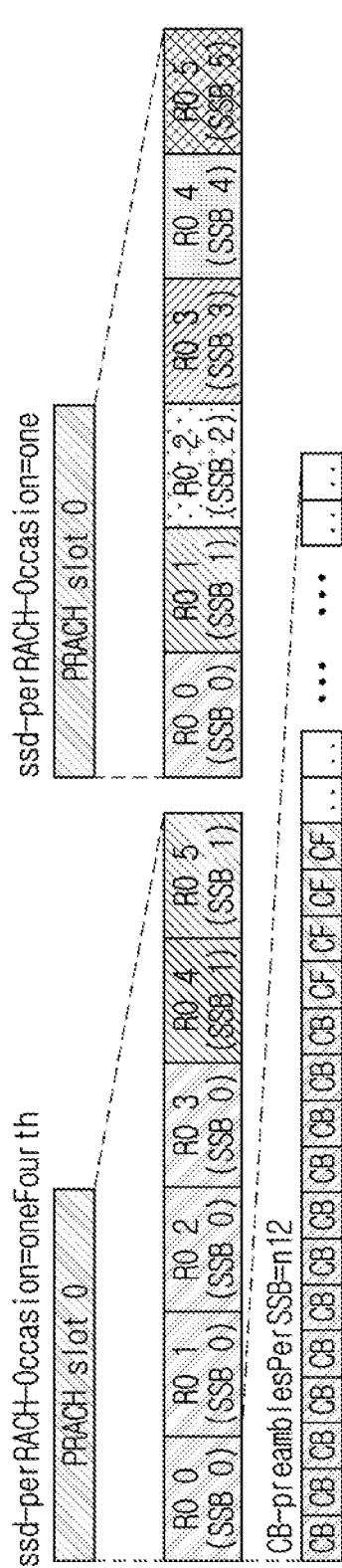
FIG. 11 illustrates a RACH preamble configuration method to which the present disclosure may apply.

FIG. 11 illustrates a RACH preamble configuration method to which the present disclosure may apply. A UE may receive a system information block (SIB) that includes the following Table 4 from a base station and, through this, may acquire an information element for a random access channel (RACH). Here, for example, the RACH may be the 4-step RACH of FIG. 4. Here, the SIB received by the UE may include information on "totalNumberofRA-Preambles". Here, "totalNumberofRA-Preambles" denotes the number of preambles available for contention-based random access (CBRA) and contention-free random access (CFRA) excluding a preamble allocated for an SI request.

For example, if a value of "totalNumberofRA-Preambles" is absent, the UE may use all of 64 preambles for RA. Also, the SIB received by the UE may include information on "ssb-perRACH-OccasionAndCB-PreamblesPerSSB". Here, "ssb-perRACH-OccasionAndCB-PreamblesPerSSB" may have two meanings. For example, in the following Table 4, "oneEight(⅛), oneFourth(¼), oneHalf(½), one(1), two 2), four(4), eight(8), and sixteen(16)" may denote N, the number of SSBs per RO, and "ENUMERATED" according thereto may denote R, the number of CB preambles per SSB.

TABLE 4

```
-- ASN1START
-- TAG-RACH-CONFIGCOMMON-START
RACH-ConfigCommon ::=                       SEQUENCE {
  rach-ConfigGeneric                        RACH-ConfigGeneric,
  totalNumberOfRA-Preambles                 INTEGER (1..63)
OPTIONAL, -- Need S
  ssb-perRACH-OccasionAndCB-PreamblesPerSSB          CHOICE {
    oneEighth                                        ENUMERATED
{n4,n8,n12,n16,n20,n24,n28,n32,n36,n40,n44,n48,n52,n56,n60,n64},
    oneFourth                                        ENUMERATED
{n4,n8,n12,n16,n20,n24,n28,n32,n36,n40,n44,n48,n52,n56,n60,n64},
    oneHalf                                          ENUMERATED
{n4,n8,n12,n16,n20,n24,n28,n32,n36,n40,n44,n48,n52,n56,n60,n64},
    one                                              ENUMERATED
{n4,n8,n12,n16,n20,n24,n28,n32,n36,n40,n44,n48,n52,n56,n60,n64},
    two                                              ENUMERATED
{n4,n8,n12,n16,n20,n24,n28,n32},
    four                                             INTEGER (1..16),
    eight                                            INTEGER (1..8),
    sixteen                                          INTEGER (1..4)
  }
OPTIONAL, -- Need M
  groupBconfigured                          SEQUENCE {
    ra-Msg3SizeGroupA                         ENUMERATED {b56,
b144, b208, b256, b282, b480, b640,
                                                b800, b1000,
b72, spare6, spare5,spare4, spare3, spare2, spare1},
    messagePowerOffsetGroupB                  ENUMERATED
{ minusinfinity, dB0, dB5, dB8, dB10, dB12, dB15, dB18},
    numberOfRA-PreamblesGroupA                INTEGER (1..64)
  }
OPTIONAL, -- Need R
  ra-ContentionResolutionTimer              ENUMERATED { sf8, sf16,
sf24, sf32, sf40, sf48, sf56, sf64},
  rsrp-ThresholdSSB                         RSRP-Range
OPTIONAL, -- Need R
  rsrp-ThresholdSSB-SUL                     RSRP-Range
OPTIONAL, -- Cond SUL
  prach-RootSequenceIndex                   CHOICE {
    l839                                      INTEGER (0..837),
    l139                                      INTEGER (0..137)
  },
  msg1-SubcarrierSpacing                    SubcarrierSpacing
OPTIONAL, -- Cond L139
  restrictedSetConfig                       ENUMERATED
{unrestrictedSet, restrictedSetTypeA, restrictedSetTypeB},
  msg3-transformPrecoder                    ENUMERATED {enabled}
OPTIONAL, -- Need R
  ...
}
-- TAG-RACH-CONFIGCOMMON-STOP
-- ASN1STOP
```

For example, in the case of "oneEight", a single SSB may be mapped to eight ROs. In the case of "eight (8)", eight SSBs may be mapped to a single RO. Here, in "ENUMERATED", n4 may represent that four CB preambles are present per SSB.

Also, for example, if "ssb-perRACH-Occasion"="sixteen (16)", the number of CB preambles available for a single SSB may be 1 to 4. Here, if the number of CB preambles is set to 4, it may represent that all of 64 preambles are used for CB. That is, the UE may perform an SSB-to-RO association according to N and R. Here, if N<1, the SSB may be associated with 1/N consecutive ROs and the number of CB preambles corresponding to R starting from preamble number 0 may be allocated.

Also, if N>1, R CB preambles may be allocated from a start number of related SSB n according to Equation 5. In addition, system information may include at least one of a parameter for group B, a timer for contention resolution, SSB RSRP, RootSequenceIndex for determining a PRACH sequence, and subcarrier spacing information.

$$\text{Preamble start index} = \frac{n \cdot N_{Preamble}^{Total}}{N}, \qquad \text{[Equation 5]}$$

$$\text{where } n{:}0 \leq n \leq N-1, N_{Preamble}^{Total} = \text{multiple of } N$$

In detail, for example, referring to FIG. 11, association between the SSB and the RO may be verified. Here, if "ssb-perRACH-Occasion=oneFourth", it may represent that a single SSB is associated with four ROs. Also, "CB-PreamblesPerSSB=n12" may represent that 12 preambles are used for contention-based preamble. Therefore, in the figure, if "ssb-perRACH-Occasion=oneFourth", SSB0 may be associated with RO 0, RO 1, RO 2, and RO 3. Here, 12 contention-based preambles (CBs) may be configured in each RO. Also, for example, if "ssb-perRACH-Occasion=one", a single RO may be associated with a single SSB. Also, the number of contention-based preambles may be determined according to "CB-PreamblesSSB", which is described above. Also, FIG. 11 is provided as an example only and another configuration is also possible.

FIG. 12 illustrates a preamble configuration method to which the present disclosure may apply.

Referring to FIG. 12(*a*), as described above, a RO may be included in a PRACH slot. Here, FIG. 12(*b*) may represent a case in which "totalNumberofRA-Preambles" is 10, two SSBs are associated for each RO, and the number of contention-based preambles is set to 4. However, it is provided as an example only. A preamble start number may be assigned for each SSB based on the number of available preambles for each RO, parameter $$\text{"totalNumberofRA-Preambles } (N_{Preamble}^{Total})\text{"},$$

and the number of SSBs for each SSB. Therefore, a preamble start number of SSB0 may be 0 and a preamble start number of SSB1 may be 5. Here, the number of contention-based preambles corresponding to "CB-PreamblePerSSB" may be allocated from the start preamble number per SSB. For example, in FIG. 12(*b*), "0B" denotes a contention-based preamble for SSB0 and "0" denotes a contention-free preamble of SSB0. That is, a single preamble (non-CB) not allocated as a contention-based preamble to a corresponding SSB may be used for a contention-free preamble or a 2-step random access.

Here, FIG. 12(*c*) may represent a case in which "total-NumberofRA-Preambles" is 12, two SSBs are associated for each RO, and the number of contention-based preambles is 4. However, it is provided as an example only. Here, a preamble start number may be assigned for each SSB based on the number of preambles available for each RO, parameter $$\text{"totalNumberofRA-Preambles } (N_{Preamble}^{Total})\text{"},$$

and the number of SSBs for each RO. Therefore, a preamble start number of SSB0 may be 0 and a preamble start number of SSB1 may be 6. Here, the number of contention-based preambles corresponding to "CB-PreamblePerSSB" may be allocated from the start preamble number per SSB. For example, in FIG. 12(*c*), "0B" denotes a contention-based preamble for SSB0 and "0" denotes a contention-free preamble of SSB0. That is, a single preamble (non-CB) not allocated as a contention-based preamble to a corresponding SSB may be used for a contention-free preamble or a 2-step random access.

Also, FIG. 12(*d*) may represent a case in which "total-NumberofRA-Preambles" is 20, two SSBs are associated for each RO, and the number of contention-based preambles is 8. However, it is provided as an example only. Here, a preamble start number may be assigned for each SSB based on the number of preambles available per RO, parameter $$\text{"totalNumberofRA-Preambles } (N_{Preamble}^{Total})\text{"},$$

and the number of SSBs per RO. Therefore, a preamble start number of SSB0 may be 0 and a preamble start number of SSB1 may be 10. Here, the number of contention-based preambles corresponding to "CB-PreamblePerSSB" may be allocated from a start preamble number per SSB. For example, in FIG. 12(*d*), "0B" denotes a contention-based preamble for SSB0 and "0" denotes a contention-free preamble of SSB0. That is, a single preamble (non-CB) not allocated as a contention-based preamble to a corresponding SSB may be used for a contention-free preamble or a 2-step random access.

Also, for example, the following Table 5 may show an information element for 2-step RACH. Here, when the 2-step RACH and a 4-step RACH are simultaneously configured in a bandwidth part (BWP), "msgA-SSB-PerRACH-OccasionAndCB-PreamblesPerSSB-r16" of the following Table 5 may be omitted. On the contrary, if an information element for the 4-step RACH is absent, information "msgA-SSB-PerRACH-OccasionAndCB-PreamblesPerSSB-r16" may need to be present.

Also, in the case of simultaneously using the 4-step RACH and RO, "msgA-CB-PreamblesPerSSB-PerShare-dRO-r16" may denote the number of CB preambles for the 2-step RACH. Here, the number of CB preambles for the 2-step RACH may be used to determine the number of preambles for the 2-step RACH among preambles allocated for CFRA in the 4-step RACH. Here, the number of 2-step RACH CB preambles may not exceed a value acquired by subtracting the CBRA of the 4-step RACH from the number of preambles of SSB. Here, "msgA-SSB-SharedRO-Mas-kIndex-r16" may denote a number of a RO shared by the 4-step RACH and the 2-step RACH, which may be represented as the following Table 6.

TABLE 5

| | |
|---|---|
| -- ASN1START | |
| -- TAG-RACH-CONFIGCOMMONTWOSTEPRA-START | |
| RACH-ConfigCommonTwoStepRA-r16 ::= | SEQUENCE |
| { | |
| rach-ConfigGenericTwoStepRA-r16 | RACH- |
| ConfigCommonTwoStepRA-r16, | |
| msgA-TotalNumberOfRA-Preambles-r16 | |
| INTEGER (1..63) | OPTIONAL, -- |
| Need S | |
| msgA-SSB-PerRACH-OccasionAndCB-PreamblesPerSSB-r16 | |
| CHOICE { | |
| oneEighth | |
| ENUMERATED | |
| {n4,n8,n12,n16,n20,n24,n28,n32,n36,n40,n44,n48,n52,n56,n60,n64}, | |
| oneFourth | |
| ENUMERATED | |
| {n4,n8,n12,n16,n20,n24,n28,n32,n36,n40,n44,n48,n52,n56,n60,n64}, | |
| oneHalf | |
| ENUMERATED | |
| {n4,n8,n12,n16,n20,n24,n28,n32,n36,n40,n44,n48,n52,n56,n60,n64}, | |
| one | |

TABLE 5-continued

```
ENUMERATED
{n4,n8,n12,n16,n20,n24,n28,n32,n36,n40,n44,n48,n52,n56,n60,n64},
    two
ENUMERATED {n4,n8,n12,n16,n20,n24,n28,n32},
    four
INTEGER(1..16),
    eight
INTEGER (1..8),
    sixteen
INTEGER (1..4)
    }
OPTIONAL, -- Cond 2StepOnly
    msgA-CB-PreamblesPerSSB-PerSharedRO-r16
INTEGER (1..60)                                          OPTIONAL, --
Cond SharedRO
    msgA-SSB-SharedRO-MaskIndex-r16
INTEGER (1..15)                                          OPTIONAL, --
Need S
    groupB-ConfiguredTwoStepRA-r16                          GroupB-
ConfiguredTwoStepRA-r16                          OPTIONAL, -- Need S
    msgA-PRACH-RootSequenceIndex-r16                          CHOICE
{
    l839
INTEGER (0..837),
    l139
INTEGER (0..137)
    }
OPTIONAL, -- Cond 2StepOnly
    msgA-RSRP-Threshold-r16                          RSRP-
Range                          OPTIONAL, -- Cond
2Step4Step
    msgA-RSRP-ThresholdSUL-r16                          RSRP-
Range                          OPTIONAL, -- Cond
2StepSUL
    msgA-RSRP-ThresholdSSB-r16                          RSRP-
Range                          OPTIONAL, -- Need S
    msgA-RSRP-ThresholdSSB-SUL-r16                          RSRP-
Range                          OPTIONAL, -- Cond
2StepSUL
    msgA-SubcarrierSpacing-r16
SubcarrierSpacing                          OPTIONAL, --
Cond 2StepOnlyL139
    msgA-RestrictedSetConfig-r16
ENUMERATED {unrestrictedSet, restrictedSetTypeA,
restrictedSetTypeB}                          OPTIONAL, -- Cond 2StepOnly
    ra-PrioritizationForAccessIdentityTwoStep-r16                          SEQUENCE {
    ra-Prioritization-r16                          RA-
Prioritization                          OPTIONAL, -- Need M
    ra-PrioritizationForAI-r16                          BIT
STRING (SIZE (2))                          OPTIONAL -- Need M
    }
OPTIONAL, -- Need R
    ra-ContentionResolutionTimer-r16
ENUMERATED {sf8, sf16, sf24, sf32, sf40, sf48, sf56, sf64} OPTIONAL, --
Cond 2StepOnly
    ...
    }
}
GroupB-ConfiguredTwoStepRA-r16 ::=
SEQUENCE {
    ra-MsgA-SizeGroupA
ENUMERATED {b56, b144, b208, b256, b282, b480, b640, b800,
b1000, b72, spare6, spare5, spare4, spare3, spare2, spare1}                          OPTIONAL, --
Need M
    messagePowerOffsetGroupB
ENUMERATED {minusinfinity, dB0, dB5, dB8, dB10, dB12, dB15, dB18}
OPTIONAL, -- Need M
    numberofRA-PreamblesGroupA
INTEGER (1..64)
}
-- TAG-RACH-CONFIGCOMMONTWOSTEPRA-STOP
-- ASN1STOP
```

TABLE 6

| PRACH Mask Index | Allowed PRACH Occasion(s) of SSB |
|---|---|
| 0 | All |
| 1~8 | PRACH Occasion index 1~8 |
| 9 | Every even PRACH Occasion |
| 10 | Every odd PRACH Occasion |

FIGS. 13 and 14 illustrate a 2-step RACH preamble to which the present disclosure may apply. Referring to FIG. 13(a), a 4-step RACH configuration may include total 16 preambles based on a 4-step parameter, two SSBs per RO (ssb-perRACH-Occasion), and four CB preambles per SSB (CB-PreamblePerSSB). However, it is provided as an example only and the present disclosure is not limited to the aforementioned example. Additionally, a scenario of sharing the same RO as the 4-step RACH in information element "RACH-ConfigCommonTwostepRA" may be considered, but the present disclosure is not limited thereto. Here, a 2-step RACH CBRA preamble may be configured by a value of "msgA-CB-PreamblesPerSSB-PerSharedRO-r16" within a preamble (non-CB) not allocated for the 4-step RACH CBRA.

Here, referring to FIG. 13(b), two 2-step RACH CB preambles may be allocated based on a 2-step RACH information element for the CF preamble allocated in FIG. 13(a). However, it is provided as an example only and a different configuration is also possible.

Also, for example, FIG. 14 may represent a case in which the number of SSBs per RO is ½, that is, may represent a case in which two ROs are associated with an SSB. Therefore, in FIG. 14, the same SSB may be associated with RO1 and RO2. Referring to FIG. 14(a), a case in which the number of preambles is 12 and the number of 4-step RACH contention-based preambles is eight may be considered. Also, referring to FIG. 14(b), a case in which 2-step RACH information element "msgA-CB-PreamblePerSSB-PerSharedRO-r16" is set to 2 may be considered. Here, for four preambles configured as CF preambles in the 4-step RACH, the 2-step RACH CB preamble may be configured in RO1. Here, when "msgA-SSB-SharedRO-MaskIndex-r16" is set to 1 or 10 based on the above Table 6, the 4-step RACH preamble and the 2-step RACH preamble may not be shared in RO2. However, it is provided as an example only and the present disclosure is not limited to the aforementioned example.

Also, for example, in the case of the 2-step RACH, Msg A transmission may include a physical uplink shared channel (PUSCH) associated with a preamble. Description related thereto is made below. Here, for example, the following Table 7 may show an information element for Msg A PUSCH configuration. Here, information on at least one of a location in terms of time and frequency for a PUSCH resource configuration for each number of groups, the number of PUSCH occasions, a guard band and time, DMRS information, and MCS may be included. Here, to associate at least one preamble within a PRACH slot with a PUSCH occasion (PO) associated with a DMRS, the UE may configure a PUSCH resource according to PUSCH resource configuration information. Here, to associate a valid PUSCH with a preamble within a valid RO, the UE may derive $N_{preamble}$. Here, $N_{preamble}$ may be represented as the following Equation 6.

$$N_{preamble} = \mathrm{ceil}(T_{preamble}/T_{PUSCH}) \quad \text{[Equation 6]}$$

In Equation 6, $T_{preamble}$ denotes a total number of valid ROs within an association pattern period. Also, $T_{PUSCH}$ denotes a value acquired by multiplying a total number of valid POs within the association pattern period by the DMRS. Therefore, for preambles having $N_{preamble}$ within ROs within a PRACH slot, numbers may be assigned in order of RO multiplexed by a frequency axis and RO multiplexed by a time axis. Here, the number of consecutive preambles $N_{preamble}$ for each valid RO within the PRACH slot may be associated in order of PO frequency resource identity value ($f_{id}$), DMRS port resource, DMRS sequence resource, time resource identity value ($t_{id}$), and PUSCH slot ($N_s$).

TABLE 7

| | |
|---|---|
| -- ASN1START | |
| -- TAG-MSGA-PUSCH-CONFIG-START | |
| MsgA-PUSCH-Config-r16 ::= | SEQUENCE { |
| msgA-PUSCH-ResourceList-r16 | SEQUENCE |
| (SIZE(1..2)) OF MsgA-PUSCH-Resource-r16 | OPTIONAL, -- |
| Cond InitialBWPConfig | |
| msgA-TransmformPrecoder-r16 | ENUMERATED |
| {enabled, disabled} | OPTIONAL, -- Need |
| S | |
| msgA-DataScramblingIndex-r16 | INTEGER |
| (0..1023) | OPTIONAL, -- |
| Need S | |
| msgA-DeltaPreamble-r16 | INTEGER (- |
| 1..6) | OPTIONAL -- |
| Need S | |
| } | |
| MsgA-PUSCH-Resource-r16 ::= | SEQUENCE { |
| msgA-PUSCH-PreambleGroup-r16 | |
| ENUMERATED {groupA, groupB} | |
| OPTIONAL, -- Need S | |
| msgA-MCS-r16 | INTEGER |
| (0..15), | |
| nrofSlotsMsgA-PUSCH-r16 | INTEGER (1..4), |
| nrofMsgA-PO-PerSlot-r16 | ENUMERATED |
| {one, two, three, six}, | |
| msgA-PUSCH-TimeDomainOffset-r16 | INTEGER |
| (1..32), | |
| msgA-PUSCH-TimeDomainAllocation-r16 | INTEGER |
| (1..maxNrofUL-Allocations) | OPTIONAL, -- |
| Need S | |
| startSymbolAndLengthMsgA-PO-r16 | INTEGER |
| (0..127) | OPTIONAL, -- |
| Need S | |
| mappingTypeMsgA-PUSCH-r16 | |
| ENUMERATED {typeA, typeB} | |
| OPTIONAL, -- Need S | |
| guardPeriodMsgA-PUSCH-r16 | INTEGER (0..3) |
| OPTIONAL, -- Need R | |
| guardBandMsgA-PUSCH-r16 | INTEGER |
| (0..1), | |
| frequencyStartMsgA-PUSCH-r16 | INTEGER |
| (0..maxNrofPhysicalResourceBlocks-1), | |
| nrofPRBs-PerMsgA-PO-r16 | INTEGER |
| (1..32), | |
| nrofMsgA-PO-FDM-r16 | ENUMERATED |
| {one, two, four, eight}, | |
| msgA-IntraSlotFrequencyHopping-r16 | ENUMERATED |
| {enabled} | OPTIONAL, -- |
| Need R | |
| msgA-HoppingBits-r16 | BIT STRING |
| (SIZE(2)) | OPTIONAL, -- |
| Need R | |
| msgA-DMRS-Config-r16 | MsgA-DMRS- |
| Config-r16, | |
| nrofDMRS-Sequences-r16 | INTEGER (1..2), |
| msgA-Alpha-r16 | ENUMERATED |
| {alpha0, alpha04, alpha05, alpha06, | |
| alpha07, alpha08, alpha09, alpha1} | OPTIONAL, -- Need S |
| interlaceIndexFirstPO-MsgA-PUSCH-r16 | INTEGER (1..10) |
| OPTIONAL, -- Need R | |
| nrofInterlacesPerMsgA-PO-r16 | INTEGER (1..10) |
| OPTIONAL, -- Need R | |
| ... | |
| } | |
| MsgA-DMRS-Config-r16 ::= | SEQUENCE { |

TABLE 7-continued

| msgA-DMRS-AdditionalPosition-r16 {pos0, pos1, pos3} S | ENUMERATED OPTIONAL, -- Need |
| msgA-MaxLength-r16 {len2} Need S | ENUMERATED OPTIONAL, -- |
| msgA-PUSCH-DMRS-CDM-Group-r16 (0..1) Need S | INTEGER OPTIONAL, -- |
| msgA-PUSCH-NrofPorts-r16 OPTIONAL, -- Need S | INTEGER (0..1) |
| msgA-ScramblingID0-r16 (0..65536) Need S | INTEGER OPTIONAL, -- |
| msgA-ScramblingID1-r16 (0..65536) Need S } | INTEGER OPTIONAL -- |

TABLE 7-continued

-- TAG-MSGA-PUSCH-CONFIG-STOP
-- ASN1STOP

Figure 15:
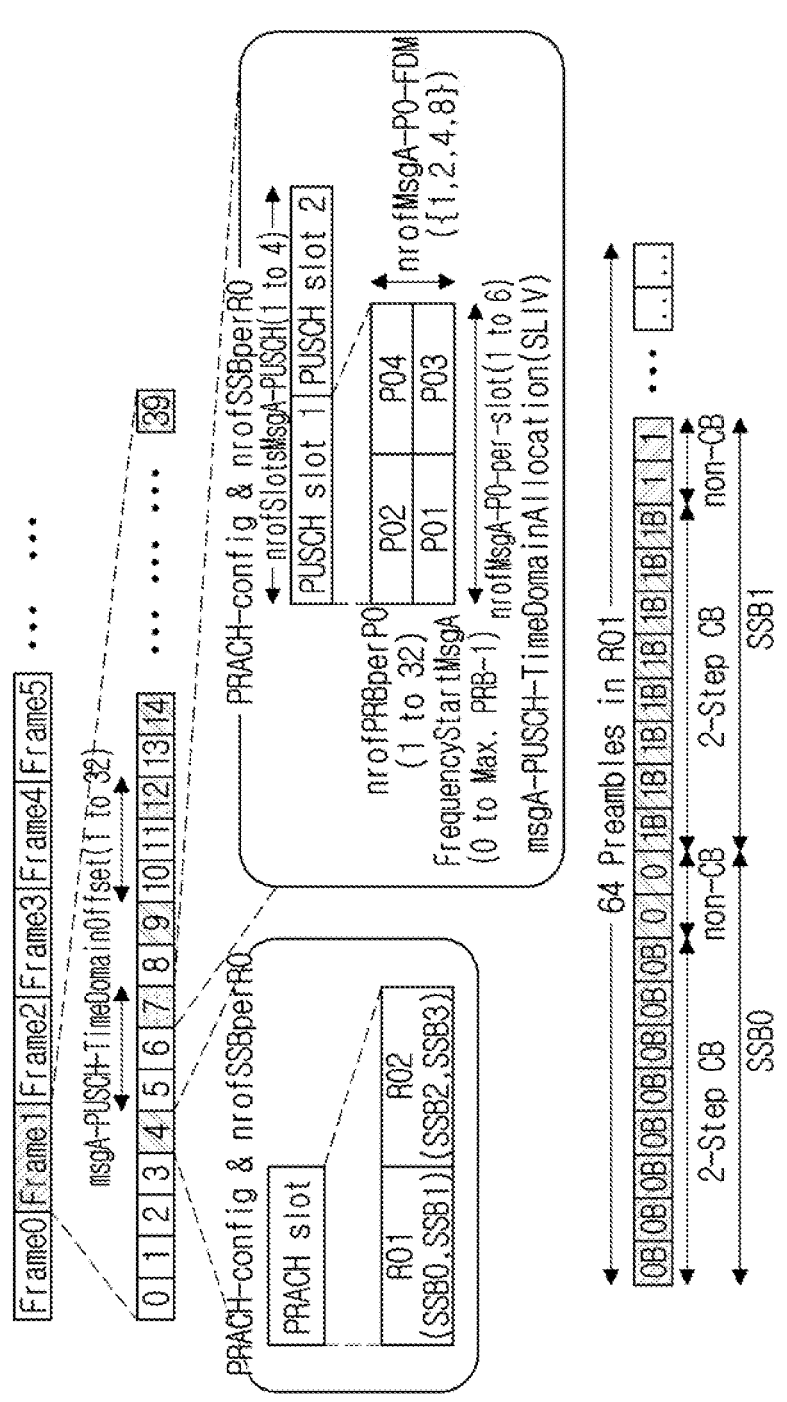
FIG. 15 illustrates a configuration method of a 2-step RACH preamble and a PUSCH to which the present disclosure may apply.

FIG. 15 illustrates a mapping relationship between a preamble and a PUSCH to which the present disclosure may apply. Referring to FIG. 15, $N_{preamble}$ may be derived by calculating the number of preambles to be associated with the PUSCH DMRS resource based on a valid RO preamble and a valid PO DMRS resource. Here, in FIG. 15, total PUSCH DMRS resources may be sufficiently configured and $N_{preamble}=1$ based on the above Equation 6.

Therefore, in RO1, preamble 0 may be associated with PO 1 DMRS (port 0, Seq. 0) in which $f_{id}=0$ and preamble 1 may be associated with PO 2 DMRS (port 0, Seq. 0) in which $f_{id}=1$. A subsequent preamble may be associated with a PUSCH DMRS in descending order of a DMRS port and ascending order of a sequence and then, may be associated with a PO multiplexed by a time axis.

Table 8 I divided into Table 80 and Table 81 as follows.

TABLE 80

| | | PRACH slot 1 | | | |
|---|---|---|---|---|---|
| PO2 | DMRS Port 1, Seq. 1 | Preamble 7 (SSB 0) | PO4 | DMRS Port 1, Seq. 1 | Preamble 17 (SSB 1) |
| | DMRS Port 0, Seq. 1 | Preamble 5 (SSB 0) | | DMRS Port 0, Seq. 1 | Preamble 15 (SSB 1) |
| | DMRS Port 1, Seq. 1 | Preamble 3 (SSB 0) | | DMRS Port 1, Seq. 0 | Preamble 13 (SSB 1) |
| | DMRS Port 1, Seq. 0 | Preamble 1 (SSB 0) | | DMRS Port 0, Seq. 0 | Preamble 11 (SSB 1) |
| PO1 | DMRS Port 0, Seq. 0 | Preamble 6 (SSB 0) | PO3 | DMRS Port 1, Seq. 1 | Preamble 16 (SSB 1) |
| | DMRS Port 0, Seq. 1 | Preamble 4 (SSB 0) | | DMRS Port 0, Seq. 1 | Preamble 14 (SSB 1) |
| | DMRS Port 1, Seq. 0 | Preamble 2 (SSB 0) | | DMRS Port 1, Seq. 0 | Preamble 12 (SSB 1) |
| | DMRS Port 0, Seq. 0 | Preamble 0 (SSB 0) | | DMRS Port 0, Seq. 0 | Preamble 10 (SSB 1) |

TABLE 81

| | | PRACH slot 2 | | | |
|---|---|---|---|---|---|
| PO2 | DMRS Port 1, Seq. 1 | Preamble 7 (SSB 2) | PO4 | DMRS Port 1, Seq. 1 | Preamble 17 (SSB 3) |
| | DMRS Port 0, Seq. 1 | Preamble 5 (SSB 2) | | DMRS Port 0, Seq. 1 | Preamble 15 (SSB 3) |
| | DMRS Port 1, Seq. 1 | Preamble 3 (SSB 2) | | DMRS Port 1, Seq. 0 | Preamble 13 (SSB 3) |
| | DMRS Port 1, Seq. 0 | Preamble 1 (SSB 2) | | DMRS Port 0, Seq. 0 | Preamble 11 (SSB 3) |
| PO1 | DMRS Port 0, Seq. 0 | Preamble 6 (SSB 2) | PO3 | DMRS Port 1, Seq. 1 | Preamble 16 (SSB 3) |
| | DMRS Port 0, Seq. 1 | Preamble 4 (SSB 2) | | DMRS Port 0, Seq. 1 | Preamble 14 (SSB 3) |
| | DMRS Port 1, Seq. 0 | Preamble 2 (SSB 2) | | DMRS Port 1, Seq. 0 | Preamble 12 (SSB 3) |
| | DMRS Port 0, Seq. 0 | Preamble 0 (SSB 2) | | DMRS Port 0, Seq. 0 | Preamble 10 (SSB 3) |

Figure 16:
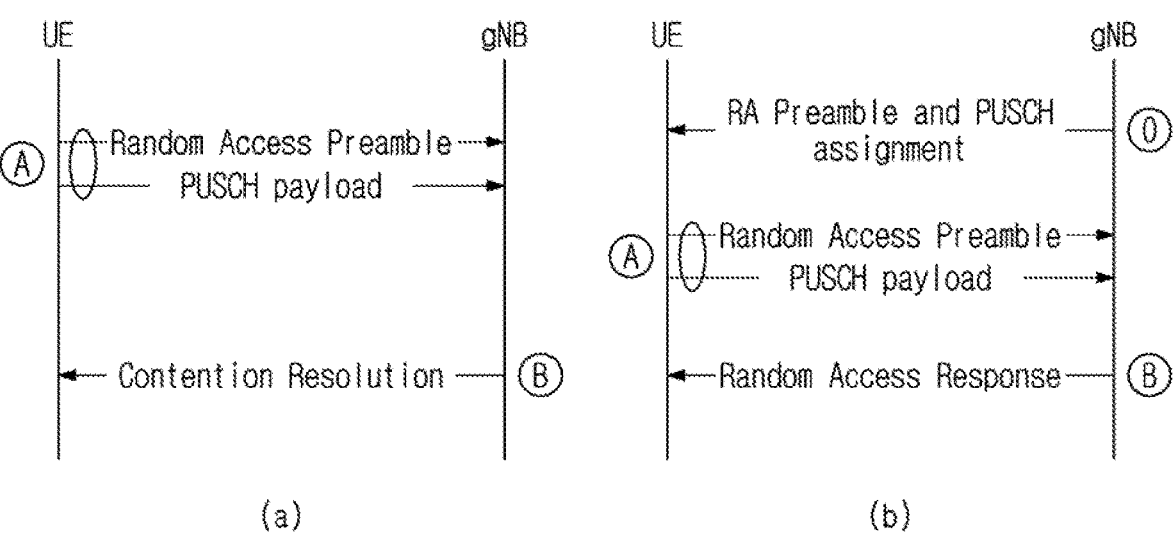
FIG. 16 illustrates a 2-step RACH procedure to which the present disclosure may apply.
Figure 17:
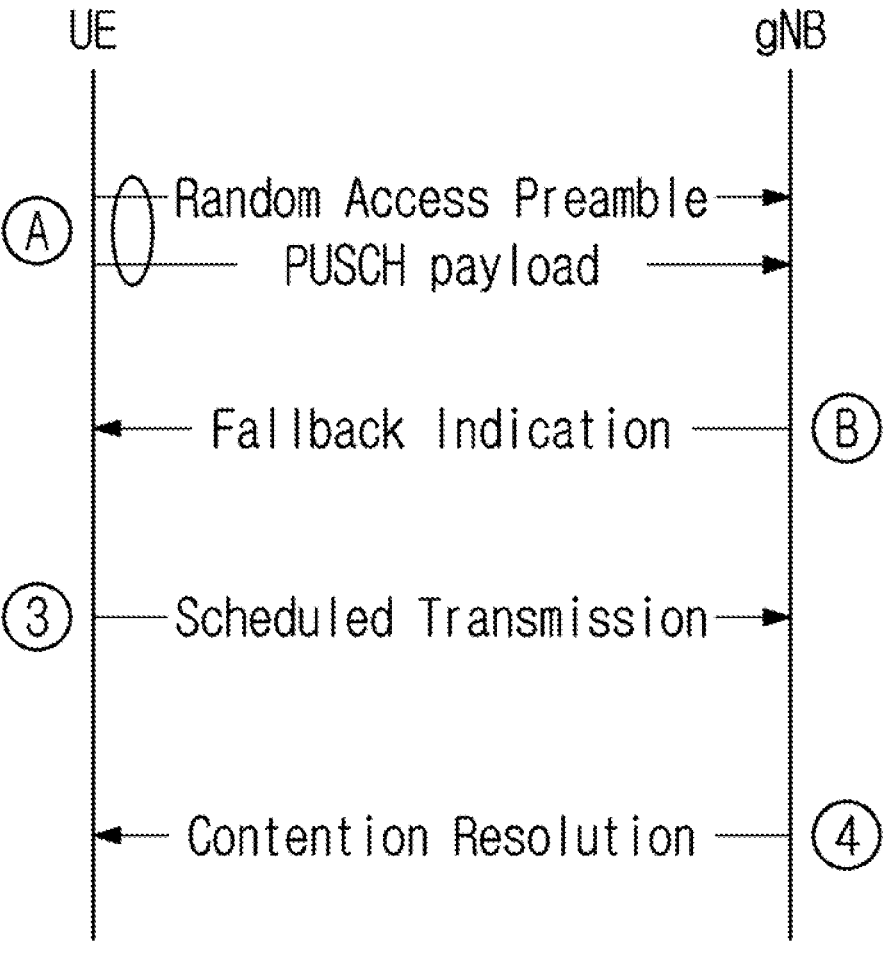
FIG. 17 illustrates a 2-step RACH procedure to which the present disclosure may apply.

FIGS. 16 and 17 illustrate a 2-step RACH procedure to which the present disclosure may apply.

For example, a random access may be used based on the following Table 9. However, it is provided as an example only and the present disclosure is not limited to the example. Here, for example, as described above, a UE may perform a 4-step RACH using Msg 1 based on FIG. 4. Also, for example, the UE may perform the 2-step RACH. For example, in Release 16, it is possible to support a 4-step contention-based random access process using Msg 1 and 2-step contention-based/contention-free random access process using Msg A.

Here, when the UE performs a random access, a type of the random access may be determined based on a configuration of a network. For example, when a contention-free random access resource is not configured, the UE may determine at least one of the 4-step RACH and the 2-step RACH based on an SSB received signal received power (RSRP) measurement value. On the contrary, when the contention-free-based random access resource is configured in the UE, the UE may perform the corresponding 4-step contention-free-based random access procedure and 2-step contention-free-based random access procedure. Here, when the UE performs the 2-step RACH, the UE may transmit Msg A that includes a PRACH preamble and a PUSCH payload associated with the PRACH preamble. The UE may transmit Msg A and then, may receive Msg B from a base station. Here, the UE may verify MsgB-RNTI-scrambled DCI by a window size set by the base station from a physical downlink control channel (PDCCH). Here, when the UE receives Msg B corresponding to "Success RAR" as a response to transmission of Msg A, the UE may determine that the random access procedure is a success.

On the contrary, when the UE receives a RAR corresponding to "Fallback RAR", the UE may determine that a payload transmission of Msg A is not successfully received by the base station. Here, for example, a UL grant may be included in "Fallback RAR". The UE may transmit Msg 3 as a UL grant resource included in "Fallback RAR" and may monitor contention resolution. Here, when the contention resolution is not successfully performed, the UE may retransmit Msg A. Here, when the base station reaches a maximum number of transmissions of Msg A, the UE may change a type of the random access to the 4-step RACH and may perform a contention-based random access.

TABLE 9 in a case in which a UE performs an initial access in an RRC idle state
in the case of performing an RRC connection re-establishment
in a case in which downlink or uplink data is generated due to mismatch of
an uplink synchronization state of the UE
in a case in which a PUCCH for a scheduling request is not configured
in the case of performing handover
in a case in which the UE shifts from an RRC inactive state
in the case of requesting system information
in the case of beam failure recovery For example, referring to FIG. 16(*a*), the UE may randomly select a preamble from among preambles specified by a SIB and may transmit the selected preamble to the base station. On the contrary, referring to FIG. 16(*b*), the UE may perform the contention-free-based 2-step RACH procedure. Here, the UE may receive an allocation of a preamble to be used for random access from the base station and may perform the random access procedure through the allocated preamble. Then, the base station may receive Msg A from the UE and may include and transmit information, such as a timing advance command, a contention resolution identifier, and a PUCCH resource, in a random access response (RAR) message based on a point in time at which Msg A is received.

For example, referring to FIG. 17, the UE may receive a RAR corresponding to "Fallback RAR" from the base station. Here, as described above, the timing advance command and the UL grant for Msg 3 transmission may be included in the RAR corresponding to "Fallback RAR". The UE may perform the Msg 3 transmission based on the allocated resource after receiving the RAR and may succeed in the random access after the contention resolution.

Figure 18:
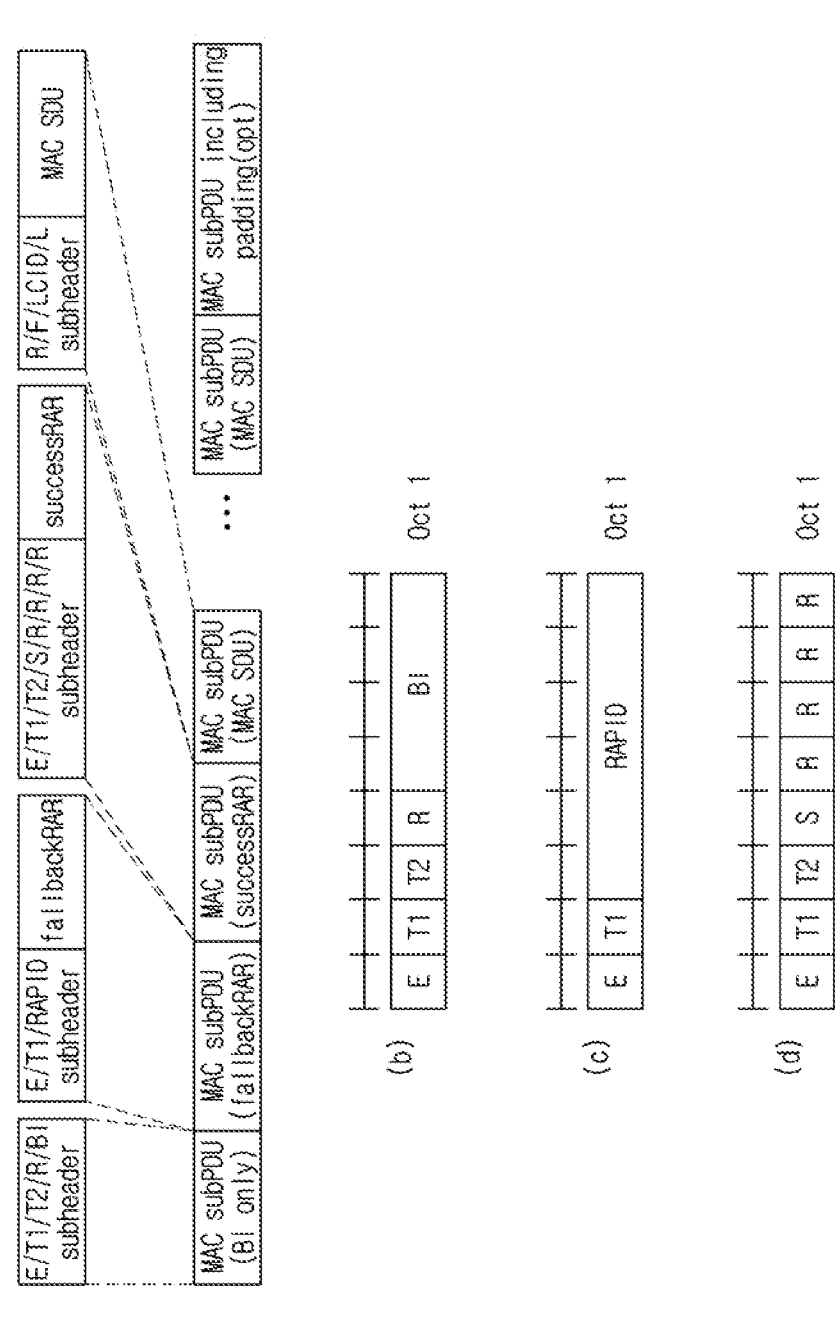
FIG. 18 illustrates a MAC PDU to which the present disclosure may apply. Also.
Figure 19:
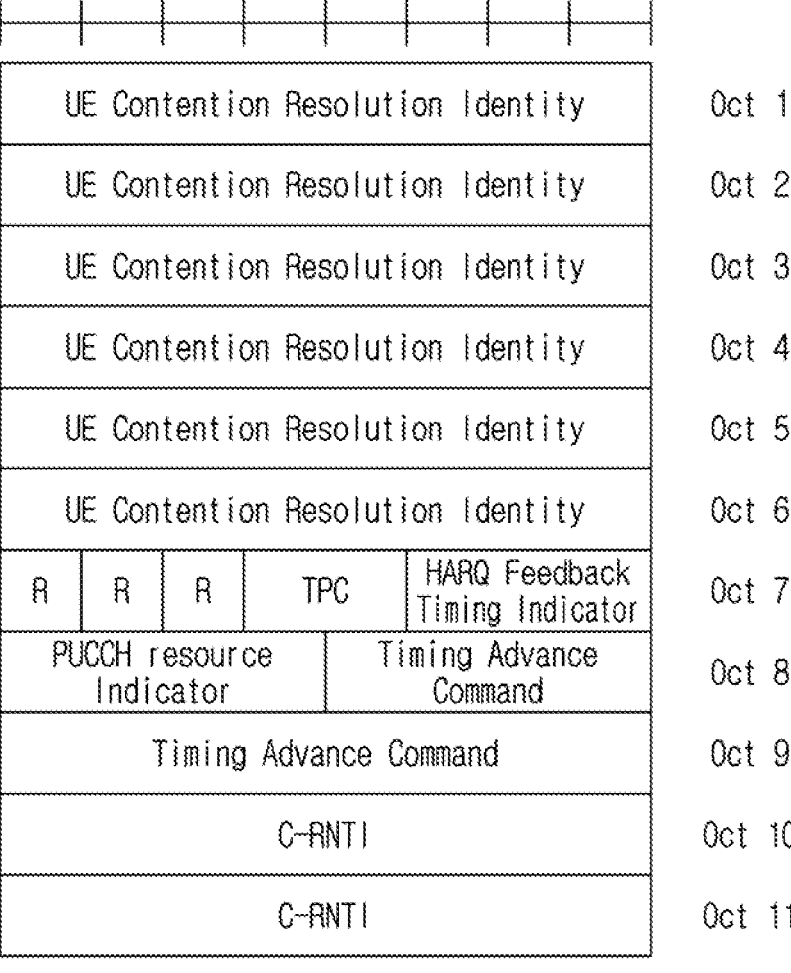
FIG. 19 illustrates a success RAR (successRAR) to which the present disclosure may apply.

FIG. 18 illustrates a MAC PDU to which the present disclosure may apply. Also, FIG. 19 illustrates a success RAR (successRAR) to which the present disclosure may apply.

As described above, a UE may perform a 4-step RACH and a 2-step RACH. Here, for example, in the case of performing the 4-step RACH, the UE may receive a RAR message from a base station after transmitting a preamble. Here, the RAR message may be configured as in FIG. 5(*a*). Also, for example, the UE may perform the 2-step RACH. Here, the UE may transmit Msg A including the preamble and the PUSCH payload to the base station and, in response thereto, may receive Msg B. Here, referring to FIG. 18(*a*), a MAC PDU of Msg B may include at least one of a backoff indicator (BI), a fallback RAR, a success RAR, and MAC subPDUs.

In more detail, FIG. 18(*b*) may represent a MAC subheader of a backoff indicator, FIG. 18(*c*) may represent a MAC subheader of a fallback RAR, and FIG. 18(*d*) may represent a MAC subheader of a success RAR. Here, an extension (E) area may indicate whether it is a last MAC subPDU in the MAC PDU. Here, if E area=0, a corresponding MAC subPDU may be a last MAC subPDU. On the contrary, if E area=1, another MAC subPDU may be present. Also, if type 1 (T1) area=0, it may indicate that a T2 area is present. On the contrary, if T1 area=1, it may indicate that a random access preamble ID (RAPID) area is present. Through this, the fallback RAR may be verified.

Also, if T2 area=2, presence of a BI area may be notified. Through this, a backoff indicator may be verified. On the contrary, if T2 area=1, it may indicate presence of an S area. Here, if S area=0, it may indicate that a MAC subPDU for a MAC SDU is present. Also, if S area=1, it may indicate that the MAC subPDU for the MAC SDU is absent. Also, a reserved bit (R) denotes 0 at all times and BI (4 bits) may be used to notify an overload situation. Also, RAPID (6bits) may be used to notify an identity number of a preamble.

Also, for example, a MAC entity of the UE may operate a time alignment timer (TAT) for each timing advance group (TAG) to a determine whether a time alignment between the base station and the UE is maintained. Here, the time alignment timer may refer to a time related to an amount of uplink time alignment to be maintained in a TAG belonged to by the base station. Here, when the base station transmits the timing advance command to the UE, the MAC entity of the UE may (re)start the time alignment timer of the TAG belonged to by a cell. Also, in an RRC layer, the time alignment timer may be configured in a SIB as 500 ms, 750 ms, 1280 ms, 1920 ms, 2560 ms, 5120 ms, 10240 ms, and infinity. The aforementioned value may refer to a timer to be used for the random access after the UE acquires system information. Also, the network may designate a UE specific time alignment timer using the RRC message. For example, as described above, FIG. 5(b) may represent a format for a MAC CE timing advance command.

Also, for example, FIG. 19 may represent a format of success RAR (SuccessRAR) with a fixed size included in a MAC PDU as a response to Msg A. Here, a contention resolution identity area may include a UL CCCH SDU. Here, if a size of CCCH SDU exceeds 48 bits, only first 48 bits of the CCCH SDU may be included. Also, transmission power control (TPC) may include 2 bits as an area for transmission power control of PUCCH for HARQ feedback of Msg B. Also, a HARQ feedback timing indicator may include 3 bits as an area for notifying an MsgB HARQ transmission time. Also, a PUCCH resource indicator may include 4 bits as a PUCCH resource allocation rea. Also, a C-RNTI may include 12 bits as an identity value used by a MAC entity for contention resolution completion. For example, the fallback RAR (FallbackRAR) with the fixed size included in the MAC PDU as a response to Msg A may be a format as shown in FIG. 5(a). Here, the fallback RAR may include a UL grant for Msg 3 transmission. Also, as described above, the temporary C-RNTI may include 16 bits as a temporary identity value used for the random access.

Figure 20:
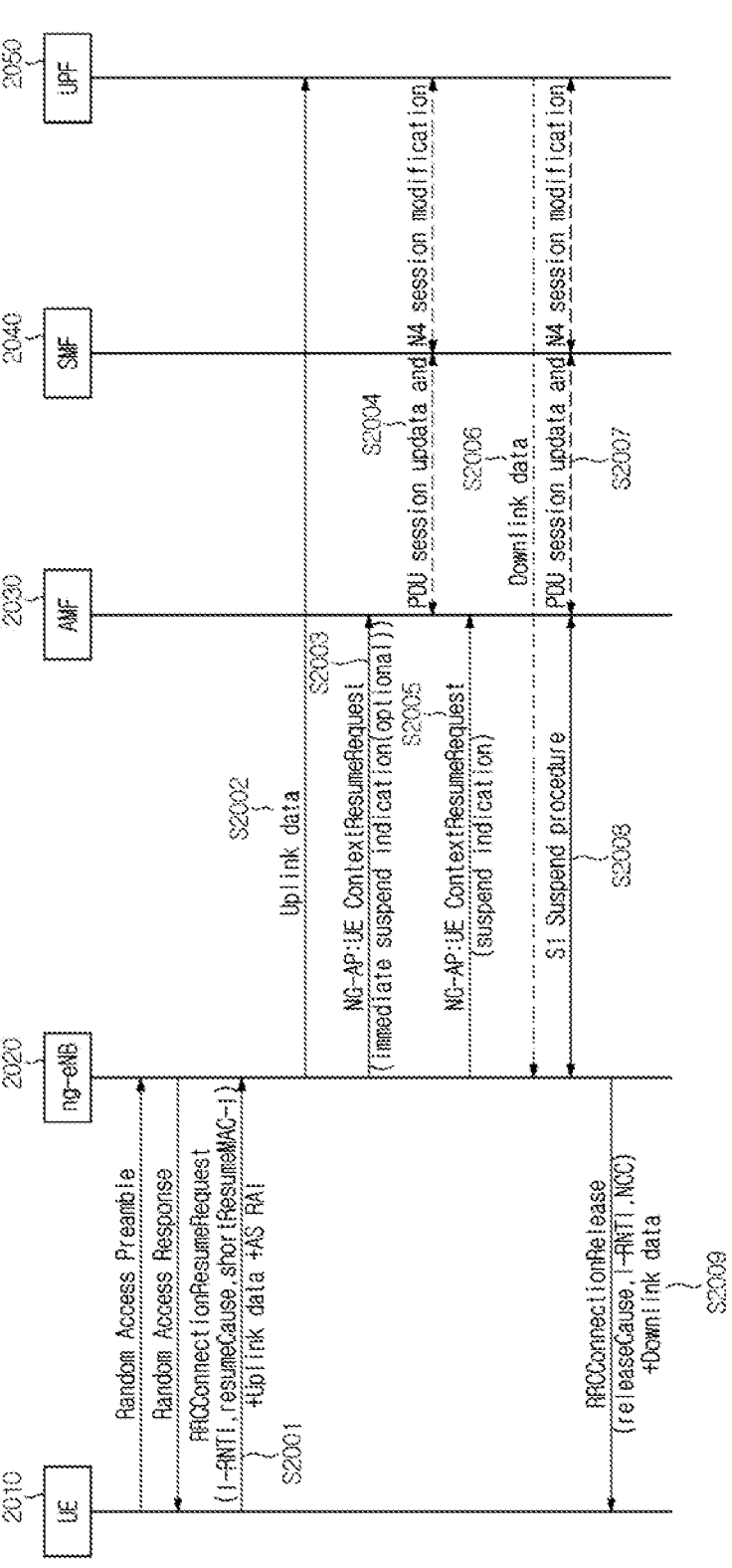
FIG. 20 illustrates early data transmission (EDT) to which the present disclosure may apply.

FIG. 20 illustrates early data transmission (EDT) to which the present disclosure may apply.

A UE may perform an uplink data transmission in a random access procedure through EDT. Also, for example, a base station may optionally transmit downlink data. Here, the UE that performs the EDT may include at least one of a bandwidth reduced and low complexity/coverage enhanced (BL/CE) UE and a narrow band Internet of Things (NB-IoT) UE. Also, a lower-power UE that transmits data based on a long period based on low power may transmit uplink data through an EDT procedure. The present disclosure is not limited to the aforementioned example.

For example, in response to generation of MO data in the UE, the UE may perform the EDB procedure when a transmission for at least one of RRC resume and RRC establishment is required for MO data transmission.

For example, referring to FIG. 20, a UE 2010 may perform user plane early data transmission (UP-EDT). In detail, the UE 2010 may receive an RRCConnectionRelease message that includes a suspend indication. Here, the UE 2010 may shift to at least one of an idle state and an inactive state based on the suspend indication included in the RRC-ConnectionRelease message. Here, in response to generation of MO data in the UE 2010 that shifts to at least one of the idle state and the inactive state, the UE may start a random access procedure. Here, uplink data of a dedicated traffic channel (DTCH) may be multiplexed at the same time with a common control channel (CCCH), such as an RRC-ConnectionResumeRequest message. On the contrary, downlink data of the DTCH may be multiplexed at the same time with a dedicated control channel (DCCH), such as the RRCConnectionRelease message.

In detail, when MO data is generated in the UE 2010, the UE may select a random access preamble configured for EDT and may transmit the selected random access preamble to a base station (e.g., ng-eNB) 2020. The UE 2010 may receive a RAR message from the base station 2020. The UE 2010 may transmit, to the base station 2020, a multiplexed signal that includes at least one of RRCConnectionResumeRequest, uplink data, and access stratum (AS) release assistance information (RAI) (S2001). Here, the RRCConnectionResumeRequest message may include at least one of I-RNTI, resumeCause, and shortResumeMAC-I. Here, shortResumeMAC-I may be used as an authentication token for the RRCConnectionResumeRequest message. That is, the UE 2010 may include at least one of resume ID/I-RNTI of the UE, establishment cause, and authentication token in the RRCConnectionResumeRequest message and may transmit the same to the base station 2020. Here, the UE may resume all of a signaling radio bearer (SRB) and a data radio bearer (DRB). Also, the UE may establish an AS security by discharging a new security key through NCC. Here, the NCC may be used to derive ciphered uplink or downlink data. Therefore, the RRCConnectionResumeRequest message may be integrity protected and ciphered. Also, uplink data of the DTCH may be ciphered and transmitted with the RRCConnectionResumeRequest message, such as the CCCH.

Then, the base station 2020 may deliver the uplink data to a user plane function (UPF) (S2002). The base station 2020 may notify connection resume by transmitting an NG-AP UE context resume request to an access and mobility management Function (AMF) 2030 (S2003). Here, unless AS release assistance information (RAI) indicates additional data, the base station 2020 may perform an immediate suspend request in operation S2003. On the contrary, when the suspend request is not received or when reserved downlink data or a signaling message is present in the AMF 2030, the AMF 2030 may perform a PDU session resume request to a session management function (SMF) 2040 (S2004). Then, the AMF 2030 may transmit an NG-AP UE context resume response to the base station 2020 (S2005). Here, when the immediate suspend request is present or when additional downlink data is absent in operation S2003, the base station 2020 may transmit a suspend indication such that the UE may enter in at least one of an idle state and an inactive state. Also, when the suspend indication is included in operation S2005, the base station 2020 may transmit an RRC ConnectionRelease message to the UE 2010 (S2008). Also, for example, when the AS RAI indicates that one downlink transmission is possible, the base station 2020 may wait for downlink data. Here, the base station 2020 may perform an NG-AP UE context suspend procedure for RRC suspension to the AMF 2030. Also, the AMF 2030 may perform a PDU session suspend procedure with the SMF 2040 and the SMF 2040 may request the UPF 2050 for releasing tunnel information for the UE (S2007).

Also, for example, when the UE 2010 receives the RRC-ConnectionRelease message in operation S2008, the UE 2010 may maintain the idle/inactive state. Here, the RRC-ConnectionRelease message may include at least one of releaseCause, I-RNTI, NCC, and DRB-ContinuesROHC. Also, for example, when the downlink data is present in operation S2006, the downlink data may be ciphered and multiplexed with the DCCH, such as the RRCConnection-Release message.

As another example, the BL/CE UE may verify CP-EDT and UP-EDT-r15 information elements within SIB2 of a cell and may verify whether the EDT is possible. Here, in PRACH Config IE, the PRACH may be configured based on the number of CE levels of the UE. Here, the CE level may be configured in order of 0 and 1. Also, the PRACH configuration may include information element "maxNum-PreambleAttempt". Here, "maxNumPreambleAttempt" may represent a maximum number of preamble transmissions and may be set to n3 if the information element is absent. Also, for example, the PRACH configuration may include information element "mpdcch-NumRepetition-RA". Here, "mpdcch-NumRepetition-RA" may represent a maximum number of repetition transmissions of RAR, Msg3, and Msg4. Also, the PRACH configuration may include information element "numRepetitionPerPreambleAttempt".

Here, "numRepetitionPerPreambleAttempt" may represent the number of PRACH preamble repetition transmissions. Also, the PRACH configuration may include information element "mpdcch-NarrowbandsToMonitor". Here, "mpdcch-NarrowbandsToMonitor" may represent a narrow band number for MPDCCH monitoring for the RAR. For example, when the EDT is activated, an additional EDT-PRACH information element (EDT-PRACH-Parameter) may be configured according to each CE level.

Also, for example, the following Table 10 may show a RACH configuration for each CE level according to the PRACH configuration. Here, in addition to preamble group information, ContentionResoulutionTimer, and HARQ information, IE information for EDT is included. Here, edt-LastPreamble may represent preamble group information for the EDT. Also, when the PRACH resource configuration for EDT (edt-PRACH-ParametersCE-r15) differs from "PRACH-ParametersCE-r13", preambles for EDT may be from "firstPreamble-r13" to "edt-LastPreambler15". Also, when the PRACH resource configuration for EDT (edt-PRACH-ParametersCE-r15) is the same as "PRACH-ParametersCE-r13", preambles for EDT may be from "lastPreamble-r13+1" to "edt-LastPreamble-r15".

Here, "edt-TBS" may represent a largest transport block size (TBS) for performing the EDT with Msg 3. Here, b328 and b408 denote 328 bits and 408 bits, respectively. Also, "b1000or456" may represent a value used for CE level 0 and CE level 1. Also, "edt-SmallTBS-Enabled" may specify whether a TBS smaller than "edt-TBS" is selectable. Also, "edt-SmallTBS-Subset" may specify that only two TBSs corresponding to "edt-TBS" are selectable.

Also, for example, when the EDT is activated and the BL/CE is to perform the RAR or $I_{MCS}=15$ is specified in a retransmission uplink scheduling grant including the EDT in a random access process, modulation order (Qm) may be determined as 2. In other cases, modulation order and a TBS number may be determined according to the following Table 11.

TABLE 10

```
RACH-ConfigCommon ::=                      SEQUENCE {
    preambleInfo                                        SEQUENCE {
                        numberOfRA-Preambles            ENUMERATED
    {
                                                        n4, n8, n12, n16,
    n20, n24, n28,
                                                        n32, n36, n40,
    n44, n48, n52, n56,
                                                        n60, n64},
                        preamblesGroupAConfig
        SEQUENCE {
                        sizeOfRA-PreamblesGroupA
        ENUMERATED {
                                                        n4, n8, n12, n16,
    n20, n24, n28,
                                                        n32, n36, n40,
    n44, n48, n52, n56,
                                                        n60},
                        messageSizeGroupA
        ENUMERATED {b56, b144, b208, b256},
                        messagePowerOffsetGroupB
        ENUMERATED {
                        minusinfinity, dB0, dB5, dB8, dB10, dB12,
                        dB15, dB18},
                        ...
                        }                   OPTIONAL
                                                        -- Need
    OP
    },
    powerRampingParameters
    PowerRampingParameters,
    ra-SupervisionInfo                                  SEQUENCE {
                        preambleTransMax
        PreambleTransMax,
                        ra-ResponseWindowSize
        ENUMERATED {
                                                        sf2, sf3, sf4, sf5,
    sf6, sf7,
                                                        sf8, sf10},
                        mac-ContentionResolutionTimer   ENUMERATED {
                                                        sf8, sf16, sf24,
    sf32, sf40, sf48,
                                                        sf56, sf64}
    },
    maxHARQ-Msg3Tx
    INTEGER (1..8),
    ...,
    [[                  preambleTransMax-CE-r13
    PreambleTransMax                                    OPTIONAL, -
    - Need OR
                        rach-CE-LevelInfoList-r13       RACH-CE-
    LevelInfoList-r13                   OPTIONAL        -- Need OR
    ]],
    [[                  edt-SmallTBS-Subset-r15         ENUMERATED
    {true}                              OPTIONAL        -- Cond EDT-OR
```

TABLE 10-continued

```
  ]]
}
RACH-CE-LevelInfoList-r13 ::= SEQUENCE (SIZE (1..maxCE-Level-r13)) OF
RACH-CE-LevelInfo-r13
RACH-CE-LevelInfo-r13 ::=          SEQUENCE {
   preambleMappingInfo-r13                    SEQUENCE {
                  firstPreamble-r13
   INTEGER(0..63),
                  lastPreamble-r13
   INTEGER(0..63)
   },
   ra-ResponseWindowSize-r13                  ENUMERATED {sf20,
sf50, sf80, sf120, sf180,
                                              sf240, sf320, sf400},
     mac-ContentionResolutionTimer-r13   ENUMERATED {sf80, sf100,
sf120,
     sf160, sf200, sf240, sf480, sf960},
     rar-HoppingConfig-r13                     ENUMERATED
{on,off},
     ...
   [[          edt-Parameters-r15            SEQUENCE {
                  edt-LastPreamble-r15        INTEGER(0..63),
                  edt-SmallTBS-Enabled-r15    BOOLEAN,
                  edt-TBS-r15                   ENUMERATED
{b328, b408, b504, b600, b712,
                                              b808,
b936, b1000or456},
              mac-ContentionResolutionTimer-r15   ENUMERATED
{sf240, sf480, sf960,
sf1920, sf3840, sf5760, sf7680, sf10240}
                                            OPTIONAL -- Need OP
                  } OPTIONAL                  -- Cond EDT
   ]]
}
```

TABLE 11

| MCS Index (I_{MCS}) | Modulation Order (Q_m) | TBS Index (I_{TBS}) |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 15 | 4 | 14 |

Also, when PUSCH transmission is scheduled in the BL/CE UE through a RAR uplink request, and when "edt-SmallTBS-Enabled-r15" is not configured, "edt-TBS-r15" may be determined as the TBS. On the contrary, when "edt-SmallTBS-Enabled-r15" is configured, the TBS may be determined according to the following Table 12. For example, the following Table 12 shows a configuration for CEModeA, which may differ from CEModeB.

TABLE 12

| Edt-TBS-r15 | Edt-SmallTBS-Subset-r15 | Allowable TBS values |
|---|---|---|
| 408 | Not configured | 328, 408 |
| 504 | Not configured | 328, 408, 456, 504 |
| 504 | Enabled | 408, 504 |
| 600 | Not configured | 328, 408, 504, 600 |
| 600 | Enabled | 480, 600 |
| 712 | Not configured | 328, 456, 600, 712 |
| 712 | Enabled | 456, 712 |

TABLE 12-continued

| Edt-TBS-r15 | Edt-SmallTBS-Subset-r15 | Allowable TBS values |
|---|---|---|
| 808 | Not configured | 328, 504, 712, 808 |
| 808 | Enabled | 504, 808 |
| 936 | Not configured | 328, 504, 712, 936 |
| 936 | Enabled | 504, 936 |
| 1000 | Not configured | 328, 504, 712, 1000 |
| 1000 | enabled | 504, 1000 |

As another example, DCI may be verified to determine modulation order, redundancy version, and TBS of PUSCH in NR.

Here, the UE may determine the modulation order and a target code rate (R) based on 5-bit $I_{MCS}$ in the DCI. Then, the UE may verify the redundancy version and may apply the same to PUSCH transmission. Also, the UE may verify the number of layers (v) and a total number of PRBs and may determine the TBS. Here, for RAR, DCI format 0_0, and DIC format 0_1 PUSCH scheduling, a table that determines modulation order and a target code rate may be differently configured based on an MCS level number and an MCS table value. For example, the modulation order and the target code rate may be determined according to $I_{MCS}$ in the RAR, based on the following Table 13.

TABLE 13

| MCS Index (I_{MCS}) | Modulation Order (Q_m) | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |

TABLE 13-continued

| MCS Index ($I_{MCS}$) | Modulation Order ($Q_m$) | Target code Rate R × [1024] | Spectral efficiency |
|---|---|---|---|
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

$$N'_{RE} = N_{sc}^{RB} * N_{symb}^{sh} - N_{DMRS}^{PRB} - N_{oh}^{PRB} \quad \text{[Equation 7]}$$

In Equation 7, $$N_{sc}^{RB}$$

denotes the number of subcarriers of a frequency side of the PRB, 12, and $$N_{symb}^{sh}$$

denotes the number of symbols of the PUSCH within a slot. Also, $$N_{DMRS}^{PRB}$$

denotes the number of DMRS REs per PRB and $$N_{oh}^{PRB}$$

denotes overhead that is defined as information element "Overhead" in "PUSCHtServingCellConfig". Here, unless $$N_{oh}^{PRB}$$

is configured, it is assumed as 0 and may be 0 at all times for transmission of Msg3. Then, a total number of REs of the PUSCH may be determined based on the following Equation 8.

$$N_{RE} = \min(156, N_{RE}) \cdot n_{PRB}. \quad \text{[Equation 8]}$$

In Equation 8, $n_{PRB}$ denotes a total number of PRBs. Then, the TBS may be determined based on the following Equation 9 and Equation 10. Here, if $N_{info} \leq 3824$, a closest value in the following Table 14 may be determined as the TBS.

$$N_{info} = N_{RE} \cdot R \cdot Q_m \cdot v \quad \text{[Equation 9]}$$

$$N'_{info} = \max\left(24, 2^n \cdot \left\lfloor \frac{N_{info}}{2^n} \right\rfloor\right), \; n = \max(3, \lfloor \log_2 N_{info} \rfloor - 6) \quad \text{[Equation 10]}$$

TABLE 14

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |

TABLE 14-continued

| Index | TBS |
|---|---|
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Hereinafter, detailed examples of the present disclosure are described.

As described above, the UE may shift to an RRC inactive state. Here, the UE in the RRC inactive state may be in a state in which the UE may not transmit a message. That is, when the UE is in the RRC inactive state, it may be a state in which all the radio bearers (RBs) of the UE are suspended. Therefore, when downlink (MT) data the UE needs to receive is present or when uplink (MO) data the UE needs to transmit is present, the UE may shift to an RRC connected state through an RRC resume procedure and then may perform data transmission and reception.

Here, small data may be frequently generated in the UE. For example, the UE may consider at least one transmission among an instant message (e.g., whatsapp, QQ, wechat), periodic positioning information (info), sensor information, periodic meter reading, and keep-alive traffic. Here, the above data may be small data in which an amount of data is not large. Here, when the UE shifts to the RRC connected state every time to transmit small data, signaling overhead and unnecessary power consumption occurs in the UE, which may cause an issue. Also, for example, for UEs that operate based on a low power mode, such as a sensor, signaling overhead of a corresponding UE needs to be reduced in consideration of power consumption.

Considering this, a method of transmitting CCCH SRB and uplink data through a PUSCH allocated for Msg 3 or Msg A in a random access procedure for small data transmission of an RRC inactive UE may be considered. Through this, the UE may transmit small data through the random access procedure. Here, a size of small data generated in the UE may be inconstant. That is, a different size of small data may be generated in the UE. Here, when the UE transmits uplink data in the random access procedure, a TBS may be determined in advance. Therefore, when the size of small data is greater than the TBS, the UE may not complete uplink transmission in the random access procedure. Also, when the size of small data generated in the UE is small, the resource use efficiency may be enhanced by designing the TBS to be small. Considering this, a flexible payload size may need to be allocated to the UE.

For example, the TBS may be determined according to a UL grant of Msg 2 (RAR) or "msgA-PUSCH Configuration" based on a preamble group in the random access process. Here, when the CCCH and the uplink data are greater than the determined TBS, the UE may not transmit the uplink data through Msg 3 or Msg A. Here, for example, the UE may shift to the RRC connected state. Then, the UE may transmit the uplink data to the base station in the RRC connected state.

As another example, in the EDT, a space within a TB for uplink data may be secured by changing a type of an SRB message. That is, although the UE may change the type of the SRB message in consideration of the predetermined TBS and may also perform an uplink transmission by securing the space for uplink data, the present disclosure is not limited to the aforementioned example.

Here, for example, when the UE performs the random access procedure, the aforementioned issues may be solved if it is possible to flexibly support the TBS. In the following, a method of supporting a flexible payload size of the PUSCH allocated to Msg 3 or Msg A in the random access process is described.

Figure 21:
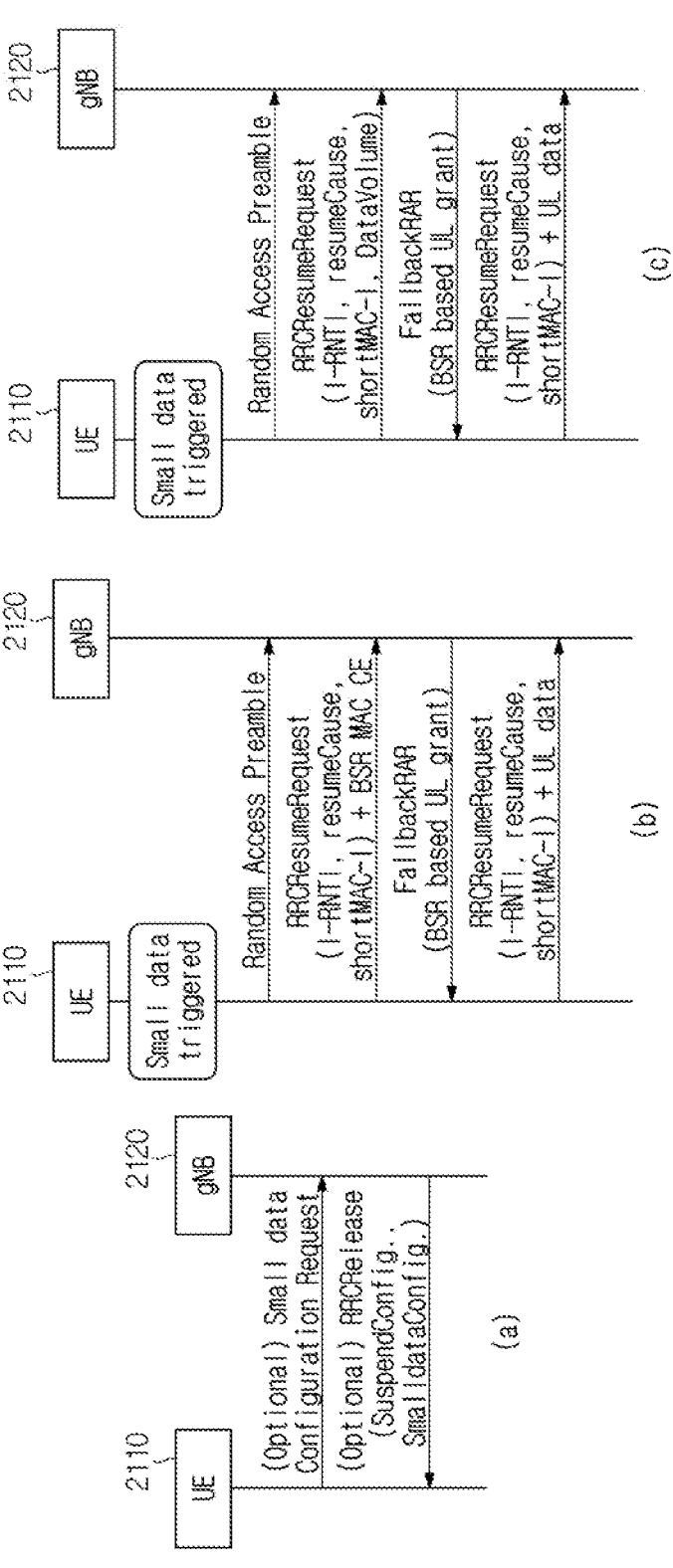
FIG. 21 illustrates a method of transmitting small data in a random access process to which the present disclosure may apply.

FIG. 21 illustrates a method of transmitting small data in a random access process to which the present disclosure may apply.

Referring to FIG. 21, when a small data transmission is triggered in a UE 2110, the UE 2110 may transmit small data in a random access procedure.

In more detail, referring to FIG. 21(a), when a small data transmission is expected in the UE 2110, the UE 2110 may transmit a small data configuration request to a base station 2120 (e.g., gNB). Here, the small data configuration may include TBS information based on the expected small data. Then, the UE 2110 may receive an RRC release message from the base station 2120. Here, a small data configuration request transmission may be an optional procedure and the base station 2120 may transmit the RRC release message to the UE 2110 even without receiving the small data configuration request from the UE 2110.

Here, the RRC release message may include at least one of "suspendConfig" and "SmalldataConfig". Here, for example, after the UE 2110 receives the RRC release message, the UE 2110 may shift to an RRC inactive state based on "suspendConfig". Also, the UE 2110 may enable the small data configuration to perform the small data transmission through the random access procedure through "SmalldataConfig" of the RRC release message.

As another example, "SmalldataConfig" may be indicated to the UE 2110 through system information without being transmitted through the RRC release message. For example, "SmalldataConfig" may be included in the system information received from the base station 2120 and the UE 2110 may receive the system information and then enable the small data configuration in the RRC inactive state. Also, for example, the information element "SmalldataConfig" is provided as an example only and the present disclosure is not limited to the name. That is, the information element that enables the small data configuration may be set to another name such that the UE in the RRC inactive state may perform the small data transmission through the random access procedure and the present disclosure is not limited to the aforementioned example.

Referring to FIG. 21(b), the small data may be triggered in the UE 2110 in the inactive state. Here, the UE 2110 may verify small data present in a radio link control (RCL) buffer or a packet data convergence protocol (PDCP) and may perform the random access procedure.

For example, the UE 2110 may perform a 2-step RACH. Here, since a PUSCH for MsgA is preconfigured, a TBS may be predetermined. The UE 2110 may determine whether the small data and a CCCH may be included in the TBS in consideration of the small data generated in the UE and a CCCH message size. Here, when the small data and the CCCH may not be included in the TBS, the UE 2110 may shift to an RRC connected state and then may transmit data. Through this, signaling overhead may occur.

Considering this, when the small data and the CCCH message may not be included in the TBS, the UE 2110 may transmit the CCCH and a buffer status report (BSR) MAC control element (CE) to the base station 2120 through the msgA PUSCH. That is, the UE 2110 may transmit buffered data information to the base station 2120 to perform the uplink data transmission in the random access procedure without shifting to the RRC connected state.

Here, the base station 2120 may decode the preamble and the PUSCH received from the UE 2110 and may verify a buffer size. Then, the base station 2120 may transmit a fallback RAR (FallbackRAR) to the UE 2110. For example, FallbackRAR may include UL grant information. Here, the UL grant may be determined based on a CCCH size and a data size specified in the BSR MAC CE. Here, the UE 2110 may newly determine the TBS based on the UL grant of the fallback RAR. That is, the UE 2110 may determine the TBS greater than the CCCH size and uplink data size. The UE 2110 may transmit Msg3 including the CCCH and the uplink data (small data) to the base station 2120 based on the determined TBS. As another example, the UE 2110 may transmit Msg3 that includes only the uplink data to the base station 2120 based on the determined TBS. For example, since the UE 2110 has transmitted the CCCH in Msg A to the base station 2120, Msg3 may include only the uplink data. However, it is provided as an example only. As described above, while maintaining the inactive state, the UE 2110 may transmit the small data to the base station 2120.

Here, for example, in the case of the existing 2-step RACH, when the base station 2120 successfully decodes the preamble and the PUSCH, the base station 2120 may configure SuccessRAR in msgB and may transmit the same to the UE 2110. Here, the base station 2120 needs to allocate the UL grant to the UE 2110. Therefore, although the base station 2120 succeeds in decoding, the base station 2120 may not transmit SuccessRAR. Here, the base station 2120 may allocate the UL grant to the UE 2110 through Fallback-RAR to be transmitted to the UE 2110.

As another example, when the base station 2120 receives the CCCH and the BSR MAC CE together from the UE 2110, the base station 2120 may transmit a new type of RAR to the UE 2110. Here, the new type of RAR may include an UL grant. Here, since the UE 2110 has received the RAR that includes the UL grant, the UE 2110 may determine a new TBS based on the UL grant and may determine whether the CCCH and the uplink data are transmittable. That is, once the new type of RAR that includes the UL grant is verified, the UE 2110 may determine whether Msg3 transmission is possible.

As another example, a case in which the UE 2110 receives RAR from the base station and transmits only uplink data based on a UL grant may be considered. That is, a case in which Msg 3 includes only the uplink data without the CCCH may be considered. Here, for example, the RAR may include information regarding whether to transmit the CCCH and the uplink data or whether to transmit only the uplink data with Msg 3. For example, the corresponding information may be a small data indication, but the present disclosure is not limited to the corresponding name. Here, for example, when the small data indication included in the RAR is "0", the UE 2110 may transmit the uplink data with the CCCH using Msg3. Also, when the small data indication included in the RAR is "1", the UE 2110 may transmit only the uplink data using Msg3. That is, indication information regarding whether to include only the uplink data in Msg 3 may be included in the RAR and the present disclosure is not limited to the aforementioned example.

As another example, the UE 2110 in the RRC connected state may perform a data transmission through the random access procedure. For example, a case in which the UE 2110 in the RRC connected state performs connected mode discontinuous reception (C-DRX) may be considered. Here, the UE 2110 in the RRC connected state may perform the random access procedure and may report buffered data to the base station 2120. Then, as described above, the UE 2110 may receive a UL grant from the base station 2120 and may transmit data through Msg 3. Here, when the UE 2110 completes the data transmission based on the aforementioned method, the UE 2110 may maintain the C-DRX. For example, here, maintaining the C-DRX may be defined by a command from the base station 2120 or a UE operation.

Also, for example, the BSR MAC CE may be configured in consideration of a padding space that remains by adding the CCCH to the TBS. For example, when padding bits of a MAC PDU may include "Short BSR MAC CE" but may not include "Long BSR MAC CE", the UE 2110 may include "Short BSR MAC CE" and a subheader in the MAC PDU and may transmit the same. Also, for example, when padding bits of the MAC PDU may include "Long BSR MAC CE", the UE 2110 may include "long BSR MAC CE" and subheader in the MAC PDU and may transmit the same. Also, for example, the UE 2110 may configure a new MAC CE and, through this, may provide buffered data information to the base station 2120. Here, the new MAC CE may be a MAC CE that represents a data amount of the DTCH without considering a data amount of another logical channel. For example, the MAC CE may represent an amount of data that may be transmitted using a PDCP or an RLC buffer without a logical channel group ID, but the present disclosure is not limited to the aforementioned example.

Figure 22:
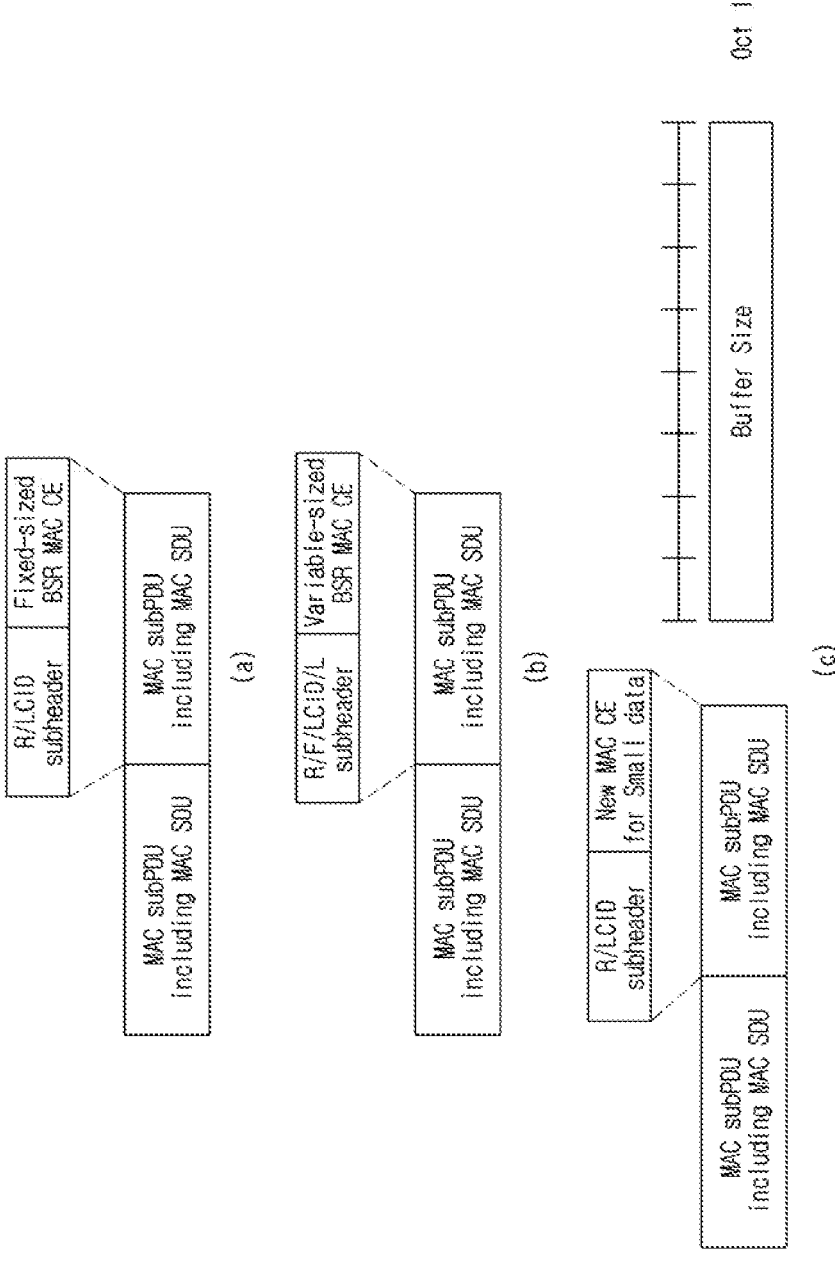
FIG. 22 illustrates a MAC PDU to which the present disclosure may apply.

FIG. 22 illustrates a MAC PDU to which the present disclosure may apply.

For example, as described above, the UE may express an amount of data buffered through a BSR MAC CE. Here, for example, referring to FIG. 22(a), when padding bits of the MAC PDU may include "Short BSR MAC CE" but may not include "Long BSR MAC CE", the UE 2110 may include "Short BSR MAC CE" and a subheader in the MAC PDU and may transmit the same. Here, when a data amount is represented by "Short BSR MAC CE", a single logical channel group ID and a data amount may be represented. Also, for example, referring to FIG. 22(b), when the MAC PDU may include "Long BSR MAC CE", the UE may include "long BSR MAC CE" and a subheader in the MAC PDU. Here, when a data amount is represented by "Long BSR MAC CE", a data amount of at least one logical channel group may be expressed and the BSR MAC CE may have a variable size.

Also, for example, referring to FIG. 22(*c*), the UE may configure a new MAC CE and, through this, may provide buffered data information to the base station. Here, the new MAC may be a MAC CE that represents a data amount of the DTCH without considering a data amount of another logical channel. That is, referring to FIG. 22(*c*), the MAC CE may represent an amount of data that may be transmitted in a PDCP or an RLC buffer without a logical channel group ID.

Also, for example, referring to the aforementioned FIG. 21(*c*), the UE 2110 may include a data amount of the PDCP or the RLC buffer in an RRC message and may transmit the same to the base station 2120. That is, the UE 2110 may indicate a buffered data amount to the base station 2120 through not the BSR MAC CE but the RRC message. Here, information on data volume may be included in the RRC message. Here, information on the data volume may include an ID associated with a logical channel group and a 6-bt data volume, which is similar to the BSR MAC CE. Here, the data volume may not be limited to representing a data amount within the data range of unit of bytes that are expressed as 6 bits.

Here, for example, information on a logical channel may not be required for buffered data. Considering this, the RRC message may also include only information on the buffered data amount, as illustrated in FIG. 22(*c*).

As another example, the UE 2110 may provide only information on the data amount range without providing information on an accurate data amount to the base station 2120. In detail, for example, in Table 15, the data volume included in the RRC message may be represented as "BIT STRING (SIZE (X))". As another example, the data volume included in the RRC message may be represented as "INTEGER X". As another example, the data volume included in the RRC message may be represented using "Low", "Medium", and "High". Here, the representation of the data volume is provided as an example only and, without being limited to the aforementioned example, may be represented in more grades. For example, in the following Table 15, an information element related to the data volume may be defined in an "RRCResumeRequest" message transmitted through an msgA PUSCH. Here, a new RRC message for small data transmission may be defined and an item that specifies a size of data may be added, but the present disclosure is not limited to the aforementioned example.

TABLE 15

```
-- ASN1START
-- TAG-RRCRESUMEREQUEST-START
RRCResumeRequest ::=        SEQUENCE {
     rrcResumeRequest        RRCResumeRequest-IEs
}
RRCResumeRequest-IEs ::=    SEQUENCE {
   resumeIdentity           ShortI-RNTI-Value,
   resumeMAC-I              BIT STRING (SIZE (16)),
   resumeCause              ResumeCause,
   spare                    BIT STRING (SIZE (1))
     datavolume             BIT STRING
(SIZE (X)) or
```

TABLE 15-continued

```
                              INTEGER X or
       ENUMERATED {low, medium, high}
   }
-- TAG-RRCRESUMEREQUEST-STOP
-- ASN1STOP
```

Then, the base station 2120 may transmit FallbackRAR to the UE 2110. For example, FallbackRAR may include UL grant information. Here, the UL grant may be determined based on a CCCH size and a data size that is specified in the BSR MAC CE. Here, the UE 2110 may determine a new TBS based on the UL grant of FallbackRAR. The UE 2110 may transmit Msg3 that includes the CCCH and uplink data (small data) to the base station 2120 based on the determined TBS. As described above, the UE 2110 may transmit the small data to the base station 2120, while maintaining an inactive state.

Here, for example, in the case of the existing 2-step RACH, when the base station 2120 successfully decodes the preamble and the PUSCH, the base station 2120 may configure SuccessRAR in msgB and may transmit the same to the UE 2110. Here, since the base station 2120 needs to allocate the UL grant to the UE 2110, the base station 2120 may allocate the UL grant to the UE 2110 through Fallback-RAR without transmitting SuccessRAR.

As another example, when the base station 2120 receives information of small data through the CCCH from the UE 2110, the base station 2120 may transmit a new type of RAR to the UE 2110. Here, the new type of RAR may include a UL grant. Here, since the UE 2110 has received the RAR that includes the UL grant, the UE 2110 may determine a new TBS based on the UL grant and may determine whether the CCCH and the uplink data are transmittable. That is, when the new type of RAR that includes the UL grant is verified, the UE 2110 may determine whether Msg3 transmission is possible.

As another example, a case in which the UE 2110 receives RAR from the base station and transmits only uplink data based on a UL grant may be considered. That is, a case in which Msg 3 includes only the uplink data without including the CCCH may be considered. Here, for example, the RAR may include information regarding whether to transmit the CCCH and the uplink data or whether to transmit only the uplink data with Msg 3. For example, the corresponding information may be a small data indication, but the present disclosure is not limited to the corresponding name. Here, for example, when the small data indication included in the RAR is "0", the UE 2110 may transmit the uplink data with the CCCH using Msg3. Also, when the small data indication included in the RAR is "1", the UE 2110 may transmit only the uplink data using Msg3. That is, indication information regarding whether to include only the uplink data in Msg 3 may be included in the RAR, but the present disclosure is not limited to the aforementioned example.

As another example, the UE 2110 in the RRC connected state may perform a data transmission through the random access procedure. For example, a case in which the UE 2110 in the RRC connected state performs C-DRX may be considered. Here, the UE 2110 in the RRC connected state may perform the random access procedure and may report buffered data to the base station 2120. Then, as is described above, the UE 2110 may receive a UL grant from the base station 2120 and may transmit data through Msg 3. Here, when the UE 2110 completes the data transmission based on the aforementioned method, the UE 2110 may maintain the C-DRX. For example, here, maintaining the C-DRX may be defined by a command from the base station 2120 or a UE operation.

Figure 23:
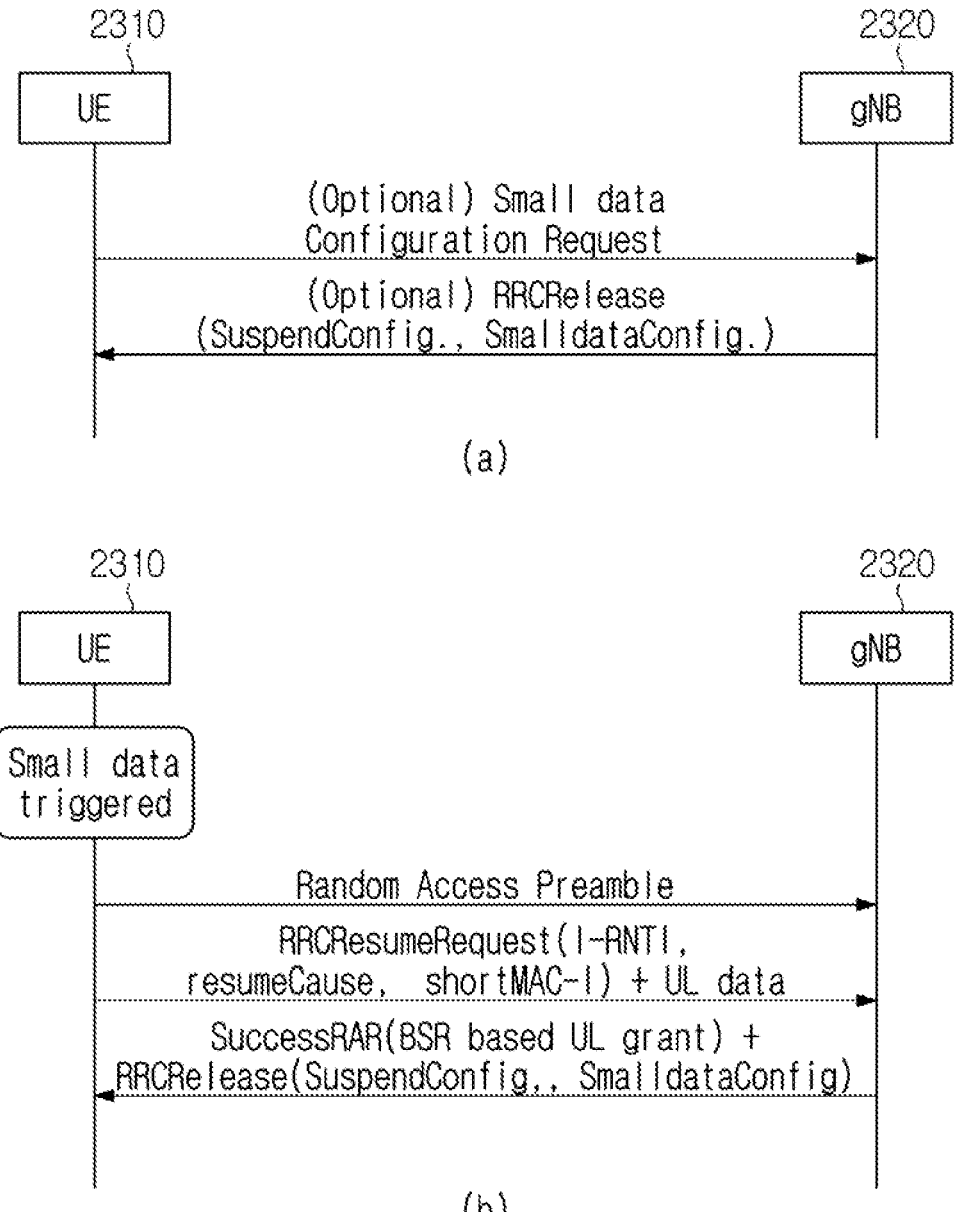
FIG. 23 illustrates a method of transmitting, by a UE, small data to which the present disclosure may apply.

FIG. 23 illustrates a method of transmitting, by a UE, small data to which the present disclosure may apply.

As described above, when a small data transmission is triggered in a UE 2310, the UE 2310 may transmit small data in a random access procedure.

In more detail, referring to FIG. 23(*a*), when a small data transmission is expected in the UE 2310, the UE 2310 may transmit a small data configuration request to a base station 2320 (e.g., gNB). Here, the small data configuration may include TBS information based on the expected small data. Then, the UE 2310 may receive an RRC release message from the base station 2320. Here, a small data configuration request transmission may be an optional procedure and the base station 2320 may transmit the RRC release message to the UE 2310 even without receiving the small data configuration request from the UE 2310.

Here, the RRC release message may include at least one of "suspendConfig" and "SmalldataConfig". Here, for example, after the UE 2310 receives the RRC release message, the UE 2310 may shift to an RRC inactive state based on "suspendConfig". Also, the UE 2310 may enable the small data configuration to perform the small data transmission through the random access procedure through "SmalldataConfig" of the RRC release message.

As another example, "SmalldataConfig" may be indicated to the UE 2310 through system information without being transmitted through the RRC release message. For example, "SmalldataConfig" may be included in the system information received from the base station 2320 and the UE 2310 may receive the system information and then enable the small data configuration in the RRC inactive state. Also, for example, the information element "SmalldataConfig" is provided as an example only and the present disclosure is not limited to the name. That is, the information element that enables small data configuration may be set to another name such that the UE in the RRC inactive state may perform the small data transmission through the random access procedure and the present disclosure is not limited to the aforementioned example.

Here, for example, referring to FIG. 23(*b*), when the small data configuration is enabled in the UE 2310, a new PRACH configuration may be added to the UE or a RO associated with SSB/CSI-RS in the existing PRACH configuration may be designated as a RO for the small data transmission. That is, a new PRACH configuration that aims the small data transmission may be added to the UE 2310. Alternatively, the RO for the small data transmission may be designated in the UE 2310 and the UE 2310 may perform the small data transmission through the corresponding RO, which is described below.

Here, for example, when the new PRACH configuration that aims the small data transmission is added to the UE 2310, the UE 2310 may transmit larger uplink data than the existing PRACH in the random access procedure. In detail, for example, in the case of a 4-step RACH, the UE 2310 may select a preamble from the new PRACH configuration. Here, the UE 2310 may transmit the preamble to the base station 2320 and, as a response thereto, may receive RAR. Here, the UE 2310 may receive a UL grant capable of determining a larger TBS than a TBS determinable in the existing PRACH configuration through the RAR. Then, the UE 2310 may transmit small data to the base station 2320 using Msg 3 through the allocated UL grant.

As another example, in the case of the 2-step RACH, the UE may differently configure a TBS determination according to the number of PRBS and an MCS index within msgA-PUSCH. Here, the UE 2310 may transmit small data to the base station 2320 using Msg A through an msgA-PUSCH configuration capable of determining a larger TBS than the existing PRACH.

As another example, a RO associated with SSB/CSI-RS may be additionally designated in the existing PRACH configuration. Here, the UE 2310 may determine a TBS to be different from other ROs in the additionally designated RO. Also, for example, in the case of CFRA, the UE 2310 may also specify 4-step and 2-step CFRA resources among PRACH resources configured in a UL BWP. Also, the UE 2310 may also specify 4-step and 2-step CFRA resources among newly configured PRACH resources, which is described below.

Also, for example, referring to the following Table 16, the UE may receive information element "rach-ConfigCommon" for the 4-step RACH and information element "msgA-ConfigCommon" for the 2-step RACH in BWP through system information from the base station. Also, referring to Table 17, "msgA-ConfigCommon" may include information element "rach-ConfigCommonTwoStepRA" and information element "msgA-PUSCH Configuration" for the 2-step RACH.

Here, for example, an msgA PUSCH configuration for the 2-step RACH may be differently configured for each BWP. For example, although at least two msgA PUSCH configurations are possible for an RRC connected state or an RRC inactive state and an RRC idle state, the present disclosure is not limited thereto. That is, in each state, the msgA PUSCH configuration may be configured for each of preamble groups A and B.

Here, for example, the PRACH configuration for small data may be added as system information. For example, in the following Table 16, information element "smalldata-ConfigCommon" may be added and the UE may receive the system information that includes the aforementioned information from the base station. Here, the information element "smalldata-ConfigCommon" may be represented as the following Table 18. Also, as described above, resource configurations for the 2-step RACH and the 4-step RACH may be added. As another example, "SmalldataConfig" may be included in not the system information but the RRC release message. Here, "SmalldataConfig" may be included in "smalldata-ConfigCommon" of the following Table 18, but the present disclosure is not limited to the aforementioned example. As another example, a PRACH resource may be commonly configured in all the UEs and may be configured in a UE-dedicated manner. Therefore, the aforementioned information elements may not be limited to being commonly configured. In detail, for example, the PRACH resource may be configured in information element "BWP-UplinkDedicated" based on "smalldata-ConfigDedicated". Also, for example, the PRACH resource may be configured in "SmalldataConfig" of the RRC release message as "smalldata-ConfigDedicated", but the present disclosure is not limited to the aforementioned example.

Also, for example, at least one PRACH configuration may be added. For example, at least one PRACH configuration may be added to design the TBS range to be smaller. Here, for example, the number of PRACH configurations to be added may be indicated based on at least one of the aforementioned information elements. That is, although a plurality of PRACH configurations may be added, description is made for clarity of description based on a case in which two PRACH configurations are set.

As another example, in the case of matching a preamble group and the TBS range in consideration of the small data transmission, the TBS range may be matched in consideration of all of preamble groups of the existing PRACH configuration and the added PRACH configuration. As another example, the existing PRACH configuration may be used for an initial access or another purpose and only a new PRACH configuration may be used for the small data transmission. That is, the TBS may be determined in consideration of only a preamble group within the new PRACH configuration. Here, for example, the new PRACH configuration may be a small data dedicated PRACH configuration and may not be used for different use. However, it is provided as an example only and the present disclosure is not limited thereto.

TABLE 16

```
-- ASN1START
-- TAG-BWP-UPLINKCOMMON-START
BWP-UplinkCommon ::=            SEQUENCE {
    genericParameters          BWP,
    rach-ConfigCommon          SetupRelease { RACH-
ConfigCommon }                     OPTIONAL,
-- Need M
    pusch-ConfigCommon         SetupRelease { PUSCH-
ConfigCommon }                     OPTIONAL, -
- Need M
    pucch-ConfigCommon         SetupRelease { PUCCH-
ConfigCommon }                     OPTIONAL, -
- Need M
    ...,
    [[
    rach-ConfigCommonIAB-r16   SetupRelease { RACH-
ConfigCommonIAB-r16}               OPTIONAL,
-- Need M
    useInterlacePUCCH-PUSCH-r16  ENUMERATED {enabled}
OPTIONAL, -- Need M
    msgA-ConfigCommon-r16      SetupRelease { MsgA-
ConfigCommon-r16}                  OPTIONAL
-- Cond SpCellOnly2
        smalldata-ConfigCommon     SetupRelease
{ Smalldata-ConfigCommon }
OPTIONAL, -- Cond or M
]]
}
-- TAG-BWP-UPLINKCOMMON-STOP
-- ASN1STOP
```

TABLE 17

```
-- ASN1START
-- TAG-MSGA-CONFIG-COMMON-START
MsgA-ConfigCommon-r16 ::=          SEQUENCE {
    rach-ConfigCommonTwoStepRA-r16    RACH-
ConfigCommonTwoStepRA-r16,
    msgA-PUSCH-Config-r16          MsgA-PUSCH-Config-r16
}
-- TAG-MSGA-CONFIG-COMMON-STOP
-- ASN1STOP
```

TABLE 18

```
MsgA-ConfigCommon-r16 ::=          SEQUENCE {
    rach-ConfigCommon              RACH-
ConfigCommonSD,
        rach-ConfigCommonTwoStepRA     RACH-
ConfigCommonSDTwoStepRA,
    msgA-PUSCH-Config              MsgA-PUSCH-
ConfigSD
}
```

Figure 24:
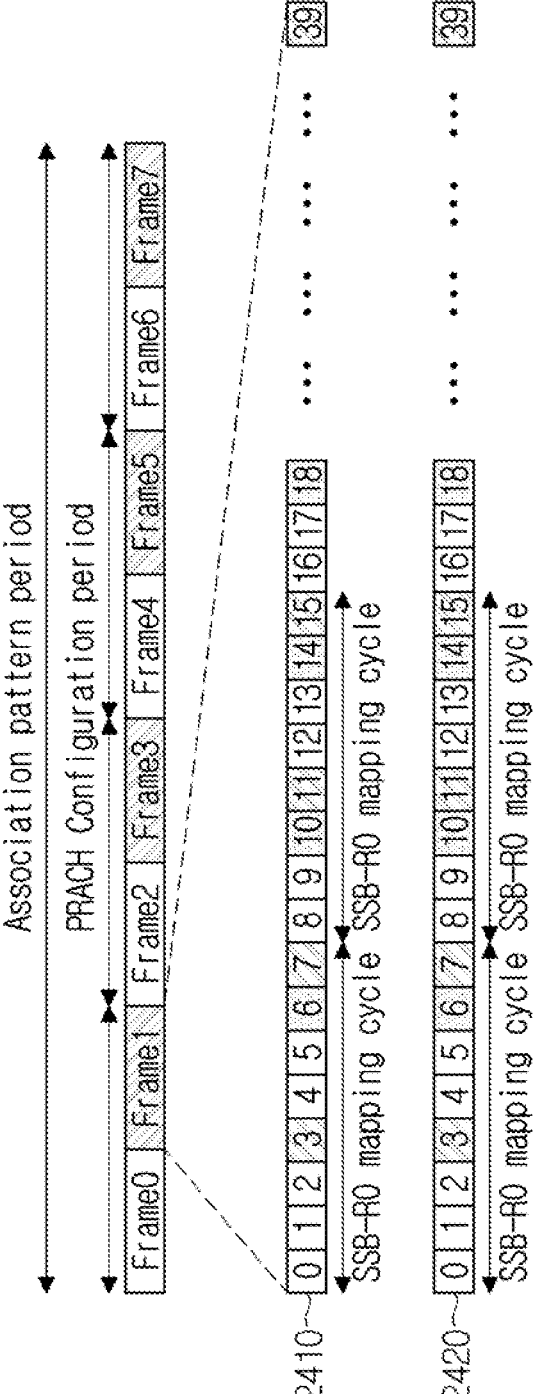
FIG. 24 illustrates a method of transmitting small data based on a contention-based random access (CBRA) to which the present disclosure may apply.

FIG. 24 illustrates a method of transmitting small data based on a CBRA to which the present disclosure may apply.

As described above, a new PRACH configuration may be added to transmit small data generated in a UE. Here, for example, referring to FIG. 24, the PRACH configuration may be added based on the same PRACH index. For example, a PRACH configuration index configured in "RACH-ConfigCommon" or "RACH-ConfigCommonT-woStepRA" and an additional PRACH configuration index may be the same. That is, two PRACH configurations 2410 and 2420 may be present. Here, the two PRACH configurations 2410 and 2420 may have the same PRACH configuration period or SSB-R0 mapping and each PRACH configuration may be split on a frequency resource. Here, for example, one of the two PRACH configurations may be configured such that an idle/inactive/connected UE may be used for various purposes (e.g., initial access, SI request). Also, the other PRACH configuration may be used for the UE to transmit small data. That is, a PRACH configuration for the small data transmission may be added. Here, for example, the base station may configure the additionally configured PRACH configuration for all of the 4-step RACH and the 2-step RACH, which is not limited to a specific type. Here, for example, even for the same PRACH configuration index, the TBS may be differently determined according to a preamble group. Also, for example, for different PRACH configuration indexes, TBSs capable of determining RACH resources may be different. Through this, the UE may perform the small data transmission in consideration of different TBSs.

Figure 25:
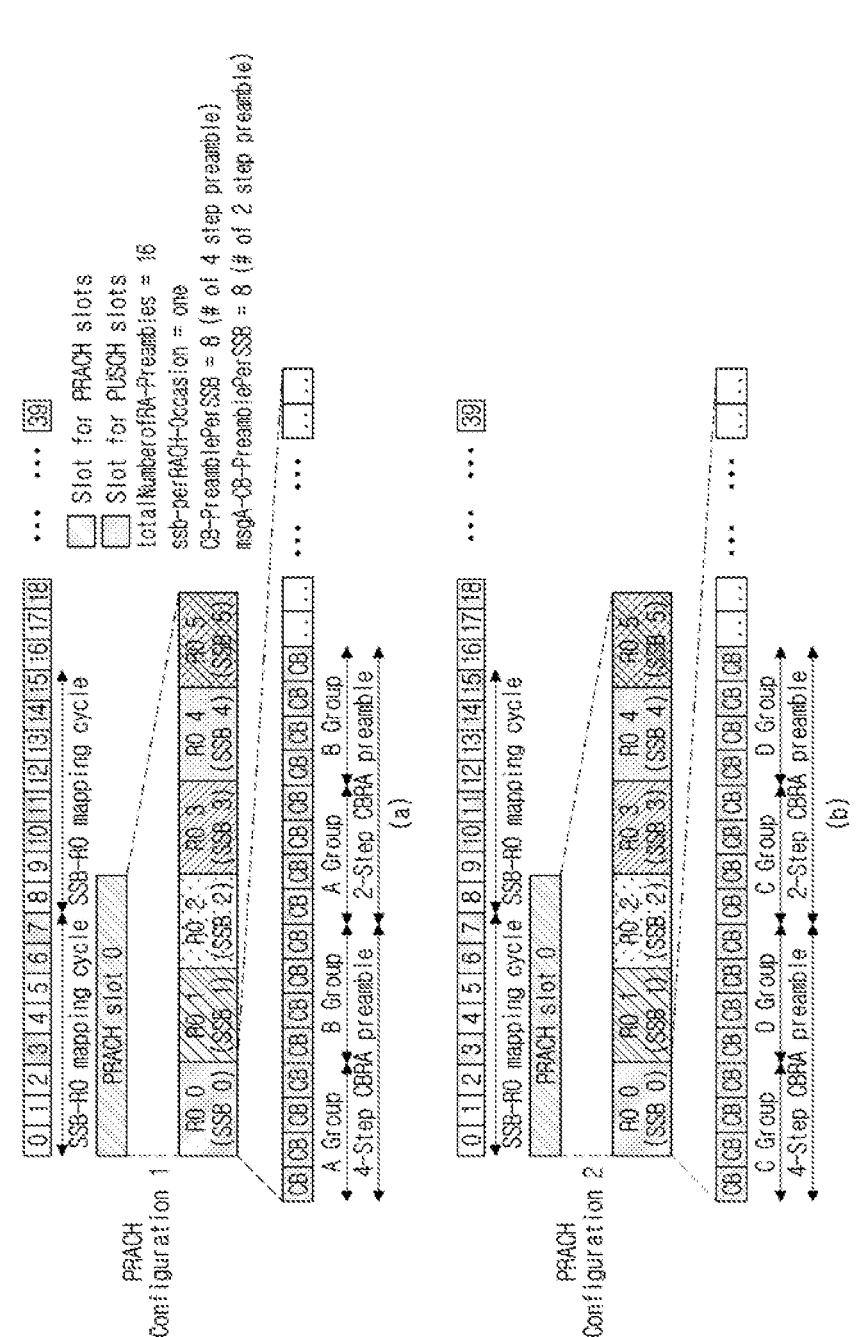
FIG. 25 illustrates a method of transmitting small data through an additional PRACH configuration to which the present disclosure may apply.

FIG. 25 illustrates a method of transmitting small data through an additional PRACH configuration to which the present disclosure may apply.

For example, as described above, two PRACH configuration indexes may be configured and one may be used for small data transmission. Here, referring to FIG. 25, PRACH configuration 1 and PRACH configuration 2 may be considered. Here, FIG. 25 may represent a case in which all of PRACH configuration 1 and PRACH configuration 2 are based on PRACH configuration index 11. Also, FIG. 25 may represent a PRACH slot configuration for reference SCS=60 KHz. Also, the number of ROs per single PRACH slot may be 6 and a total number of preambles for CB and CF per RO may be 16. Also, the number of SSBs per RO may be 1, the number of CB preambles per SSB may be 8, and the number of CF preamble may be 8. Also, the 2-step RACH may be added and, in the 4-step RACH, the number of CF preambles corresponding to "msgA-CB-PreamblePerSSB" among the CF preambles may be allocated as 2-step RACH CB preambles. Here, in FIG. 25, all of eight CF preambles may be allocated as preambles for the 2-step RACH. Here, FIG. 25 is provided as an example only for clarity of description, and it may be differently set.

For example, referring to FIG. 25, a plurality of PRACH slots may be configured in terms of frequency in the same time. That is, PRACH configuration 1 and PRACH configuration 2 may have the same pattern in a time domain and may use different frequency resources. Here, since the plurality of PRACH configurations are present and have the same pattern in the time domain, the number of available preambles per SSB may increase. For example, considering a case in which two preamble groups are set for each PRACH configuration, the UE may select four preamble groups. Here, referring to FIG. 25, group A and B may be configured in PRACH configuration 1 and group C and D may be configured in PRACH configuration 2. Here, a preamble group may be flexibly selected in consideration of a CCCH size and an uplink data size and pathloss.

In more detail, for example, a case in which the UE measures an RSRP and selects a RACH type according to the RSRP may be considered. Here, when the UE selects the 2-step RACH and selects a preamble group, the UE may select the preamble group by comparing the CCCH size and the uplink data size based on RRC parameter "msgA size Group A, B, C". For example, the parameter "msgA size Group A, B, C" may represent a threshold of a TBS available in each group.

Also, a case in which the UE selects the 4-step RACH as the RACH type and selects a preamble group may be considered. Here, even in the 4-step RACH, RRC parameter "msg3 size Group A, B, C" may be configured and the number of corresponding parameters may differ according to the number of preamble groups.

Also, for example, the UE may determine a preamble group in consideration of pathloss. Here, if the following Equation 11 is satisfied, group B may be selected. Here, for example, the number of "msgA-messagePowerOffset-Group" may differ according to the number of preamble groups.

$$\text{Pathloss} < \text{PCM-}C\text{-msg}A\text{-PreambleReceivedTarget-Power } sgmsgA\text{-DeltaPreamble } sgmsgA\text{-messagePowerOffsetGroup}B$$ [Equation 11]

Based on the aforementioned description, a detailed operation of the UE may be performed as follows. For example, the UE may measure an RSRP and may select at least one of the 4-step RACH and the 2-step RACH based on the RSRP. Here, when the UE selects the 4-step RACH, the UE may select a preamble group in consideration of the CCCH size and the uplink data size. Then, the UE may randomly select a preamble within the selected preamble group and may transmit the selected preamble to the base station. Here, when the base station successfully decodes the preamble, the base station may verify a resource location of the preamble, may determine a UL grant of RAR based on the resource location, and may transmit the UL grant to the UE. That is, a resource location may differ for each preamble group and the base station may verify the resource location of the preamble and may transmit the UL grant based on the corresponding preamble group to the UE. Here, the UE may receive RAR and may determine a TBS based on the UL grant included in the RAR. Then, the UE may transmit the CCCH and the uplink data through Msg 3. Through this, the UE may perform a small data transmission through a random access procedure without shifting to an RRC connected state.

Also, for example, when the UE selects the 2-step RACH based on the RSRP, the UE may select a preamble group in consideration of the CCCH size and the uplink data size. The UE may select a preamble within the selected preamble group and may transmit the selected preamble to the base station. Here, the UE may transmit all of the preamble and the uplink data to the base station. For example, the TBS may differ for each preamble group, and the UE may select a corresponding preamble group in consideration of the CCCH size and the uplink data size, and may transmit the uplink data with the preamble within the selected group. Then, when the base station does not decode a PUSCH, the base station may transmit FallbackRAR to the UE. Here, FallbackRAR may include a UL grant. For example, the UL grant may be determined based on an MsgA-PUSCH group. Then, the UE may transmit the CCCH and the uplink data to the base station through the UL grant. Through this, the UE may perform the small data transmission through the random access procedure without shifting to the RRC connected state.

Also, for example, for the aforementioned operation, the base station may determine a corresponding TBS for each preamble group. For example, as described above, when two PRACHs are configured for the small data transmission, a corresponding TBS for each preamble group may be determined.

Here, for example, a fixed TBS may be allocated for each preamble group. That is, a specific preamble group may correspond to a specific TBS range. Here, the UE may verify a corresponding TBS range based on the CCCH size and the uplink data size and may select the specific preamble group. Then, the UE may randomly select a preamble within the selected preamble group and may transmit the selected preamble to the base station.

Also, for example, an overlapping TBS may be allocated for each preamble group. That is, a plurality of preamble groups corresponding to the same TBS may be present. Here, the UE may verify a corresponding TBS in consideration of the CCCH size and the uplink data size and may verify at least one preamble group corresponding to the TBS. Here, the UE may select a preamble group configured within a PRACH configuration that is configured for the small data transmission among the plurality of PRACH configurations. Then, the UE may randomly select a preamble within the selected preamble group and may transmit the selected preamble to the base station.

As another example, when the base station determines a TBS corresponding to a preamble group, the base station may determine the TBS based on all the PRACH configurations. For example, as described above, an additional PRACH may be configured in consideration of the small data transmission. That is, the plurality of PRACH configurations may be present. Here, at least one preamble group may be configured in each PRACH configuration. For example, when the base station determines a TBS corresponding to a preamble group, the base station may determine the TBS based on all the PRACH configurations. That is, the base station may determine the TBS in consideration of all preamble groups within all the PRACH configurations.

As another example, the base station may determine a TBS for each PRACH configuration. Here, as described above, when the plurality of PRACH configurations is present, the TBS may be determined for a preamble group included in an individual PRACH configuration. That is, the base station may determine the TBS corresponding to the preamble group within the individual PRACH configuration without considering another PRACH configuration.

As described above, the base station may determine the TBS for the preamble group using various methods and the present disclosure is not limited to the aforementioned method.

Figure 26:
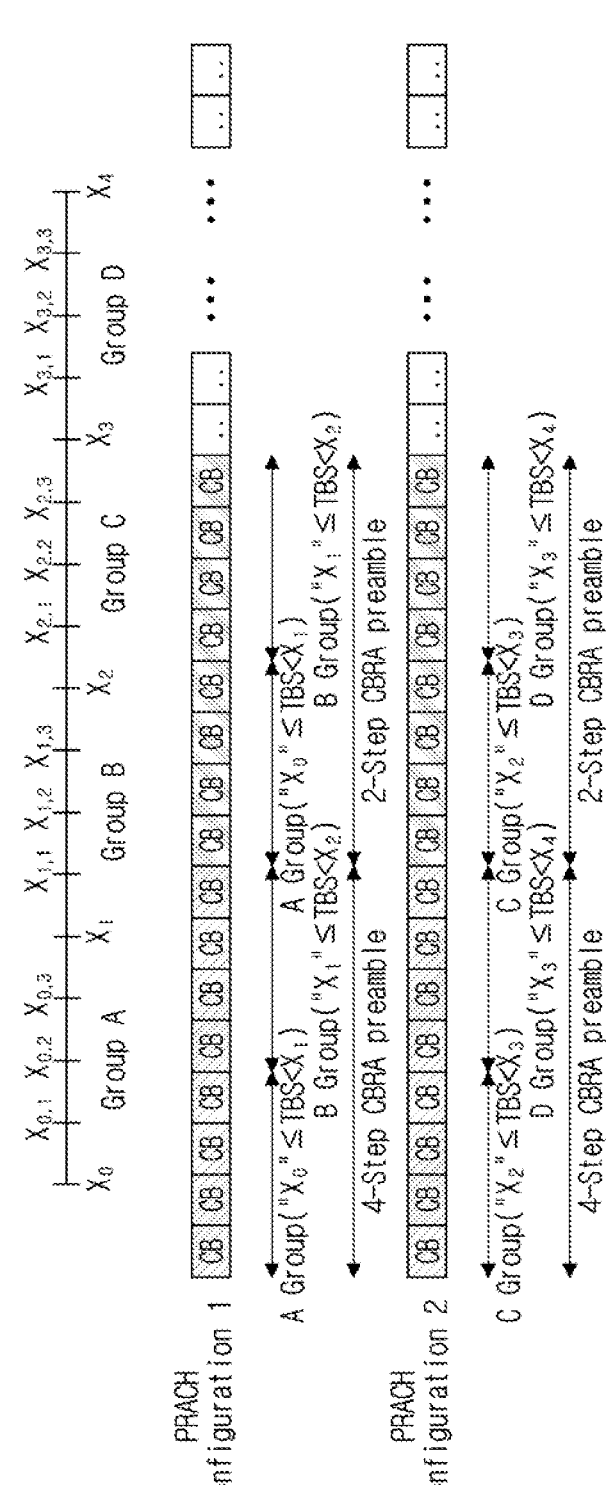
FIG. 26 illustrates a method of determining a transport block size (TBS) to which the present disclosure may apply.

FIG. 26 illustrates a method of determining a transport block size (TBS) to which the present disclosure may apply.

As described above, an additional PRACH may be configured for small data transmission. Here, for example, referring to FIG. 26, PRACH configuration 1 and PRACH configuration 2 may be configured in consideration of the small data transmission. Here, PRACH configuration 1 and PRACH configuration 2 may have the same PRACH configuration index. That is, two PRACH configurations may have the same pattern in a time domain and different frequencies may be allocated to the PRACH configurations in a frequency domain. Here, for example, a fixed determinable TBS may be allocated for each preamble group. For example, since two preamble groups are present for each PRACH configuration, groups A, B, C, and D may be sequentially defined.

In more detail, in FIG. 26, a TBS of group A may be set to $X_0 \leq \text{TBS} < X_1$, a TBS of group B may be set to $X_1 \leq \text{TBS} < X_2$, a TBS of group C may be set to $X_2 \leq \text{TBS} < X_3$, and a TBS of group D may be set to $X_3 \leq TBS < X_4$. However, it is provided as an example only and the present disclosure is not limited to the aforementioned example. Here, $X_0$ and $X_4$ may denote a minimum value and a maximum value of an available TBS, respectively.

Also, all the configurations in the 4-step RACH and the 2-step RACH may be the same. Therefore, after a RACH type is selected, a preamble group may be selected based on the same assumption. Here, for example, in FIG. 26, since PRACH configuration 1 and PRACH configuration 2 have the same PRACH configuration index, a RACH resource may be flexibly selected within a slot in which a PRACH slot is present.

Here, for example, a case in which small data is triggered in the UE at time t may be considered. Here, when the UE performs a RACH for small data transmission, the UE may select a RACH type based on an RSRP. Then, the UE may select one of preamble groups A, B, C, and D in consideration of a CCCH size and an uplink data size. The UE may randomly select a preamble within the selected preamble group and may transmit the selected preamble to the base station. Here, as described above, the UE may transmit uplink data through Msg A or Msg 3 and may maintain an inactive state.

Figure 27:
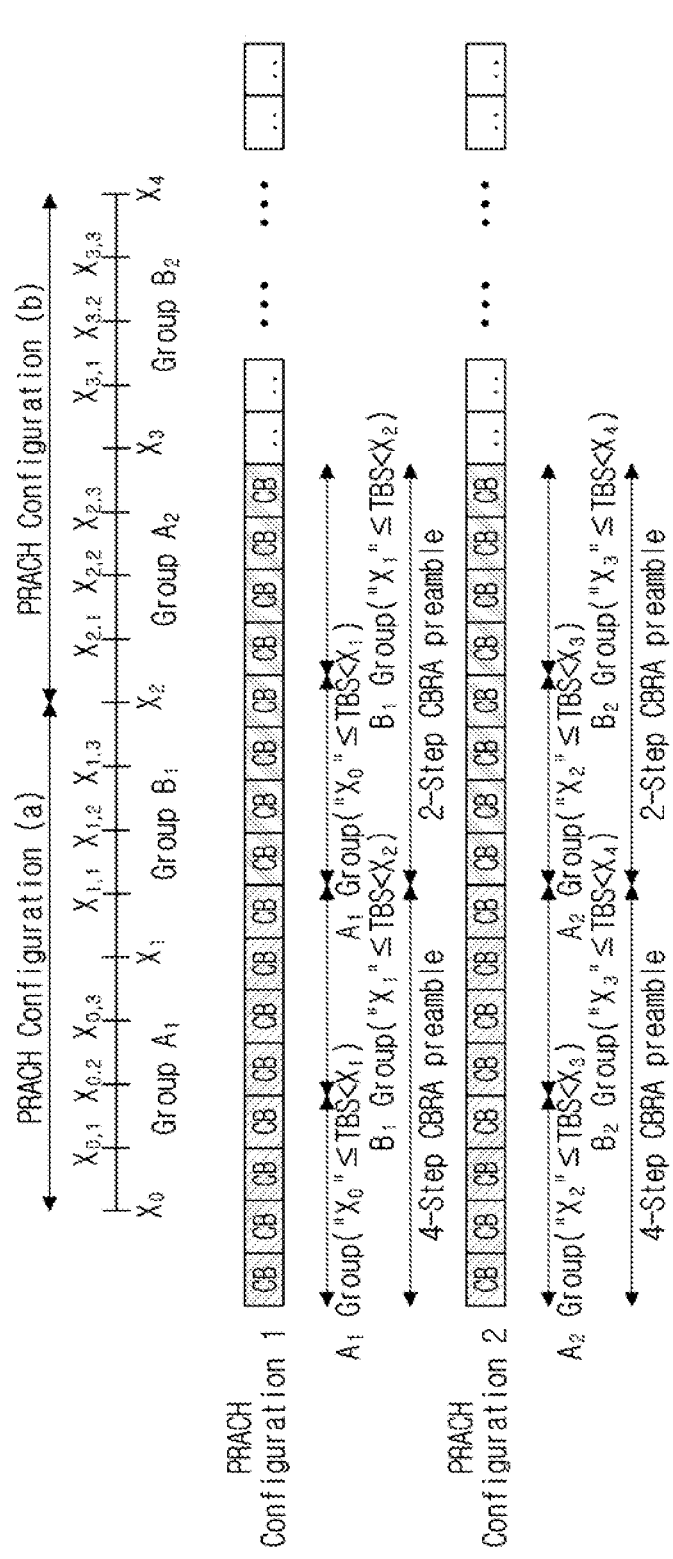
FIG. 27 illustrates a TBS determination method to which the present disclosure may apply.

FIG. 27 illustrates a TBS determination method to which the present disclosure may apply.

As described above, an additional PRACH may be configured for small data transmission. Here, for example, referring to FIG. 27, PRACH configuration 1 and PRACH configuration 2 may be configured in consideration of the small data transmission. Here, PRACH configuration 1 and PRACH configuration 2 may have the same PRACH configuration index. That is, two PRACH configurations may have the same pattern in a time domain and different frequencies may be allocated to the PRACH configurations in a frequency domain. Here, for example, a fixed determinable TBS may be allocated for each preamble group. Here, the TBS may be allocated for each PRACH configuration. For example, the TBS may correspond to preamble group A and preamble group B included in PRACH configuration 1. Also, preamble group A and preamble group B may also be configured in PRACH configuration 2. Here, each corresponding TBS may be set to each preamble group. That is, a preamble group may be determined for each PRACH configuration. Here, for example, the UE may use PRACH configuration 1 for an initial access and the like. Also, the UE may use PRACH configuration 2 for the small data transmission. Considering this, a TBS corresponding to a preamble group included in PRACH configuration 1 and a TB S corresponding to a preamble group included in PRACH configuration 2 may be differently set.

For example, since PRACH configuration 2 is used for the small data transmission, a TBS section greater than PRACH configuration 1 may be allocated. Here, since each PRACH configuration includes preamble groups A and B, preamble groups $A_1$ and $B_1$ may be configured as preambles for the 4-step RACH and the 2-step RACH in PRACH configuration 1. Also, preamble groups $A_2$ and $B_2$ may be configured as preambles for the 4-step RACH and the 2-step RACH in PRACH configuration 2.

Here, for example, a TBS of group $A_1$ may be $X_0 \leq TBS < X_1$ and a TBS of group $B_1$ may be $X_1 \leq TBS < X_2$. Also, a TBS of group $A_2$ may be $X_2 \leq TBS < X_3$ and a TBS of the group $B_2$ may be $X_3 \leq TBS < X_4$. Here, $X_0$ and $X_4$ may denote a minimum value and a maximum value of an available TBS, respectively. That is, as described above, a greater TBS may correspond to a preamble group of PRACH configuration 2 for the small data transmissions. Also, all the configurations in the 4-step RACH and the 2-step RACH may be the same. Therefore, the UE may select a preamble group through the same process after selecting a RACH type. Also, as described above, since PRACH configuration 1 and PRACH configuration 2 have the same PRACH configuration index, a RACH resource may be flexibly selected in a slot in which a PRACH slot is present.

Here, for example, a case in which small data is triggered in the UE at time t may be considered. Here, when the UE performs a RACH for small data transmission, the UE may select a RACH type based on an RSRP. Then, the UE may select one of preamble groups A and B in consideration of a CCCH size and an uplink data size. Here, PRACH configuration 2 may be a PRACH configuration for small data and the UE may select one of preamble groups A and B of PRACH configuration 2. Then, the UE may randomly select a preamble within the selected preamble group and may transmit the selected preamble to the base station. Here, as described above, the UE may transmit uplink data through Msg A or Msg 3 and may maintain an inactive state.

Figure 28:
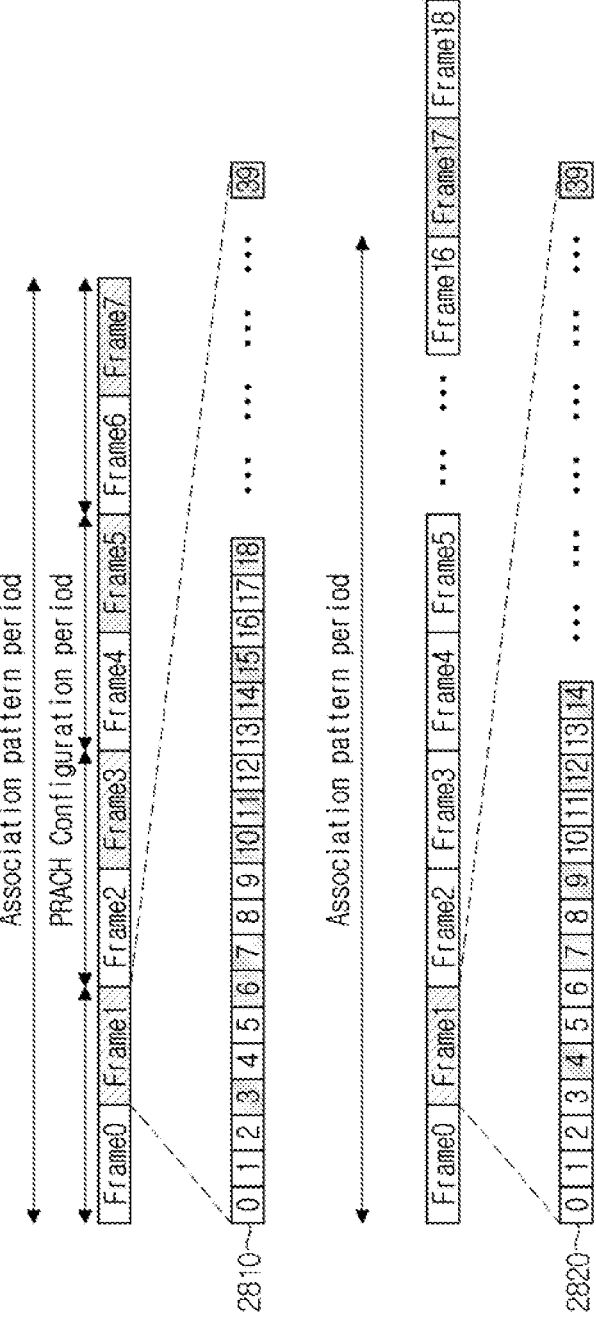
FIG. 28 illustrates a method of configuring a plurality of PRACHs each having a different PRACH configuration index to which the present disclosure may apply.

FIG. 28 illustrates a method of configuring a plurality of PRACHs each having a different PRACH configuration index to which the present disclosure may apply.

As described above, a new PRACH configuration may be added to transmit small data generated in a UE. Here, for example, referring to FIG. 28, the PRACH configuration may be added based on a different PRACH index. For example, a PRACH configuration index configured in "RACH-ConfigCommon" or "RACH-ConfigCommonTwoStepRA" and an additional PRACH configuration index may differ from each other. That is, two PRACH configurations 2810 and 2820 may be present. Here, the two PRACH configurations 2810 and 2820 have different PRACH configuration indexes and may have different PRACH configuration period or SSB-R0 mapping accordingly.

Therefore, it may be impossible to mix two PRACH configurations at the same point in time and to divide an available TBS section according to a preamble group. Here, for example, the base station may allocate a different TBS section for each PRACH configuration and a TBS may correspond to a PRACH configuration for small data transmission. Also, for example, the base station may configure all of the 4-step RACH and the 2-step RACH in the additional RACH configuration. Here, RACH resources to be configured may be determined according to two PRACH configuration indexes. Here, TBSs of the determined RACH resources may differ from each other.

Figure 29:
FIG. 29 illustrates a method of transmitting small data through an additional PRACH configuration to which the present disclosure may apply.

FIG. 29 illustrates a method of transmitting small data through an additional PRACH configuration to which the present disclosure may apply.

For example, as described above, two PRACH configuration indexes may be configured and one may be used for small data transmission. Here, referring to FIG. 29, PRACH configuration 1 and PRACH configuration 2 may be considered. Here, FIG. 29 may represent a case in which PRACH configuration 1 has a PRACH configuration index of 11 and PRACH configuration 2 has a PRACH configuration index of 0. Also, in FIG. 29, PRACH configuration 1 may be a PRACH slot configuration for reference SCS=60 KHz. Also, the number of ROs per single PRACH slot may be 6 and a total number of preambles for CB and CF per RO may be 16. Also, the number of SSBs per RO may be 1, the number of CB preambles per SSB may be 8, and the number of CF preamble may be 8. Also, the 2-step RACH may be added and, in the 4-step RACH, the number of CF preambles corresponding to "msgA-CB-PreamblePerSSB" among the CF preambles may be allocated as 2-step RACH CB preambles. Here, in FIG. 29, all of eight CF preambles may be allocated as preambles for the 2-step RACH.

Also, PRACH configuration 2 may be a PRACH slot configuration for reference SCS=60 KHz. Also, the number of ROs per single PRACH slot may be 6 and a total number of preambles for CB and CF per RO may be 20. Also, the number of SSBs per RO may be 1, the number of CB preambles per SSB may be 10, and the number of CF preamble may be 10. Also, the 2-step RACH may be added and, in the 4-step RACH, the number of CF preambles corresponding to "msgA-CB-PreamblePerSSB" among the CF preambles may be allocated as 2-step RACH CB preambles. Here, FIG. 29 is provided as an example only for clarity of description, and it may be differently set.

For example, referring to FIG. 29, the base station may need to allocate a specific TBS section for each PRACH configuration. In detail, for example, a case in which the UE measures an RSRP and selects a RACH type according to the RSRP may be considered. Here, when the UE selects the 2-step RACH and selects a preamble group, the UE may select the preamble group by comparing a CCCH size and an uplink data size based on RRC parameter "msgA size Group A". For example, the parameter "msgA size Group A" may represent a threshold of a TBS available in the preamble group.

Also, a case in which the UE selects the 4-step RACH as the RACH type and selects a preamble group may be considered. Here, even in the 4-step RACH, RRC parameter "msg3 size Group A" may be configured and the number of corresponding parameters may differ according to the number of preamble groups.

Also, for example, the UE may determine a preamble group in consideration of pathloss. Here, if the following Equation 12 is satisfied, group B may be selected. Here, for example, the number of "msgA-messagePowerOffset-Group" may differ according to the number of preamble groups.

$$\text{Pathloss} < \text{PCMAC} - \text{msg}A\text{-PreambleReceivedTarget-}$$
$$\text{Power } sgmsgA\text{-DeltaPreamble } sgmsgA\text{-message-}$$
$$\text{PowerOffsetGroupB} \qquad \text{[Equation 12]}$$

Based on the aforementioned description, a detailed operation of the UE may be performed as follows. For example, the UE may measure an RSRP and may select at least one of the 4-step RACH and the 2-step RACH based on the RSRP. Here, when the UE selects the 4-step RACH, the UE may select a preamble group in consideration of the CCCH size and the uplink data size. Then, the UE may randomly select a preamble within the selected preamble group and may transmit the selected preamble to the base station. Here, when the base station successfully decodes the preamble, the base station may verify a resource location of the preamble, may determine a UL grant of RAR based on the resource location, and may transmit the UL grant to the UE. That is, a resource location may differ for each preamble group and the base station may verify the resource location of the preamble and may transmit the UL grant based on the corresponding preamble group to the UE. Here, the UE may receive RAR and may determine a TBS based on the UL grant included in the RAR. Then, the UE may transmit the CCCH and the uplink data through Msg 3. Through this, the UE may perform a small data transmission through a random access procedure without shifting to an RRC connected state.

Also, for example, when the UE selects the 2-step RACH based on the RSRP, the UE may select a preamble group in consideration of the CCCH size and the uplink data size. The UE may select a preamble within the selected preamble group and may transmit the selected preamble to the base station. Here, the UE may transmit all of the preamble and the uplink data to the base station. For example, the TBS may differ for each preamble group, and the UE may select a corresponding preamble group in consideration of the CCCH size and the uplink data size, and may transmit the uplink data with the preamble within the selected group.

Then, when the base station does not decode the preamble and a PUSCH, the base station may transmit FallbackRAR to the UE. Here, FallbackRAR may include a UL grant. For example, the UL grant may be determined based on an MsgA-PUSCH group. Then, the UE may transmit the CCCH and the uplink data to the base station through the UL grant. Through this, the UE may perform the small data transmission through the random access procedure without shifting to the RRC connected state.

Also, for example, for the aforementioned operation, the base station may determine a corresponding TBS for each preamble group. For example, since two PRACH configurations have different PRACH configuration indexes, a TBS section may be allocated for each PRACH configuration.

Figure 30:
FIG. 30 illustrates a method of determining a TBS to which the present disclosure may apply.

FIG. 30 illustrates a method of determining a TBS to which the present disclosure may apply.

As described above, an additional PRACH may be configured for small data transmission. Here, for example, referring to FIG. 30, PRACH configuration 1 and PRACH configuration 2 may be configured in consideration of the small data transmission. Here, PRACH configuration 1 and PRACH configuration 2 may have different PRACH configuration indexes. Therefore, a preamble group may be set for each PARCH and a TBS corresponding to the preamble group may be set.

Here, for example, referring to FIG. 30, PRACH configuration 2 may be a PRACH configuration configured for the small data transmission. Considering this, a TBS corresponding to a preamble group of PRACH configuration 2 may be greater than a TBS corresponding to a preamble group of PRACH configuration 1. For example, each PRACH configuration may include preamble groups A and B. Here, in PRACH configuration 1, preamble groups $A_1$ and $B_1$ may be configured as 4-step RACH and 2-step RACH preambles, respectively. Also, for example, in PRACH configuration 2, preamble groups $A_2$ and $B_2$ may be configured as 4-step RACH and the 2-step RACH preambles, respectively. Here, a TBS of group $A_1$ may be $X_0 \le \text{TBS} < X_1$ and a TBS of group $B_1$ may be $X_1 \le \text{TBS} < X_2$. Also, a TBS of group $A_2$ may be $X_2 \le \text{TBS} < X_3$ and a TBS of the group $B_2$ may be $X_3 \le \text{TBS} < X_4$. Here, $X_0$ and $X_4$ may denote a minimum value and a maximum value of an available TBS, respectively.

Also, all the configurations in the 4-step RACH and the 2-step RACH may be the same. Therefore, the UE may select a preamble group through the same process after selecting a RACH type. Also, as described above, PRACH configuration 1 and PRACH configuration 2 may have different PRACH configuration indexes. Here, the PRACH configuration for the small data transmission may be set.

Here, for example, a case in which small data is triggered in the UE at time t may be considered. Here, when the UE performs a RACH for small data transmission, the UE may select a RACH type based on an RSRP. Then, the UE may select one of preamble groups A and B in consideration of a CCCH size and an uplink data size. Here, PRACH configuration 2 may be a PRACH configuration for small data and the UE may select one of preamble groups A and B of PRACH configuration 2. Then, the UE may randomly select a preamble within the selected preamble group and may transmit the selected preamble to the base station. Here, as described above, the UE may transmit uplink data to the base station through Msg A or Msg 3 and may maintain an inactive state.

Figure 31:
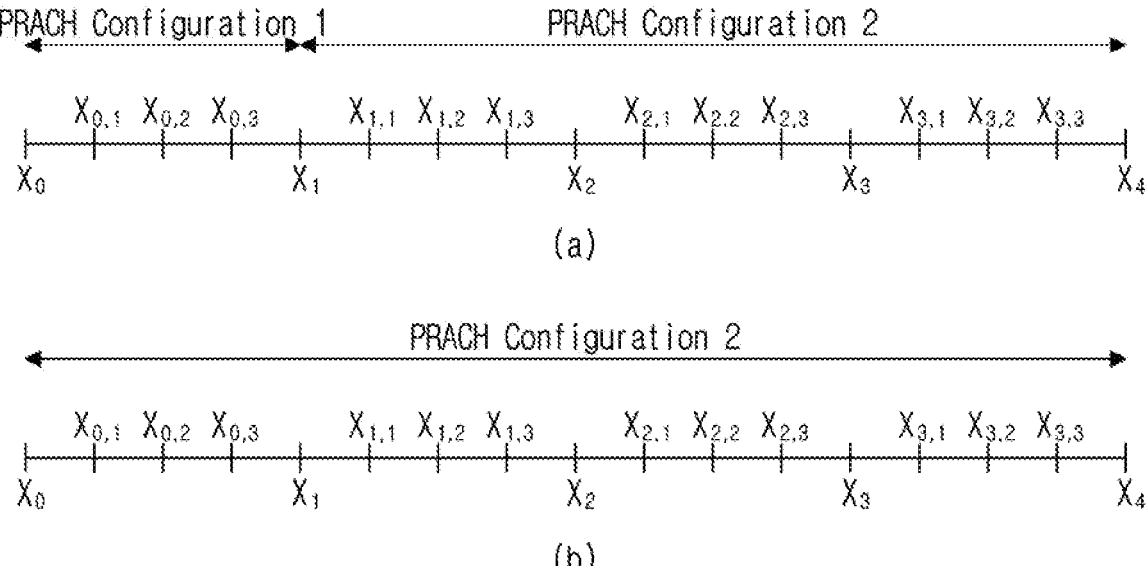
FIG. 31 illustrates a TBS determination method to which the present disclosure may apply.

FIG. 31 illustrates a TBS determination method to which the present disclosure may apply. For example, a different TBS section may be allocated for each preamble group. That is, a constant TBS section may not be allocated for each preamble group.

For example, referring to FIG. 31(a), a TBS section of PRACH configuration 1 may be $X_0 \leq TBS < X_1$. Also, a TBS section of PRACH configuration 2 may be $X_1 \leq TBS < X_4$. Also, for example, referring to FIG. 31(b), an additional TBS may be configured to be possible only in PRACH configuration 2. In contrast, CCCH and only some padding bits may be configured to be possible in PRACH configuration 1. That is, since there is a need to set a greater TBS for a PRACH configuration used for small data transmission, a TBS section may be differently set in each PRACH configuration.

Figure 32:
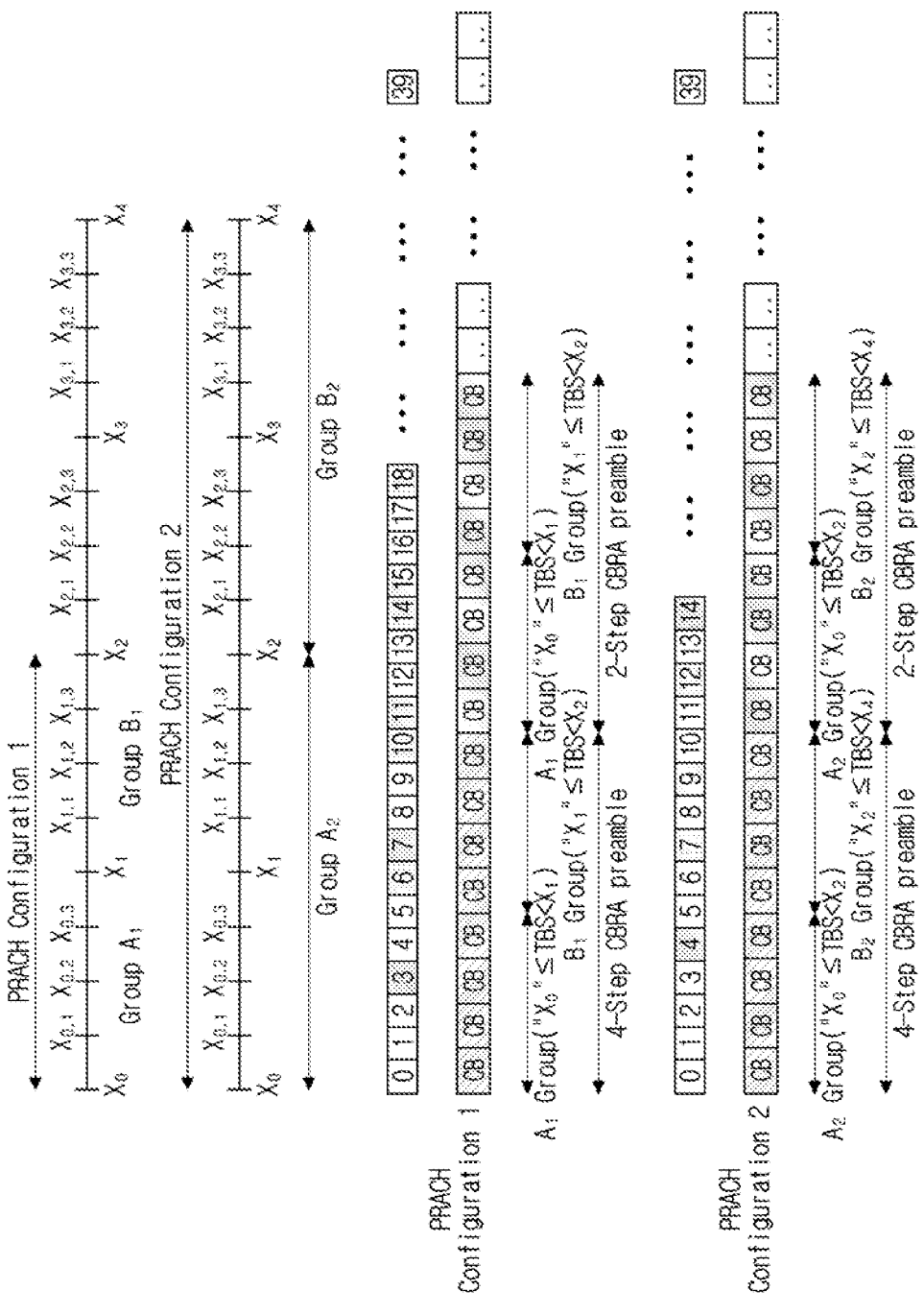
FIG. 32 illustrates a TBS determination method to which the present disclosure may apply.

FIG. 32 illustrates a TBS determination method to which the present disclosure may apply.

As described above, an additional PRACH may be configured for small data transmission. Here, for example, referring to FIG. 32, PRACH configuration 1 and PRACH configuration 2 may be configured in consideration of the small data transmission. Here, PRACH configuration 1 and PRACH configuration 2 may have different PRACH configuration indexes.

Here, for example, when an additional PRACH configuration is set for small data, a base station may overlappingly allocate a determinable TBS for each preamble group. Here, each PRACH configuration may have each corresponding preamble group. For example, a TBS section may be allocated for each PRACH configuration. Here, as described above, PRACH configuration 2 may be a PRACH configuration for the small data transmission. Therefore, a TBS of a preamble group of PRACH configuration 2 may be allocated to be greater than a TBS of a preamble group of PRACH configuration 1. In detail, each PRACH configuration may include preamble groups A and B. Here, in PRACH configuration 1, preamble groups $A_1$ and $B_1$ may be configured as 4-step RACH and the 2-step RACH preambles, respectively. Also, in PRACH configuration 2, preamble groups $A_2$ and $B_2$ may be configured as 4-step RACH and the 2-step RACH preambles, respectively.

Here, for example, a TBS of group $A_1$ may be $X_0 \leq TBS < X_1$ and a TBS of group $B_1$ may be $X_1 \leq TBS < X_2$. Also, a TBS of group $A_2$ may be $X_0 \leq TBS < X_2$ and a TBS of the group $B_2$ may be $X_2 \leq TBS < X_4$. Here, $X_0$ and $X_4$ may denote a minimum value and a maximum value of an available TBS, respectively. That is, a TBS corresponding to a preamble group of PRACH configuration for small data transmission may be greater than a TB S corresponding to a preamble group of PRACH configuration 1.

Here, for example, a case in which small data is triggered in the UE at time t may be considered. Here, when the UE performs a RACH for small data transmission, the UE may select a RACH type based on an RSRP. Then, the UE may select one of preamble groups A and B in consideration of a CCCH size and an uplink data size. Here, PRACH configuration 2 may be a PRACH configuration for small data and the UE may select one of preamble groups A and B of PRACH configuration 2. Then, the UE may randomly select a preamble within the selected preamble group and may transmit the selected preamble to the base station. Here, as described above, the UE may transmit uplink data to the base station through Msg A or Msg 3 and may maintain an inactive state.

Here, for example, in FIG. 30, if CCH size and uplink data size of UE=$X_0 \leq TBS < X_2$, a preamble group of PRACH configuration 1 may be selected. Dissimilar to FIG. 30, in FIG. 32, a preamble group including a TBS selection of $X_0 \leq TBS < X_2$ may be present in PRACH configuration 2. That is, in FIG. 30, if CCCH size and uplink data size of UE=$X_0 \leq TBS < X_2$, only a resource of PRACH configuration 1 needs to be selected. However, in FIG. 32, a resource of PRACH configuration 2 may be selected. For the above, a TBS may overlappingly correspond to a preamble group. As another example, a TBS of group $A_2$ may be configured as $X_0 \leq TBS < X_1$ and a TBS of group $B_2$ may be configured as $X_1 \leq TBS < X_4$. That is, a TBS corresponding to a preamble group may be variously set and the present disclosure is not limited to the aforementioned example.

Figure 34:
FIG. 34 illustrates a method of transmitting small data based on a CFRA to which the present disclosure may apply.

FIG. 33 illustrates a method of transmitting small data based on a CFRA to which the present disclosure may apply. Also, FIG. 34 illustrates a method of transmitting small data based on a CFRA to which the present disclosure may apply.

As described above, when small data is generated in a UE, the UE may perform an uplink transmission through a random access procedure. Here, for example, a base station may notify the UE of a CFRA resource for small data transmission through "SmalldataConfig". That is, the UE may perform the CFRA based on preamble information indicated from the base station and may perform the uplink transmission based thereon. Here, for example, the following Table 19 may be a RACH-ConfigDedicated information element. Here, the base station may explicitly indicate RACH resource information, SSB, CSI-RS, and preambles for 4-step RACH or 2-step RACH to the UE based on the aforementioned information element.

Here, for example, when a CFRA resource allocated to the UE for small data is maintained at all times, resources may be wasted. Here, considering the aforementioned description, a timer or a RO-based resource release may be required. For example, the base station may indicate releaseTimer and releaseRACHoccasion (releaseRO) to the UE in consideration of the above. Here, if releaseTmer elapses, the UE may release a CFRA resource for small data. As another example, when the number of CFRA resources corresponding to releaseRO is skipped due to small data not being generated in the UE, the UE may release the allocated CFRA resource.

TABLE 19

| MsgA-ConfigCommon-r16 ::= | SEQUENCE { |
| --- | --- |
| rach-ConfigDedicated | RACH- |
| ConfigDedicated | |
| releaseTimer | T |
| releaseRACHoccasion | INTEGER N |
| } | |

Also, for example, referring to FIG. 33, a total of 16 preambles, two SSBs per RO (ssb-perRACH-Occasion), and four CB preambles per SSB (CB-PreamblePerSSB) may be configured based on information elements of the 4-step RACH configuration. Here, a case of sharing the same RO as the 4-step RACH in the aforementioned RACH-Config-CommonTwostepRA information element may be considered. That is, a 2-step RACH CBRA preamble may be configured based on a value of "msgA-CB-Preambles- PerSSB-PerSharedRO-r16" in a preamble (non-CB) not allocated for the 4-step RACH CBRA. For example, in (a) and (b) of FIG. 33, a single preamble among contention-free preambles configured in SSB0 and SSB1 may be set as a preamble for small data. Here, in FIG. 33(a), one of four contention-free preambles may be set as a preamble for small data. In FIG. 33(b), two of contention-free preambles may be allocated as CB preambles for the 2-step RACH. Therefore, a single preamble between the remaining two contention-free preambles may be set as a preamble for small data.

Also, for example, in FIG. 34, two 2-step RACH CB preambles may be allocated based on a 2-step RAH information element within non-CB preambles that constitute the 4-step RACH. Here, the base station may notify the UE of one of non-CB preambles as a resource for small data. Here, when the small data is generated in the UE, the UE may transmit the small data by performing the CFRA in an available SSB and PRACH slot.

Figure 35:
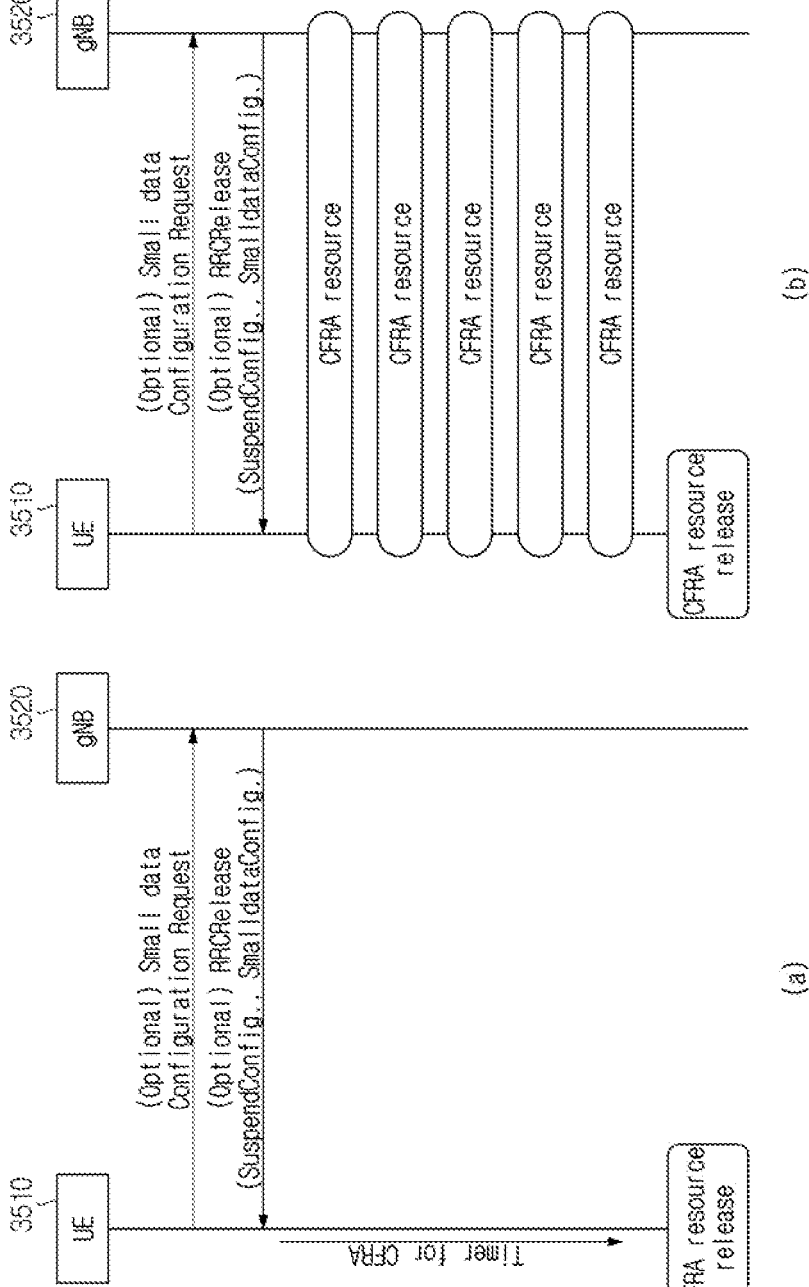
FIG. 35 illustrates a CFRA resource release method to which the present disclosure may apply.

FIG. 35 illustrates a CFRA resource release method to which the present disclosure may apply. Referring to FIG. 35, as described above, a UE 3510 may enable a small data configuration for small data transmission. Here, for example, the UE 3510 may release a CFRA resource based on at least one of releaseTimer and information on the number of specific CFRA resources. That is, as described above, if a predetermined condition is satisfied, the CFRA resource may be release to prevent the resource from being wasted. Here, for example, referring to FIG. 35(a), if releaseTimer expires, the UE 3510 may release the CFRA resource. That is, when small data is not triggered in the UE 3510 before expiry of releaseTimer, the UE 3510 may release the CFRA resource.

Also, for example, referring to FIG. 35(b), if the number of allocated CFRA resources is skipped N times, the UE may release the CFRA resource. Here, for example, N may be determined based on the aforementioned "releaseRACHoccasion". That is, if the small data is not triggered in the UE 3510 until the allocated CFRA resource is skipped N times, the UE 3510 may release the CFRA resource.

In detail, for example, in the case of the 4-step RACH, when small data is generated, the UE 3510 may transmit a preamble in the set CFRA resource. Here, when a plurality of CFRA resources is configured for the small data, the UE 3510 may select a CFRA resource based on a CCCH size and an uplink data size. Then, when a base station (e.g., gNB) 3520 successfully decodes the preamble, the base station 3520 may determine a UL grant of RAR based on a resource location of the preamble and may transmit the UL grant to the UE 3510. Here, when the UE 3510 successfully receives the RAR, the UE may determine a TBS based on the UL grant and may transmit uplink data with a CCCH using Msg3.

Also, for example, in the case of 2-step RACH, when small data is generated, the UE 3510 may transmit a preamble and a PUSCH in the set CFRA resource. Here, when a plurality of CFRA resources is configured for the small data, the UE 3510 may select a CFRA resource based on a CCCH size and an uplink data size. Here, when the base station 3520 successfully decodes the preamble and the PUSCH, the base station 3520 may transmit SuccessRAR to the UE 3510.

On the contrary, when the base station 3520 does not successfully decodes the PUSCH, the base station 3520 may transmit FallbackRAR to the UE 3510. Here, FallbackRAR may include a UL grant. Here, the UL grant may be determined based on an msgA-PUSCH group associated with the preamble.

Figure 36:
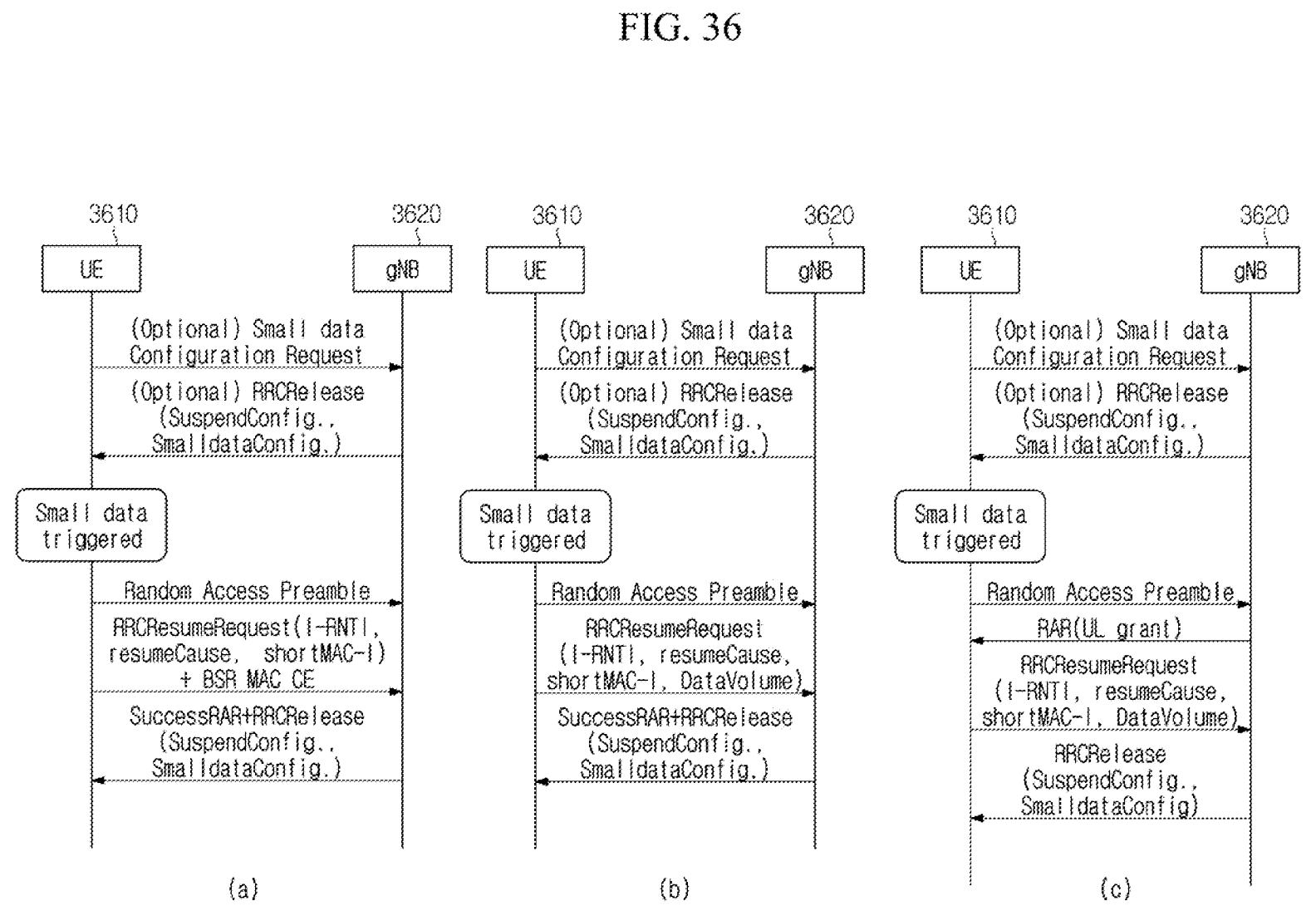

FIG. 36 illustrates a method of transmitting small data based on a CFRA to which the present disclosure may apply.

For example, referring to FIG. 36(a), a case in which an msgA-PUSCH TBS does not include a CCCH and uplink data in 2-step RACH may be considered. Here, a base station (e.g., gNB) 3620 may verify a data amount based on a BSR MAC CE and may indicate a CFRA resource to a UE 3610. Here, the UE 3610 may receive an RRC release message and may shift to an RRC inactive state. Then, at a point in time capable of using the CFRA resource indicated from the base station 3620 or if a corresponding occasion is given, the UE 3610 may attempt RACH. Here, the RACH may be the 2-step RACH or the 4-step RACH selected by the base station 3620.

For example, in the case of the 2-step RACH, the UE 3610 may configure Msg A with a TBS or more that includes a data amount of the BSR MAC CE and may transmit a preamble and a PUSCH to the base station 3620 through Msg A. Also, for example, in the case of the 4-step RACH, the UE 3620 may transmit the preamble to the base station. Here, the base station 3620 may include, in RAR, a UL grant capable of including the data amount of BSR MAC CE, and may transmit the same to the UE 3610. The UE 3610 may transmit the uplink data using msg3 based on the RAR. Also, for example, referring to FIG. 36(b), as described above, the data amount may be indicated through not the BSR MAC CE but an RRC message. Also, for example, referring to FIG. 36(c), in a 4-step RACH procedure, the data amount may be indicated to the base station 3620 through msg3 and may also be indicated even through the BSR MAC CE.

Figure 37:
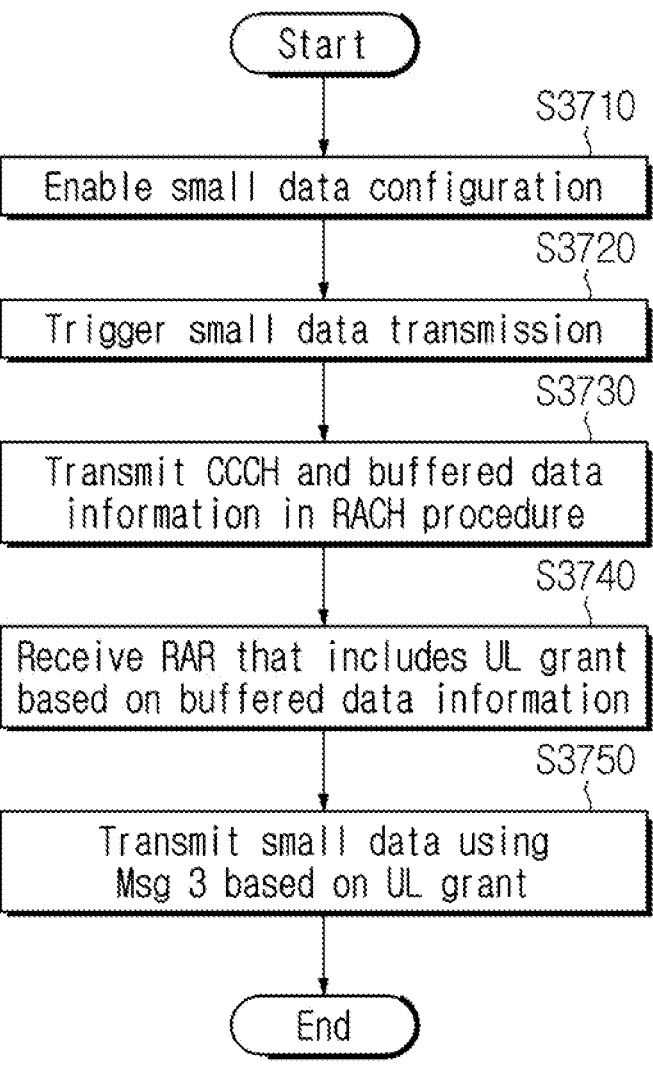
FIG. 37 is a flowchart illustrating a method of transmitting small data to which the present disclosure may apply.

FIG. 37 is a flowchart illustrating a method of transmitting small data to which the present disclosure may apply.

Referring to FIG. 37, a small data configuration may be enabled in a UE (S3710). Here, as described above with reference to FIGS. 1 to 36, the small data configuration may be enabled through a request from the UE. Also, for example, as described above, enabling of the small data configuration may be indicated through at least one of an RRC message and system information received from a base station, without a request from the UE.

Then, small data transmission may be triggered in the UE (S3720). Here, the UE may perform a random access procedure and may transmit, to the base station, information on buffered data in consideration of a CCCH size and a small data size in the random access procedure (S3730). Here, as described above with reference to FIGS. 1 to 36, in the case of 2-step RACH, the UE may transmit an RACH preamble and a PUSCH to the base station using Msg A. Here, the CCCH and information on the buffered data may be included in Msg A and thereby transmitted. For example, as described above, the buffered data may be indicated in a form of a BSR MAC CE, or may be included in the RRC message and information on the buffered data may be indicated.

The UE may receive a RAR that includes a UL grant based on buffered data information (S3740). The UE may transmit the small data to the base station through Msg 3 based on the UL grant (S3750). Here, as described above with reference to FIGS. 1 to 36, although the base station succeeds in decoding the preamble and the PUSCH, the base station may transmit not SuccessRAR but FallbackRAR to the UE. Here, FallbackRAR may include UL grant information in consideration of an amount of the buffered data. The UE may transmit the small data using Msg3 through the UL grant included in FallbackRAR. As described above, the UE may transmit the small data through the random access procedure without shifting a state.

Figure 38:
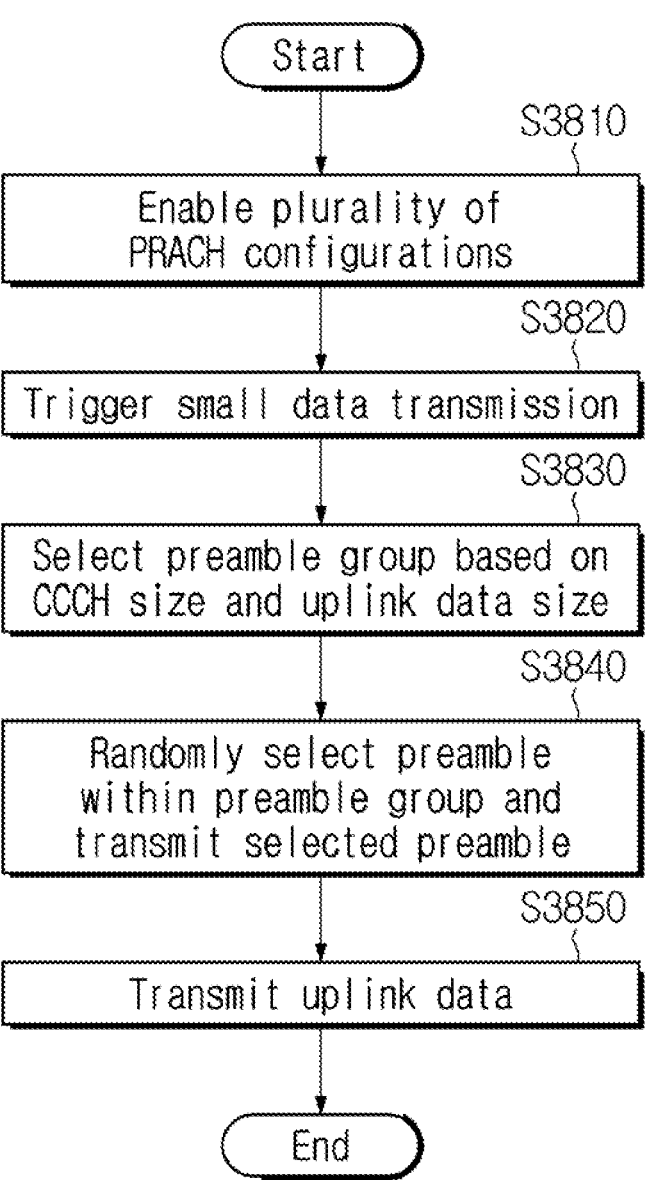
FIG. 38 is a flowchart illustrating a method of transmitting small data to which the present disclosure may apply.

FIG. 38 is a flowchart illustrating a method of transmitting small data to which the present disclosure may apply.

Referring to FIG. 38, a plurality of PRACH configurations may be enabled in a UE (S3810). Here, as described above with reference to FIGS. 1 to 36, an additional PRACH configuration may be configured in the UE in consideration of small data transmission. For example, as described above, the additional PRACH configuration may be enabled such that the UE may flexibly transmit the small data within a random access procedure.

Then, the UE may trigger small data transmission (S3820). Here, the UE may select a preamble group based on a CCCH size and an uplink data size (S3830).

Here, for example, a corresponding TBS range may be present for each preamble group. The UE may compare the CCCH size and the uplink data size to a TBS and may select a preamble group that includes a corresponding TBS. Here, for example, as described above, a fixed TBS range corresponding to a preamble group may be allocated. Also, as described above, an overlapping TBS corresponding to a preamble group may be allocated. Also, for example, as described above, each TBS range corresponding to a preamble group may be allocated in consideration of all PRACH configurations. Also, for example, as described above, a TABS range corresponding to a preamble group may be allocated for each PRACH configuration.

The UE may randomly select a preamble within the preamble group and may transmit the selected preamble to the base station (S3840). Also, the UE may transmit uplink data (S3850). Here, as described above with reference to FIGS. 1 to 36, in the 4-step RACH, the UE may transmit the preamble to the base station and may receive a corresponding UL grant through RAR. Here, as described above, the UE may perform an uplink data transmission through the UL grant. Also, as described above, in the 2-step RACH, the UE may transmit the preamble and the uplink data together.

Figure 39:
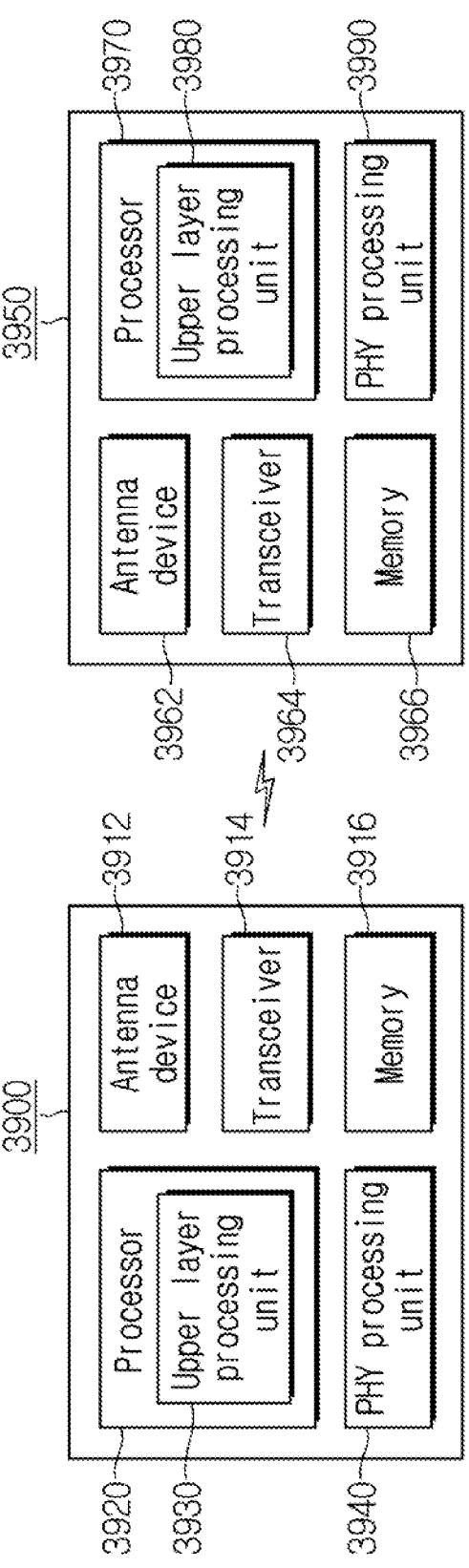
FIG. 39 is a diagram illustrating a base station device and a terminal device.

FIG. 39 is a diagram illustrating a configuration of a base station device and a terminal device.

A base station device 3900 may include a processor 3920, an antenna device 3912, a transceiver 3914, and a memory 3916.

The processor 3920 may perform baseband-related signal processing and may include an upper layer processing unit 3930 and a physical (PHY) layer processing unit 3940. The upper layer processing unit 3930 may process an operation of a medium access control (MAC) layer, a radio resource control (RRC) layer, or more upper layers. The PHY layer processing unit 3940 may process an operation (e.g., uplink received signal processing and downlink transmission signal processing) of a PHY layer. The processor 3920 may also control the overall operation of the base station device 3900, in addition to performing the baseband-related signal processing.

The antenna device 3912 may include at least one physical antenna. If the antenna device 3912 includes a plurality of antennas, multiple input multiple output (MIMO) transmission and reception may be supported. The transceiver 3914 may include a radio frequency (RF) transmitter and an RF receiver. The memory 3916 may store operation processed information of the processor 3920 and software, an operating system (OS), an application, etc., associated with an operation of the base station device 3900, and may include a component, such as a buffer.

The processor 3920 of the base station device 3900 may be configured to implement an operation of a base station in the embodiment(s) set forth herein.

The terminal device 3950 may include a processor 3970, an antenna device 3962, a transceiver 3964, and a memory 3966. For example, the terminal device 3950 herein may perform communication with the base station device 3900. As another example, the terminal device 3950 may perform sidelink communication with another terminal device. That is, the terminal device 3950 of the present disclosure may refer to a device capable of communicating with at least one of the base station device 3900 and another terminal device and is not limited to communicating with a specific device.

The processor 3970 may perform baseband-related signal processing and may include an upper layer processing unit 3980 and a PHY layer processing unit 3990. The upper layer processing unit 3980 may process an operation of a MAC layer, an RRC layer, or more upper layers. The PHY layer processing unit 3990 may process an operation (e.g., downlink received signal processing and uplink transmission signal processing) of a PHY layer. The processor 3970 may also control the overall operation of the terminal device 3950 in addition to performing the baseband-related signal processing.

The antenna device 3962 may include at least one physical antenna. If the antenna device 3962 includes a plurality of antennas, MIMO transmission and reception may be supported. The transceiver 3964 may include an RF transmitter and an RF receiver. The memory 3966 may store operation processed information of the processor 3970 and software, an OS, an application, etc., associated with an operation of the terminal device 3950, and may include a component, such as a buffer.

The processor 3970 of the terminal device 3950 may be configured to implement an operation of a UE in the embodiment(s) set forth herein.

Here, for example, the processor 3920 of the base station 3900 may transmit information on a small data configuration to the terminal 3950 through system information and RRC signaling. Also, the base station 3900 and the terminal 3950 may perform a message exchange based on at least one of 4-step RACH and a2-step RACH. Also, for example, the base station 3900 may set an additional PRACH configuration in consideration to small data transmission to the terminal 3950. Also, for example, the terminal 3950 may transmit small data to the base station 3900 based on at least one of the 4-step RACH and the 2-step RACH. Here, a state of the terminal 3950 may not be shifted. Also, the base station 3900 may set a preamble group corresponding to a TBS in consideration of the small data transmission and may transmit information related thereto to the terminal 3950. Also, as described above, the base station 3900 may provide a UL grant corresponding to the TBS to the terminal 3950 in consideration of the small data transmission.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes a software or machine executable instructions (for example, operating system, application, firmware, program, etc.) for enabling to implement operations according to the methods of the various examples, and a device or a non-transitory computer-readable medium executable on a computer storing such a software or instructions. Instructions available to program a processing system that performs features described herein may be stored on/in a storage medium or a computer-readable storage medium and the features described herein may be implemented using a computer program product that includes such storage medium.

What is claimed is:

1. A method comprising:
receiving, by a wireless user device, system information indicating a plurality of physical random access channel (PRACH) configurations comprising a first PRACH configuration for small data transmission and a second PRACH configuration for small data transmission, wherein the first PRACH configuration comprises a plurality of random access channel (RACH) resources for small data transmission associated with a radio resource control (RRC) inactive state;
receiving, by the wireless user device in an RRC connected state, an RRC release message;
transitioning, by the wireless user device and based on the RRC release message, from the RRC connected state to the RRC inactive state;
transmitting, by the wireless user device in the RRC inactive state to a base station, a message A (MsgA) for a 2-step RACH procedure, wherein the MsgA comprises a preamble and MsgA physical uplink shared channel (MsgA PUSCH), wherein the MsgA PUSCH comprises a buffer status report medium access control control element (BSR MAC CE), and wherein the BSR MAC CE indicates a data size;
receiving, by the wireless user device in the RRC inactive state, a fallback random access response (RAR) comprising an uplink (UL) grant; and
based on the UL grant, transmitting, by the wireless user device in the RRC inactive state, a message 3 (Msg3) to the base station via a selected RACH resource for a 4-step RACH procedure, wherein the Msg3 comprises common control channel (CCCH) data and small data,
wherein the first PRACH configuration comprises a first preamble group for 4-step RACH procedure, a second preamble group for 4-step RACH procedure, a third preamble group for 2-step RACH procedure, and a fourth preamble group for 2-step RACH procedure, and
wherein the second PRACH configuration comprises a fifth preamble group for 4-step RACH procedure, a sixth preamble group for 4-step RACH procedure, a seventh preamble group for 2-step RACH procedure, and an eighth preamble group for 2-step RACH procedure.

2. The method of claim 1, wherein the plurality of RACH resources for small data transmission associated with the RRC inactive state comprises at least one of:
a 2-step RACH resource; or
a 4-step RACH resource.

3. The method of claim 1, wherein the plurality of RACH resources for small data transmission associated with the RRC inactive state are configured on a bandwidth part (BWP).

4. The method of claim 1, wherein an amount of the small data does not exceed a data amount threshold.

5. The method of claim 1, further comprising:
retransmitting, by the wireless user device in the RRC inactive state, the Msg3.

6. The method of claim 1, further comprising:
after the transmitting the Msg3, maintaining, by the wireless user device, the RRC inactive state.

7. The method of claim 1, further comprising:
after the transmitting the small data, performing, by the wireless user device, a random access procedure to transition from the RRC inactive state to a second RRC connected state.

8. The method of claim 1, further comprising:
receiving, by the wireless user device, a message, for the selected RACH resource, indicating at least one of:
a mapping between one RACH occasion and one or more synchronization signal blocks (SSBs); or
a mapping between one or more contention-based preambles and one synchronization signal block (SSB).

9. The method of claim 1, wherein the RRC release message indicates:
a transition from the RRC connected state to the RRC inactive state; and
a small data configuration for the RRC inactive state.

10. The method of claim 1, further comprising:
determining, based on a measurement of a reference signal received power of a synchronization signal block (SSB), a 2-step RACH for transmission of uplink data or a 4-step RACH for transmission of the uplink data.

11. The method of claim 1, wherein the system information further indicates:
a second RACH resource for contention-based random access for transition to an RRC connected state; and
a third RACH resource for contention-free random access for transition to an RRC connected state.

12. The method of claim 1, wherein the system information further indicates:
a second RACH resource for 2-step random access for transition to an RRC connected state; and
a third RACH resource for 4-step random access for transition to an RRC connected state.

13. A method comprising:
receiving, by a wireless user device, configuration parameters indicating a plurality of physical random access channel (PRACH) configurations, wherein the plurality of PRACH configurations comprise:
a plurality of first random access channel (RACH) resources for small data transmission associated with a radio resource control (RRC) inactive state;
a second RACH resource for contention-based random access; and
a third RACH resource for contention-free random access;
receiving, by the wireless user device in an RRC connected state, an RRC release message, wherein the RRC release message indicates transition from the RRC connected state to the RRC inactive state;
transmitting, by the wireless user device in the RRC inactive state to a base station, a message A (MsgA) for a 2-step RACH procedure, wherein the MsgA comprises a preamble and MsgA physical uplink shared channel (MsgA PUSCH), wherein the MsgA PUSCH comprises a buffer status report medium access control control element (BSR MAC CE), and wherein the BSR MAC CE indicates a data size;

receiving, by the wireless user device in the RRC inactive state, a fallback random access response (RAR) comprising an uplink (UL) grant; and based on the UL grant, transmitting, by the wireless user device in the RRC inactive state, a message 3 (Msg3) to the base station via a selected RACH resource for 4-step RACH procedure, wherein the Msg3 comprises common control channel (CCCH) data and small data, wherein the plurality of PRACH configurations comprises a first PRACH configuration for small data transmission, wherein the first PRACH configuration comprises a first preamble group for 4-step RACH procedure, a second preamble group for 4-step RACH procedure, a third preamble group for 2-step RACH procedure, and a fourth preamble group for 2-step RACH procedure, and wherein the plurality of PRACH configurations further comprises a second PRACH configuration for small data transmission, and wherein the second PRACH configuration comprises a fifth preamble group for 4-step RACH procedure, a sixth preamble group for 4-step RACH procedure, a seventh preamble group for 2-step RACH procedure, and an eighth preamble group for 2-step RACH procedure.

14. The method of claim 13, further comprising:

after the transmitting the Msg3, maintaining, by the wireless user device, the RRC inactive state.

15. The method of claim 13, wherein the second RACH resource for contention-based random access comprises at least one of:

a 2-step RACH resource for contention-based random access for transition to an RRC connected state; or a 4-step RACH resource for contention-based random access for transition to an RRC connected state.

16. The method of claim 13, wherein the third RACH resource for contention-free random access comprises at least one of:

a 2-step RACH resource for contention-free random access for transition to an RRC connected state; or a 4-step RACH resource for contention-free random access for transition to an RRC connected state.

17. The method of claim 13, further comprising:

after the transmitting the Msg3, performing, by the wireless user device, a random access procedure to transition from the RRC inactive state to a second RRC connected state.

\*    \*    \*    \*    \*